United States Patent
Stolarz et al.

(10) Patent No.: US 10,250,633 B2
(45) Date of Patent: Apr. 2, 2019

(54) SYSTEM AND METHOD FOR AUDIO FINGERPRINTING FOR ATTACK DETECTION

(71) Applicant: Telepathy Labs, Inc., Clearwater, FL (US)

(72) Inventors: Damien Phelan Stolarz, Los Angeles, CA (US); Johanna Dwyer, Brookline, MA (US); Ronald J. Pollack, Clearwater, FL (US)

(73) Assignee: Telepathy Labs, Inc., Clearwater, FL (US)

( * ) Notice: Subject to any disclaimer, the term of this patent is extended or adjusted under 35 U.S.C. 154(b) by 0 days.

(21) Appl. No.: 15/720,064

(22) Filed: Sep. 29, 2017

(65) Prior Publication Data
US 2018/0097838 A1 Apr. 5, 2018

Related U.S. Application Data

(60) Provisional application No. 62/403,687, filed on Oct. 3, 2016, provisional application No. 62/403,688, filed
(Continued)

(51) Int. Cl.
*H04L 29/06* (2006.01)
*H04W 12/08* (2009.01)
(Continued)

(52) U.S. Cl.
CPC ......... *H04L 63/1441* (2013.01); *G06N 3/084* (2013.01); *G06N 5/043* (2013.01);
(Continued)

(58) Field of Classification Search
CPC ............. H04L 63/1441; H04L 63/1483; G10L 15/265; H04W 12/08; H04W 12/12
See application file for complete search history.

(56) References Cited

U.S. PATENT DOCUMENTS 7,356,585 B1 4/2008 Brook et al.
7,895,649 B1 2/2011 Brook et al.
(Continued)

FOREIGN PATENT DOCUMENTS

CN 102082792 6/2011
CN 101667979 B 6/2012
(Continued)

OTHER PUBLICATIONS

Zou, et al., "A Firewall Network System for Worm Defense in Enterprise Networks"; University of Massachusetts, Amherst, Technical Report: TR-04-CSE-01, Feb. 4, 2004.
(Continued)

*Primary Examiner* — Khoi V Le
(74) *Attorney, Agent, or Firm* — Michael T. Abramson; Holland & Knight LLP

(57) ABSTRACT

A method, computer program product, and computer system directed toward identification of potential social engineering activity associated with at least a portion of a communication on a communication channel based upon, at least in part, a match between a first set of audio features with a second set of one or more audio features. The first set of one or more audio features are extracted from at least a portion of a communication on a communication channel. The first set of one or more audio features from at least a portion of the communication are compared to a second set of one or more audio features to determine that at least a portion of the first set of audio features matches the second set of one or more audio features.

14 Claims, 44 Drawing Sheets

Related U.S. Application Data on Oct. 3, 2016, provisional application No. 62/403,691, filed on Oct. 3, 2016, provisional application No. 62/403,693, filed on Oct. 3, 2016, provisional application No. 62/403,696, filed on Oct. 3, 2016.

(51) Int. Cl.

| | | |
|---|---|---|
| *H04W 12/12* | (2009.01) | |
| *G06N 5/04* | (2006.01) | |
| *G06N 99/00* | (2019.01) | |
| *G06N 3/08* | (2006.01) | |
| *G10L 15/26* | (2006.01) | |
| *H04L 29/08* | (2006.01) | |
| *H04W 4/21* | (2018.01) | |

(52) U.S. Cl.
CPC ............ *G06N 99/005* (2013.01); *G10L 15/26* (2013.01); *G10L 15/265* (2013.01); *H04L 63/10* (2013.01); *H04L 63/1408* (2013.01); *H04L 63/1416* (2013.01); *H04L 63/1425* (2013.01); *H04L 63/1483* (2013.01); *H04L 67/306* (2013.01); *H04W 12/08* (2013.01); *H04W 12/12* (2013.01); *H04W 4/21* (2018.02)

(56) References Cited

U.S. PATENT DOCUMENTS

| | | | |
|---|---|---|---|
| 7,934,103 | B2 | 4/2011 | Kidron |
| 8,364,120 | B2* | 1/2013 | Kuhlman ............... H04L 63/10 |
| | | | 455/410 |
| 8,381,292 | B1 | 2/2013 | Warner et al. |
| 8,621,614 | B2 | 12/2013 | Vaithilingam et al. |
| 8,856,936 | B2 | 10/2014 | Datta Ray et al. |
| 8,924,488 | B2 | 12/2014 | Bobotek |
| 8,997,232 | B2 | 3/2015 | Be'ery et al. |
| 9,009,832 | B2 | 4/2015 | Be'ery et al. |
| 9,027,136 | B2 | 5/2015 | Be'ery et al. |
| 9,027,137 | B2 | 5/2015 | Be'ery et al. |
| 9,123,027 | B2 | 9/2015 | Srivastava et al. |
| 9,183,387 | B1* | 11/2015 | Altman ............... G06F 21/554 |
| 9,253,208 | B1 | 2/2016 | Koshelev |
| 9,311,480 | B2 | 4/2016 | Teddy et al. |
| 9,407,652 | B1 | 8/2016 | Kesin et al. |
| 9,479,528 | B2 | 10/2016 | Deng et al. |
| 9,503,472 | B2 | 11/2016 | Laidlaw et al. |
| 9,537,840 | B2 | 1/2017 | Schutz et al. |
| 9,537,841 | B2 | 1/2017 | Schutz et al. |
| 9,699,196 | B1 | 7/2017 | Kolman et al. |
| 9,763,097 | B2 | 9/2017 | Robinson et al. |
| 9,798,795 | B2* | 10/2017 | Raichelgauz ..... G06F 17/30595 |
| 9,852,736 | B2* | 12/2017 | Sharma ................... G10L 19/02 |
| 9,912,486 | B1 | 3/2018 | Sharifi Mehr |
| 2002/0161766 | A1 | 10/2002 | Lawson et al. |
| 2005/0132070 | A1 | 6/2005 | Redlich et al. |
| 2006/0069697 | A1 | 3/2006 | Shraim et al. |
| 2008/0267091 | A1 | 10/2008 | Parkkinen et al. |
| 2008/0301810 | A1 | 12/2008 | Lehane et al. |
| 2009/0043818 | A1* | 2/2009 | Raichelgauz ..... G06F 17/30595 |
| 2009/0254970 | A1 | 10/2009 | Agarwal et al. |
| 2009/0324025 | A1* | 12/2009 | Camp, Jr. .......... G07C 9/00007 |
| | | | 382/124 |
| 2010/0169486 | A1 | 7/2010 | McCormack et al. |
| 2011/0197070 | A1 | 8/2011 | Mizrah |
| 2012/0254333 | A1 | 10/2012 | Chandramouli et al. |
| 2013/0138428 | A1 | 5/2013 | Chandramouli et al. |
| 2013/0347116 | A1 | 12/2013 | Flores et al. |
| 2014/0173726 | A1 | 6/2014 | Varenhorst |
| 2014/0230064 | A1 | 8/2014 | Higbee et al. |
| 2015/0128274 | A1 | 5/2015 | Giokas |
| 2015/0172311 | A1 | 6/2015 | Freedman et al. |
| 2015/0207806 | A1 | 7/2015 | Be'ery et al. |
| 2015/0222667 | A1 | 8/2015 | Nayshtut et al. |
| 2015/0281287 | A1 | 10/2015 | Gill et al. |
| 2015/0373428 | A1* | 12/2015 | Trollope ............ H04N 21/8133 |
| | | | 704/235 |
| 2016/0057167 | A1 | 2/2016 | Bach |
| 2016/0078225 | A1 | 3/2016 | Ray et al. |
| 2016/0080399 | A1 | 3/2016 | Harris et al. |
| 2016/0080417 | A1 | 3/2016 | Thomas et al. |
| 2016/0080418 | A1 | 3/2016 | Ray et al. |
| 2016/0080419 | A1 | 3/2016 | Schiappa et al. |
| 2016/0080420 | A1 | 3/2016 | Ray et al. |
| 2016/0099963 | A1 | 4/2016 | Mahaffey et al. |
| 2016/0127402 | A1 | 5/2016 | Veeramachaneni et al. |
| 2016/0191465 | A1 | 6/2016 | Thomas et al. |
| 2016/0191476 | A1 | 6/2016 | Schutz et al. |
| 2016/0191548 | A1 | 6/2016 | Smith et al. |
| 2016/0205094 | A1* | 7/2016 | Harthattu ................ H04W 4/02 |
| | | | 455/411 |
| 2016/0261618 | A1 | 9/2016 | Koshelev |
| 2016/0323303 | A1 | 11/2016 | Thomas |
| 2016/0381077 | A1 | 12/2016 | Bassias et al. |
| 2017/0053108 | A1* | 2/2017 | Jakobsson .......... H04L 63/0861 |
| 2017/0272468 | A1 | 9/2017 | Chechani |

FOREIGN PATENT DOCUMENTS

| | | |
|---|---|---|
| KR | 20090001505 | 1/2009 |
| KR | 101264255 | 5/2013 |
| KR | 101328389 | 11/2013 |
| KR | 20140108830 | 9/2014 |
| KR | 101450009 | 10/2014 |

OTHER PUBLICATIONS

Lindstrom, "Attacking and Defending Web Services", A Spire Research Report, Jan. 2004. Print.

Bisht, et al, "CANDID: Dynamic Candidate Evaluations for Automatic Prevention of SQL Injection Attacks"; ACM Journal Name, vol. V. No. N. Month 20YY, pp. 1-38.

Wood, et al, "Denial of Service in Sensor Networks", Computer 0018-9162/02, 2002 IEEE.

Tuck et al., "Deterministic Memory-Efficient String Matching Algorithms for Instrusion Detection", 0-7803-8356-7/04 © 2004 IEEE INFOCOM 2004.

Dickerson et al., "Fuzzy Intrusion Detection", Electrical and Computer Engineering Department, Iowa State University, Ames, IA.

Dickerson, "Fuzzy Network Profiling for Intrusion Detection", Electrical and Computer Engineering Department, Iowa State University, Ames, Iowa 50011.

Carpenter et al., "Magic Quadrant for Security Awareness Computer-Based Training", Published: Oct. 25, 2016, ID: G00293102, Gartner, Inc.

Jajodia et al, "Cauldron, Mission-Centric Cyber Situational Awareness with Defense in Depth", Supported in part by Army Research Office MURI 2911 NF-09-10525, MILCOM 2011 Military Communications Conference, 2011.

Reynolds et al., "On-Line Intrusion Detection and Attack Prevention Using Diversity, Generate-and-Test, and Generalization", Teknowledge Corporation, Proceedings of the 36th Hawaii International Conference on System Sciences, 2003.

Lippmann et al., "Recent Advances in Intrustion Detection", 11th International Symposium, RAID 2008, Cambridge, MA, USA, Sep. 15-17, 2008 Proceedings.

Bakshi et al., "Securing cloud from DDOS Attacks using Intrustion Detection System in virtual machine", 2010 Second International Conference on Communication Software and Networks, 2010.

Singhal et al., "Security Risk Analysis of Enterprise Networks Using Probabilistic Attack Graphs", NIST Interagency Report 7788, National Institute of Standards and Technology, U.S. Department of Commerce, Aug. 2011.

McHugh et al., "Definding Yourself: The Role of Intrusion Detection Systems", IEEE Software 17.5, 2000, pp. 42-51, Web.

Lippmann et al., "Validating and Restoring Defense in Depth Using Attack Graphs", MIT Lincoln Laboratory, Milcom 2006.

Non-Final Office Action issued in related U.S. Appl. No. 15/720,009 dated Dec. 18, 2017.

(56) References Cited

OTHER PUBLICATIONS

Non-Final Office Action issued in related U.S. Appl. No. 15/720,186 dated Jan. 11, 2018.
International Search Report and Written Opinion issued in International Application No. PCT/US2017/054262 dated Jan. 10, 2018.
Final Office Action issued in U.S. Appl. No. 15/720,186 dated Jun. 13, 2018.
Final Office Action issued in U.S. Appl. No. 15/720,009 dated Jun. 8, 2018.
Non-Final Office Action issued in U.S. Appl. No. 15/720,009 dated Sep. 20, 2018.
Non-Final Office Action Issued in U.S. Appl. No. 15/720,186 on Oct. 16, 2018.

* cited by examiner

10

[700] Identifying, by a computing device, a first user in a network, wherein access to at least a portion of the network is available to at least one of the first user and a second user based upon, at least in part, one or more attributes of the first user;

[710] Determining a change in an attribute of the one or more attributes of the first user.

[720] Removing at least a portion of the access to at least the portion of the network from at least one of the first user and the second user based upon, at least in part, determining the change in the attribute of the one or more attributes of the first user.

[780] Providing a prompt to at least one of the first user and the second user to remove at least the portion of the access to at least the portion of the network based upon, at least in part, determining the change in the attribute of the one or more attributes of the first user.

FIG. 36

SYSTEM AND METHOD FOR AUDIO FINGERPRINTING FOR ATTACK DETECTION

RELATED CASES

This application claims the benefit of U.S. Provisional Patent Application Ser. No. 62/403,687 titled "Omnichannel Malicious Attack Avoidance", filed on Oct. 3, 2016, U.S. Provisional Patent Application Ser. No. 62/403,688 titled "Enterprise Authorization for Social Partitions", filed on Oct. 3, 2016, U.S. Provisional Patent Application Ser. No. 62/403,691 titled "Deep Learning On Attack Energy Vectors", filed on Oct. 3, 2016, U.S. Provisional Patent Application Ser. No. 62/403,693 titled "Audio Fingerprinting for Attack Detection", filed on Oct. 3, 2016, and U.S. Provisional Patent Application Ser. No. 62/403,696 titled "User Threat Alerting System", filed on Oct. 3, 2016, the contents of which are all incorporated by reference.

BACKGROUND

In the context of information security, social engineering may refer to the psychological manipulation, influencing or deception of people, usually based on fraud, into taking actions or divulging confidential information for the purpose of obtaining information or gaining control and access of a computer system. This type of activity may be viewed as an attack vector that may rely heavily on human interaction and may often involve obtaining a person's trust and exploiting that trust by tricking that person into breaking normal security procedures.

Various techniques are used that appeal to vanity, appeal to authority and appeal to greed. Further, many social engineering exploits may simply rely on people's willingness to be helpful. For example, the attacker might pretend to be a co-worker who has some kind of an urgent problem that requires access to additional network resources.

There are several types of social engineering attacks, such as, e.g., digital attacks, phone attacks and in-person attacks. These attacks can originate from different sources, which can also be referred to as communication sources.

Digital attacks may use email or text messages in tricking a person into clicking malicious link or opening an infected attachment. These types of attacks are often referred to as "Phishing." Phishing may involve maliciously deceiving users into activating software that allows an attacker to take control of the victim's computer, as well as deceiving users into providing information directly to the attacker. Often, this attack technique includes a malicious party sending one or more communications to a potential victim. These communications can be in the form of fraudulent email disguised as a legitimate email, often purporting to be from a trusted source, such an executive within a company, e.g., Chief Executive Officer (CEO), or bank or credit card company. In some cases, once the victim opens the fraudulent email message, or goes to a fraudulent web page, a viral payload may be delivered to the victim's computer. Once installed, the user's computer can often be controlled to perform other malicious activities such as accessing data, sending out spam emails, attacking other computers, infiltrating a closed network, or installing additional harmful software, such as Ransomware.

A variation of phishing is spear phishing, which is similar to phishing, but tailored for a specific individual or organization. Generally, spear phishing is a technique that may fraudulently obtain private information by sending highly customized emails to a few end users. This customized approach is one example difference between spear phishing and normal phishing campaigns, which focus on sending out high volumes of generalized emails with the expectation that only a few people will respond. On the other hand, spear phishing emails may require the attacker to perform additional research on their targets, in order to "trick" end users into performing requested activities.

Phone attacks can be used to make a person feel a sense of urgency to act in order to prevent a negative consequence. These attacks may attempt to have the person take an action that may put that person and that person's information at risk. These types of attacks are often referred as "Vishing". Vishing typically uses a live person or a rogue interactive voice response (IVR) system to recreate a legitimate-sounding copy of a bank or other institution's IVR system. The victim is prompted (typically via a phishing e-mail) to call in to the "bank" via a (ideally toll free) number provided, in order to "verify" information. A typical "vishing" system may reject log-ins continually, ensuring the victim enters PINs or passwords multiple times, often disclosing several different passwords. More advanced systems may transfer the victim to the attacker/defrauder, who poses as a customer service agent or security expert for further questioning of the victim.

Pretexting is an in-person attack and occurs when one party lies to another to gain access to privileged data. For example, a pretexting scam could involve an attacker who pretends to need personal or financial data, in order to confirm the identity of the recipient.

Social engineering also takes advantage of new communication channels that are being developed. For example, social networks, such as Facebook, often incorporate their own chat and voice channels. Smartphones and other mobile devices integrate various of VoIP, encrypted chat, texting, messaging, stickers, short videos, and other means of communication. In addition to these, augmented reality and virtual reality communication channels are being developed. Further, over-the-top services and applications, such as Skype, Facetime and WhatsApp, bypass traditional network distribution approaches and run over, or on top of, core Internet networks. As with existing forms of communication channels, these new communication channels are susceptible to social engineering attacks.

BRIEF SUMMARY OF DISCLOSURE

In one example implementation, a method, performed by one or more computing devices, may include but is not limited to identifying potential social engineering activity associated with one or more communications on a first communication channel of a plurality of communication channels. Restriction of at least partial access to at least a second communication channel of the plurality of communication channels may be requested based upon, at least in part, the identification of the potential social engineering activity associated with the one or more communications on the first communication channel.

One or more of the following example features may be included. Identifying the potential social engineering activity may occur in real-time. An action may be performed based upon, at least in part, identifying the potential social engineering activity associated with the one or more communications on the first communication channel, wherein performing the action may include automatically connecting a second user to monitor or at least partially participate in the one or more communications on the first communication channel.

An action may be performed based upon, at least in part, identifying the potential social engineering activity associated with the one or more communications on the first communication channel, wherein performing the action may include providing one or more characteristics of the one or more communications used to identify the potential social engineering activity. An action may be performed based upon, at least in part, identifying the potential social engineering activity associated with the one or more communications on the first communication channel, wherein performing the action may include providing aggregated information about a user participating with the one or more communications on the first communication channel. An action may be performed based upon, at least in part, identifying the potential social engineering activity associated with the one or more communications on the first communication channel, wherein performing the action may include verifying social engineering activity associated with the potential social engineering activity. An action may be performed based upon, at least in part, identifying the potential social engineering activity associated with the one or more communications on the first communication channel, or a pattern of communications on multiple channels, wherein performing the action may include implementing quarantine actions.

In another example implementation, a computing system may include one or more processors and one or more memories configured to perform operations that may include but are not limited to identifying potential social engineering activity associated with one or more communications on a first communication channel of a plurality of communication channels. Restriction of at least partial access to at least a second communication channel of the plurality of communication channels may be requested based upon, at least in part, the identification of the potential social engineering activity associated with the one or more communications on the first communication channel.

The computer system may perform operations that may include one or more of the following example features. Identifying the potential social engineering activity may occur in real-time. An action may be performed based upon, at least in part, identifying the potential social engineering activity associated with the one or more communications on the first communication channel, wherein performing the action may include automatically connecting a second user to at least partially participate in the one or more communications on the first communication channel.

An action may be performed based upon, at least in part, identifying the potential social engineering activity associated with the one or more communications on the first communication channel, wherein performing the action may include providing one or more characteristics of the one or more communications used to identify the potential social engineering activity. An action may be performed based upon, at least in part, identifying the potential social engineering activity associated with the one or more communications on the first communication channel, wherein performing the action may include providing aggregated information about a user participating with the one or more communications on the first communication channel. An action may be performed based upon, at least in part, identifying the potential social engineering activity associated with the one or more communications on the first communication channel, wherein performing the action may include verifying the potential social engineering activity was actual social engineering activity. An action may be performed based upon, at least in part, identifying the potential social engineering activity associated with the one or more communications on the first communication channel, wherein performing the action may include implementing quarantine actions. The computer system may include a virtual agent for at least one of monitoring and controlling the operations.

In another example implementation, a computer program product may reside on a computer readable storage medium having a plurality of instructions stored thereon which, when executed across one or more processors, may cause at least a portion of the one or more processors to perform operations that may include but are not limited to identifying potential social engineering activity associated with one or more communications on a first communication channel of a plurality of communication channels. Restriction of at least partial access to at least a second communication channel of the plurality of communication channels may be requested based upon, at least in part, the identification of the potential social engineering activity associated with the one or more communications on the first communication channel.

The computer program product may perform operations that may include but are not limited to one or more of the following example features. Identifying the potential social engineering activity may occur in real-time. An action may be performed based upon, at least in part, identifying the potential social engineering activity associated with the one or more communications on the first communication channel, wherein performing the action may include automatically connecting a second user to at least partially participate in the one or more communications on the first communication channel.

An action may be performed based upon, at least in part, identifying the potential social engineering activity associated with the one or more communications on the first communication channel, wherein performing the action may include providing one or more characteristics of the one or more communications used to identify the potential social engineering activity. An action may be performed based upon, at least in part, identifying the potential social engineering activity associated with the one or more communications on the first communication channel, wherein performing the action may include providing aggregated information about a user participating with the one or more communications on the first communication channel. An action may be performed based upon, at least in part, identifying the potential social engineering activity associated with the one or more communications on the first communication channel, wherein performing the action may include verifying social engineering activity associated with the potential social engineering activity. An action may be performed based upon, at least in part, identifying the potential social engineering activity associated with the one or more communications on the first communication channel, wherein performing the action may include implementing quarantine actions.

In another example implementation, a method, performed by one or more computing devices, may include but is not limited to identifying a first characteristic of a first communication on a first communication channel and identifying a second characteristic of a second communication on a second communication channel. The first characteristic of the first communication on the first communication channel and the second characteristic of the second communication on the second communication channel are then compared to a predetermined rule. A determination is made as whether the first characteristic of the first communication on the first communication channel and the second characteristic of the second communication on the second communication channel correlate to the predetermined rule. The identification of potential social engineering activity associated with at least one of the first communication and the second communication may be based upon, at least in part, correlation to the predetermined rule.

A predetermined rule may be based, at least in part, on the first communication and the second communication being received by a same user. A predetermined rule may be based, at least in part, on the first communication being received by a first user and the second communication being received by a second user who is related to the first user. A predetermined rule may be based, at least in part, on a pattern existing between the first characteristic of the first communication on the first communication channel and the second characteristic of the second communication on the second communication channel.

One or more of the following example features may also be included. The first communication channel may be a first communication platform and the second communication channel may be a second communication platform. The identification of the at least one of the first characteristic of the first communication on the first communication channel and of the second characteristic of the second communication on the second communication channel may include one or more of voice analysis and text analysis. An indication of the potential social engineering activity may be provided to at least one user participating in the first communication on the first communication channel and to a third party based upon, at least in part, identifying the potential social engineering activity.

In another example implementation, a computing system may include one or more processors and one or more memories configured to perform operations that may include but are not limited to identifying a first characteristic of a first communication on a first communication channel and identifying a second characteristic of a second communication on a second communication channel. The first characteristic of the first communication on the first communication channel and the second characteristic of the second communication on the second communication channel are then compared to a predetermined rule. A determination is made as to whether the first characteristic of the first communication on the first communication channel and the second characteristic of the second communication on the second communication channel correlate to the predetermined rule. The identification of potential social engineering activity associated with at least one of the first communication and the second communication may be based upon, at least in part, correlation to the predetermined rule.

The computer system may perform operations that may include one or more of the following example features. The first communication channel may be a first communication platform and the second communication channel may be a second communication platform. The identification of the at least one of the first characteristic of the first communication on the first communication channel and of the second characteristic of the second communication on the second communication channel may include one or more of voice analysis and text analysis. An indication of the potential social engineering activity to at least one user participating in the first communication on the first communication channel and a third party may be provided based upon, at least in part, identifying the potential social engineering activity. The computer system may include a virtual agent for at least one of monitoring and controlling the operations.

In another example implementation, a computer program product may reside on a computer readable storage medium having a plurality of instructions stored thereon which, when executed across one or more processors, may cause at least a portion of the one or more processors to perform operations that may include but are not limited to identifying a first characteristic of a first communication on a first communication channel and identifying a second characteristic of a second communication on a second communication channel. The first characteristic of the first communication on the first communication channel and the second characteristic of the second communication on the second communication channel are then compared to a predetermined rule. A determination is made as to whether the first characteristic of the first communication on the first communication channel and the second characteristic of the second communication on the second communication channel correlate to the predetermined rule. The identification of potential social engineering activity associated with at least one of the first communication and the second communication may be based upon, at least in part, correlation to the predetermined rule.

The computer program product may perform operations that may include but are not limited to one or more of the following example features. The first communication channel may be a first communication platform and the second communication channel may be a second communication platform. The identification of the at least one of the first characteristic of the first communication on the first communication channel and of the second characteristic of the second communication on the second communication channel may include one or more of voice analysis and text analysis. An indication of the potential social engineering activity to at least one user participating in the first communication on the first communication channel and a third party may be provided based upon, at least in part, identifying the potential social engineering activity.

In another example implementation, a method, performed by one or more computing devices, may include but is not limited to extracting a first set of one or more audio features from at least a portion of a communication on a communication channel. The first set of one or more audio features from at least a portion of the communication is compared to a second set of one or more audio features to determine that at least a portion of the first set of audio features matches the second set of one or more audio features. Identification of potential social engineering activity associated with at least a portion of the communication on the communication channel may be based upon, at least in part, a match between the first set of audio features with the second set of one or more audio features.

One or more of the following example audio features may be included. At least one of the features of audio features includes intent. The first set of one or more audio features may also be based upon, at least in part, an audio characteristic of the communication. This audio characteristic may include at least one of tone, i.e. pitch, and cadence, i.e. the rhythmic flow of a sequence of sounds or words, of a voice identified during the communication.

Extracting the first set of one or more audio features may include generating an audio fingerprint of at least a portion of the communication on the communication channel. Extracting the first set of one or more audio features may include transcribing audio from at least the portion of the communication into text, where at least a portion of the first set of one or more features may be extracted across multiple communications on the communication channel.

In another example implementation, a computing system may include one or more processors and one or more memories configured to perform operations that may include but are not limited to extracting a first set of one or more audio features from at least a portion of a communication on a communication channel. The first set of one or more audio features from the at least a portion of the communication is compared to a second set of one or more audio features to determine that at least a portion of the first set of audio features matches the second set of one or more audio features. Identification of potential social engineering activity associated with at least a portion of the communication on the communication channel may be based upon, at least in part, a match between the first set of audio features with the second set of one or more audio features.

The computer system may perform operations that may include one or more of the following example features. The first set of one or more audio features may be based upon, at least in part, an audio characteristic of the communication. This audio characteristic may include at least one of tone and cadence of a voice identified during the communication. At least one of the features of the first set of audio features includes intent.

Extracting the first set of one or more audio features may include generating an audio fingerprint of at least a portion of the communication on the communication channel. Extracting the first set of one or more audio features may include transcribing audio from at least the portion of the communication into text, at least a portion of the first set of one or more audio features may be extracted across multiple communications on the communication channel. The computer system may include a virtual agent for at least one of monitoring and controlling the operations.

In another example implementation, a computer program product may reside on a computer readable storage medium having a plurality of instructions stored thereon which, when executed across one or more processors, may cause at least a portion of the one or more processors to perform operations that may include but are not limited to extracting a first set of one or more audio features from at least a portion of a communication on a communication channel. The first set of one or more audio features from at least a portion of the communication is compared to a second set of one or more audio features to determine that at least a portion of the first set of audio features matches the second set of one or more audio features. Identification of potential social engineering activity associated with at least a portion of the communication on the communication channel may be based upon, at least in part, a match between the first set of audio features with the second set of one or more audio features.

The computer program product may perform operations that may include but are not limited to one or more of the following example features. The first set of one or more audio features may be based upon, at least in part, an audio characteristic of the communication. This audio characteristic may include at least one of tone and cadence of a voice identified during the communication. At least one of the features of the first set of audio features includes intent.

Extracting the first set of one or more audio features may include generating audio fingerprint of at least a portion of the communication on the communication channel. Extracting the first set of one or more audio features may include transcribing audio from at least the portion of the communication into text, at least a portion of the first set of one or more features may be extracted across multiple communications on the communication channel.

In another example implementation, a method, performed by one or more computing devices, may include but is not limited to identifying a profile with a user for a plurality of communication channels and determining a current score for two or more communication channels of the plurality of communication channels. The current score may be based upon, at least in part, a first current score for a first communication channel of the two or more communication channels and a second current score for a second communication channel of the two or more communication channels. A determination whether the current score for the two or more communication channels is greater than a threshold score for the profile is made. Identifying potential social engineering activity may be based upon, at least in part, a determination that the current score for the two or more communication channels is greater than the threshold score for the profile. Based at least in part upon the identification of potential social engineering activity, at least one of text, audio, and visual analysis is performed upon at least a portion of the plurality of communication channels.

One or more of the following example features may be included. Each communication channel in the profile may include a respective historical score. The threshold score may be generated based upon, at least in part, machine learning from the respective historical score. The threshold score may be updated based upon, at least in part, one or more temporal factors. At least one of the first current score and the second current score may be a weighted score and/or may be a normalized score. This method may also include the determination of a pattern between at least a portion of the plurality of communication channels and may further include using this pattern for future identification of social engineering activity.

In another example implementation, a computing system may include one or more processors and one or more memories configured to perform operations that may include but are not limited to identifying a profile with a user for a plurality of communication channels and determining a current score for two or more communication channels of the plurality of communication channels. The current score may be based upon, at least in part, a first current score for a first communication channel of the two or more communication channels and a second current score for a second communication channel of the two or more communication channels. A determination whether the current score for the two or more communication channels is greater than a threshold score for the profile is made. Identifying potential social engineering activity may be based upon, at least in part, a determination that the current score for the two or more communication channels is greater than the threshold score for the profile. Based at least in part upon the identification of potential social engineering activity, at least one of text, audio, and visual analysis is performed upon at least a portion of the plurality of communication channels.

The computer system may perform operations that may include one or more of the following example features. Each communication channel in the profile may include a respective historical score. The threshold score may be generated based upon, at least in part, machine learning from the respective historical score. the threshold score may be updated based upon, at least in part, one or more temporal factors. At least one of the first current score and the second current score may be a weighted score and/or may be a normalized score. This method may also include the determination of a pattern between at least a portion of the plurality of communication channels and may further include using this pattern for future identification of social engineering activity. The computer system may include a virtual agent for at least one of monitoring and controlling the operations.

In another example implementation, a computer program product may reside on a computer readable storage medium having a plurality of instructions stored thereon which, when executed across one or more processors, may cause at least a portion of the one or more processors to perform operations that may include but are not limited to identifying a profile with a user for a plurality of communication channels and determining a current score for two or more communication channels of the plurality of communication channels. The current score may be based upon, at least in part, a first current score for a first communication channel of the two or more communication channels and a second current score for a second communication channel of the two or more communication channels. A determination whether the current score for the two or more communication channels is greater than a threshold score for the profile is made. Identifying potential social engineering activity may be based upon, at least in part, a determination that the current score for the two or more communication channels is greater than the threshold score for the profile. Based at least in part upon the identification of potential social engineering activity, at least one of text, audio, and visual analysis is performed upon at least a portion of the plurality of communication channels.

The computer program product may perform operations that may include but are not limited to one or more of the following example features. One or more of the following example features may be included. Each communication channel in the profile may include a respective historical score. The threshold score may be generated based upon, at least in part, machine learning from the respective historical score. the threshold score may be updated based upon, at least in part, one or more temporal factors. At least one of the first current score and the second current score may be a weighted score and/or may be a normalized score. This method may also include the determination of a pattern between at least a portion of the plurality of communication channels and may further include using this pattern for future identification of social engineering activity.

In one example implementation, a method, performed by one or more computing devices, may include but is not limited to identifying a first user in a network. Access to at least a portion of a network may be available to the first user based upon, at least in part, one or more attributes of the first user. A determination, by the one or more computing devices, may be made that a change in an attribute of the one or more attributes of the first user. The removal of at least a portion of the access to at least a portion of the network from the first user may be removed, based upon, at least in part, the determination of the change in the attribute of the one or more attributes of the first user.

One or more of the following example features may be included. A prompt may be provided to at least one of the first user and the second user to remove at least the portion of the access to at least the portion of the network based upon, at least in part, determining the change in the attribute of the one or more attributes of the first user. A determination of the change in the attribute may include receiving a notification of the change. An attribute may include at least one of a status of the first user in the network and a level of connection of the first user in the network. The level of connection of the first user to the second user in the network may be automatically changed based upon, at least in part, determining the change in the attribute of the one or more attributes of the first user. The status of the first user in the network may include a current employer of the first user. The level of connection of the first user in the network may include a connection of a first profile for the first user with at least one of a second profile of the second user and a group in the network. Access to at least a portion of the network may be available to at least one of the first user and a second user based upon, at least in part, one or more attributes of the first user. The removal of at least a portion of the access to the at least the portion of the network from at least one of the first user and the second user may be based upon, at least in part, determining the change in the attribute of the one or more attributes of the first user.

In another example implementation, a computing system may include one or more processors and one or more memories configured to perform operations that may include but are not limited to identifying a first user in a network. Access to at least a portion of a network may be available to the first user based upon, at least in part, one or more attributes of the first user. A determination, by the one or more computing devices, may be made that a change in an attribute of the one or more attributes of the first user. The removal of at least a portion of the access to at least a portion of the network from the first user may be removed, based upon, at least in part, the determination of the change in the attribute of the one or more attributes of the first user.

The computer system may perform operations that may include one or more of the following example features. A prompt may be provided to at least one of the first user and the second user to remove at least the portion of the access to at least the portion of the network based upon, at least in part, determining the change in the attribute of the one or more attributes of the first user. A determination of the change in the attribute may include receiving a notification of the change. An attribute may include at least one of a status of the first user in the network and a level of connection of the first user in the network. The level of connection of the first user to the second user in the network may be automatically changed based upon, at least in part, determining the change in the attribute of the one or more attributes of the first user. The status of the first user in the network may include a current employer of the first user. The level of connection of the first user in the network may include a connection of a first profile for the first user with at least one of a second profile of the second user and a group in the network. Access to at least a portion of the network may be available to at least one of the first user and a second user based upon, at least in part, one or more attributes of the first user. The removal of at least a portion of the access to the at least the portion of the network from at least one of the first user and the second user may be based upon, at least in part, determining the change in the attribute of the one or more attributes of the first user. The computer system may include a virtual agent for at least one of monitoring and controlling the operations.

In another example implementation, a computer program product may reside on a computer readable storage medium having a plurality of instructions stored thereon which, when executed across one or more processors, may cause at least a portion of the one or more processors to perform operations that may include but are not limited to identifying a first user in a network. Access to at least a portion of a network is available to the first user based upon, at least in part, one or more attributes of the first user. A determination, by the one or more computing devices, may be made that a change in an attribute of the one or more attributes of the first user. The removal of at least a portion of the access to at least a portion of the network from the first user may be removed, based upon, at least in part, the determination of the change in the attribute of the one or more attributes of the first user.

The computer program product may perform operations that may include but are not limited to one or more of the following example features. A prompt may be provided to at least one of the first user and the second user to remove at least the portion of the access to at least the portion of the network based upon, at least in part, determining the change in the attribute of the one or more attributes of the first user. A determination of the change in the attribute may include receiving a notification of the change. An attribute may include at least one of a status of the first user in the network and a level of connection of the first user in the network. The level of connection of the first user to the second user in the network may be automatically changed based upon, at least in part, determining the change in the attribute of the one or more attributes of the first user. The status of the first user in the network may include a current employer of the first user. The level of connection of the first user in the network may include a connection of a first profile for the first user with at least one of a second profile of the second user and a group in the network. Access to at least a portion of the network may be available to at least one of the first user and a second user based upon, at least in part, one or more attributes of the first user. The removal of at least a portion of the access to the at least the portion of the network from at least one of the first user and the second user may be based upon, at least in part, determining the change in the attribute of the one or more attributes of the first user.

In one example implementation, a method, performed by one or more computing devices, may include but is not limited to identifying a characteristic of a communication of one or more communications on one or more communication channels. Access to at least a portion of the communication may be restricted. The characteristic of the communication on the one or more communication channels may be compared with a predetermined communication rule. A determination may be made that the characteristic of the communication on the one or more communication channels correlates to the predetermined communication rule. At least a portion of the restriction to access at least the portion of the communication may be removed based upon, at least in part, the correlation to the predetermined communication rule.

One or more of the following example features may be included. The characteristic of the communication on the one or more communication channels may include a predetermined timespan when the communication occurs. The characteristic of the communication on the one or more communication channels may include a predetermined topic. The identification the characteristic of the communication on the one or more communication channels may include one or more of voice analysis and text analysis. The removal of at least the portion of the restriction to access at least the portion of the communication may include enabling access to at least the portion of the communication by a third party. The removal of at least the portion of the restriction to access at least the portion of the communication may include enabling archiving of at least the portion of the communication. The removal of at least the portion of the restriction to access at least the portion of the communication may include enabling access to at least one of a second portion of the communication and a second communication of the one or more communications.

In another example implementation, a computing system may include one or more processors and one or more memories configured to perform operations that may include but are not limited to identifying a characteristic of a communication of one or more communications on one or more communication channels. Access to at least a portion of the communication may be restricted. The characteristic of the communication on the one or more communication channels may be compared with a predetermined communication rule. A determination may be made that the characteristic of the communication on the one or more communication channels correlates to the predetermined communication rule. At least a portion of the restriction to access at least the portion of the communication may be removed based upon, at least in part, the correlation to the predetermined communication rule.

The computer system may perform operations that may include one or more of the following example features. The characteristic of the communication on the one or more communication channels may include a predetermined timespan when the communication occurs. The characteristic of the communication on the one or more communication channels may include a predetermined topic. The identification the characteristic of the communication on the one or more communication channels may include one or more of voice analysis and text analysis. The removal of at least the portion of the restriction to access at least the portion of the communication may include enabling access to at least the portion of the communication by a third party. The removal of at least the portion of the restriction to access at least the portion of the communication may include enabling archiving of at least the portion of the communication. The removal of at least the portion of the restriction to access at least the portion of the communication may include enabling access to at least one of a second portion of the communication and a second communication of the one or more communications. The computer system may include a virtual agent for at least one of monitoring and controlling the operations.

In another example implementation, a computer program product may reside on a computer readable storage medium having a plurality of instructions stored thereon which, when executed across one or more processors, may cause at least a portion of the one or more processors to perform operations that may include but are not limited to identifying a characteristic of a communication of one or more communications on one or more communication channels. Access to at least a portion of the communication may be restricted. The characteristic of the communication on the one or more communication channels may be compared with a predetermined communication rule. A determination may be made that the characteristic of the communication on the one or more communication channels correlates to the predetermined communication rule. At least a portion of the restriction to access at least the portion of the communication may be removed based upon, at least in part, the correlation to the predetermined communication rule.

The computer program product may perform operations that may include but are not limited to one or more of the following example features. The characteristic of the communication on the one or more communication channels may include a predetermined timespan when the communication occurs. The characteristic of the communication on the one or more communication channels may include a predetermined topic. The identification the characteristic of the communication on the one or more communication channels may include one or more of voice analysis and text analysis. The removal of at least the portion of the restriction to access at least the portion of the communication may include enabling access to at least the portion of the communication by a third party. The removal of at least the portion of the restriction to access at least the portion of the communication may include enabling archiving of at least the portion of the communication. The removal of at least the portion of the restriction to access at least the portion of the communication may include enabling access to at least one of a second portion of the communication and a second communication of the one or more communications.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 36 is an example flowchart of a social engineering attack defense process according to one or more example implementations of the disclosure;

Like reference symbols in the various drawings indicate like elements.

DETAILED DESCRIPTION

Figure 1:
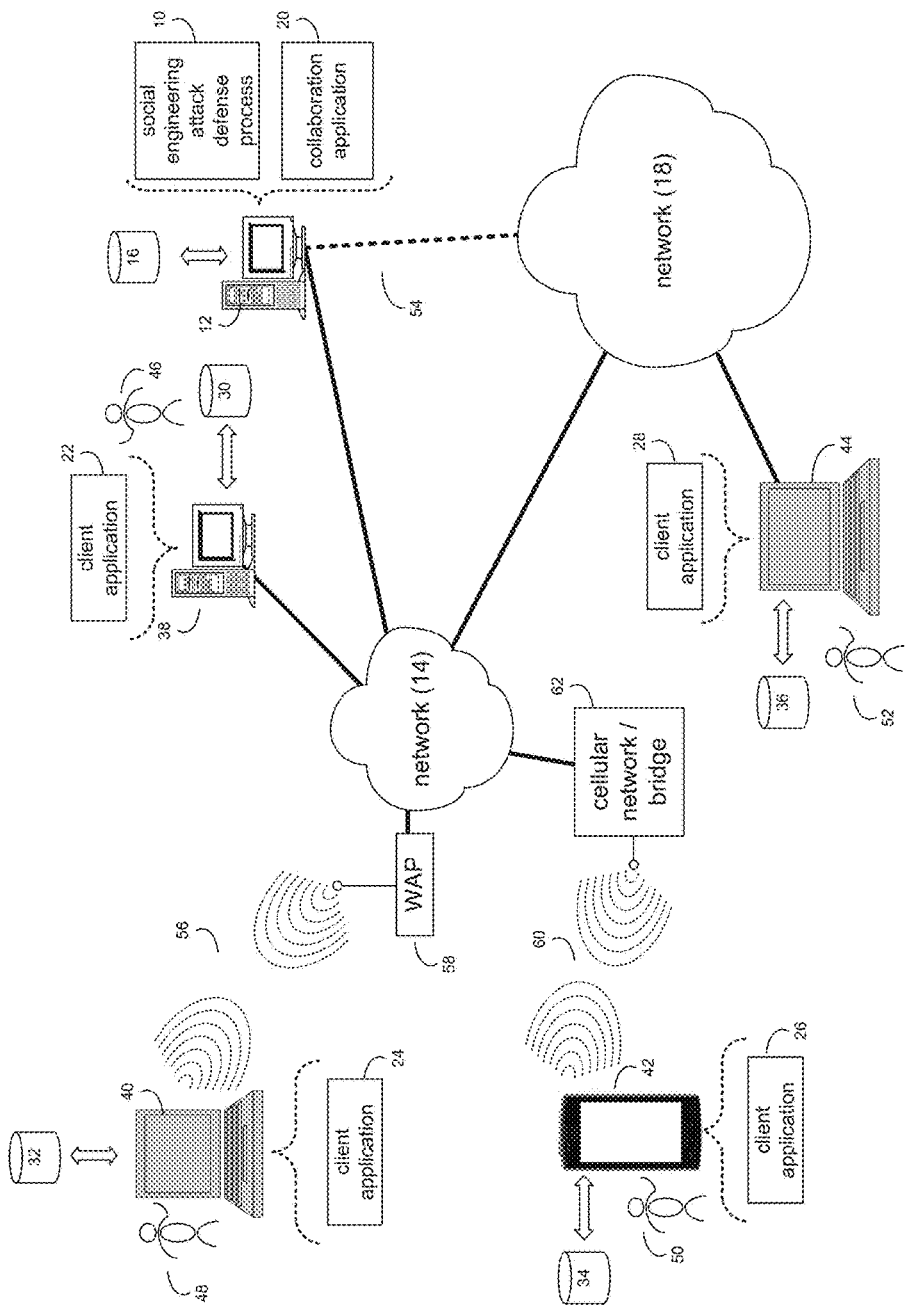
FIG. 1 is an example diagrammatic view of a social engineering attack defense process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by, or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by, or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products, according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown a social engineering attack defense process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a social engineering attack defense process, such as social engineering attack defense process 10 of FIG. 1, may include but is not limited to identifying potential social engineering activity associated with one or more communications on a first communication channel of a plurality of communication channels. Restriction of at least partial access to at least a second communication channel of the plurality of communication channels may be requested based upon, at least in part, the identification of the potential social engineering activity associated with the one or more communications on the first communication channel.

In some implementations, the instruction sets and subroutines of social engineering attack defense process 10, which may be stored on storage device, such as storage device 16, coupled to computer 12, may be executed by one or more processors (not shown) and one or more memory architectures included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, social engineering attack defense process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a communication application (e.g., communication application 20), examples of which may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, a social messaging application, an encrypted chat application, an email application, an enterprise messaging application, a unified communication application, a walkie-talkie or asynchronous voice message application, a virtual reality application, communication via virtual avatars, an augmented reality application, a telepresence application, or other application that allows for virtual meeting and/or remote communication. In some implementations, social engineering attack defense process 10 and/or communication application 20 may be accessed via one or more of client applications 22, 24, 26, 28. In some implementations, social engineering attack defense process 10 may be a standalone application, or may be an applet/ application/mobile app/script/extension that may interact with and/or be executed within communication application 20, a component of communication application 20, and/or one or more of client applications 22, 24, 26, 28. In some implementations, communication application 20 may be a standalone application, or may be an applet/application/ mobile app/script/extension that may interact with and/or be executed within social engineering attack defense process 10, a component of social engineering attack defense process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of social engineering attack defense process 10 and/or social engineering attack defense communication application 20. Examples of client applications 22, 24, 26, 28 may include, but are not limited to, e.g., a web conferencing application, a video conferencing application, a voice-over-IP application, a video-over-IP application, an Instant Messaging (IM)/"chat" application, a short messaging service (SMS)/ multimedia messaging service (MMS) application, or other application that allows for virtual meeting and/or remote communication, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/ data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

In some implementations, one or more of client applications 22, 24, 26, 28 may be configured to effectuate some, or all, of the functionality of social engineering attack defense process 10 (and vice versa). Accordingly, in some implementations, social engineering attack defense process 10 may be a purely server-side application, a purely client-side application, or a hybrid server-side/client-side application that is cooperatively executed by one or more of client applications 22, 24, 26, 28 and/or social engineering attack defense process 10.

In some implementations, one or more of client applications 22, 24, 26, 28 may be configured to effectuate some or all of the functionality of communication application 20 (and vice versa). Accordingly, in some implementations, communication application 20 may be a purely server-side application, a purely client-side application, or a hybrid server-side/client-side application that is cooperatively executed by one or more of client applications 22, 24, 26, 28 and/or communication application 20. As one or more of client applications 22, 24, 26, 28, social engineering attack defense process 10, and communication application 20, taken singly or in any combination, may effectuate some or all of the same functionality, any description of effectuating such functionality via one or more of client applications 22, 24, 26, 28, social engineering attack defense process 10, communication application 20, or combination thereof, and any described interaction(s) between one or more of client applications 22, 24, 26, 28, social engineering attack defense process 10, communication application 20, or combination thereof to effectuate such functionality, should be taken as an example only and not to limit the scope of the disclosure.

In some implementations, one or more of users 46, 48, 50, 52 may access computer 12 and social engineering attack defense process 10 (e.g., using one or more of client electronic devices 38, 40, 42, 44) directly through network 14 or through secondary network 18. Further, computer 12 may be connected to network 14 through secondary network 18, as illustrated with phantom link line 54. Social engineering attack defense process 10 may include one or more user interfaces, such as browsers and textual or graphical user interfaces, through which users 46, 48, 50, 52 may access social engineering attack defense process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/ CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
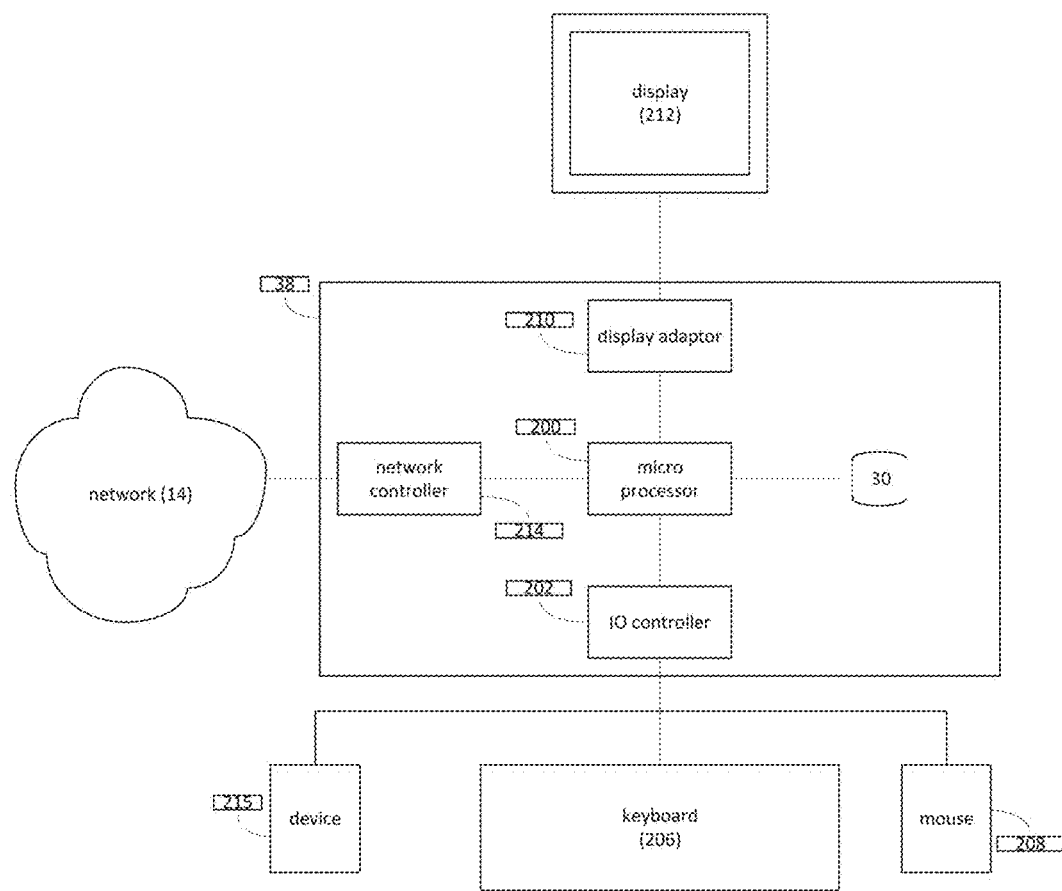
FIG. 2 is an example diagrammatic view of a client electronic device of FIG. 1 according to one or more example implementations of the disclosure.
Figure 3:
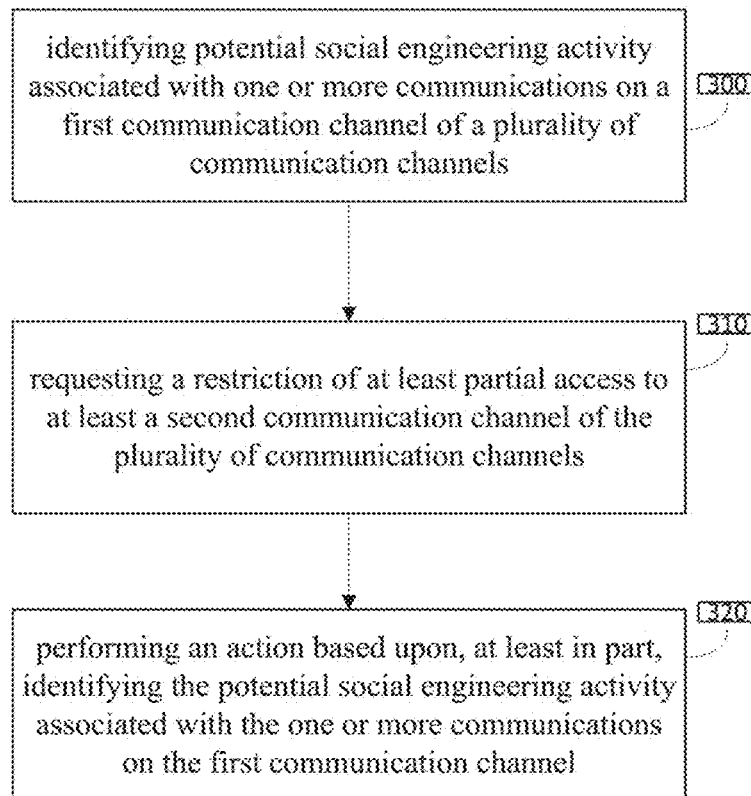
FIG. 3 is an example flowchart of a social engineering attack defense process according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, social engineering attack defense process 10 may be substituted for client electronic device 38 (in whole or in part) within FIG. 2, examples of which may include but are not limited to computer 12 and/or one or more of client electronic devices 38, 40, 42, 44.

In some implementations, client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touch-screen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As will be discussed below, in some implementations, social engineering attack defense process 10 may at least help with the improvement of computer-related technology (e.g., cyber security), in order to overcome problems specifically arising in such realm.

Techniques to defend against social engineering attacks may be mostly focused on employee level defense techniques. These techniques may involve the training of employees in security protocols relevant to their position, e.g., in situations of phishing, an employee is trained not to open unknown documents. Further, defense techniques may focus on identification and handling of sensitive information and its exposure to breakdowns in security systems.

The above techniques may be dependent upon human involvement and, thus may be subject to human error. For example, in the case of a corporate computer (enterprise) network, the defense against a phishing attack may be dependent upon all the employees remembering their social engineering training, assuming there was such training, and acting defensively. It may take only one employee to not act defensively to allow potential damaging software within the company network. Further, if that employee has access to sensitive information, the above techniques to secure such sensitive information may be ineffective.

The Social Engineering Attack Defense Process:

As discussed above and referring also at least to the example implementation of FIGS. 3-8, social engineering attack defense process 10 may identify 300 potential social engineering activity associated with one or more communications on a first communication channel of a plurality of communication channels. Social engineering attack defense process 10 may request 310 a restriction of at least partial access to at least a second communication channel of the plurality of communication channels based upon, at least in part, the identification of the potential social engineering activity associated with the one or more communications on the first communication channel.

In some implementations, a communication may be, e.g., a forward, backward and/or sideways flow of information and may include any form of communication, including audio-based, e.g., phone call, and text computer-based, e.g., email. It will be appreciated that any other known types of communication may also be used without departing from the scope of the present disclosure. In some implementations, a communication channel may refer to the way this information flows, e.g., electronic mail system, VoIP system, social media network, or any other system or network which communications can flow.

In some implementations, the requested 310 restriction by social engineering attack defense process 10 may include, but is not limited to, disabling email and/or network resource access of individual targeted by a potential social engineering attack. The disabling of email/network access may be complete disablement of all access or may be limited to only a specific group of individuals, such as those individuals who do not have a sufficiently high level of trust with the targeted individual. This may allow the targeted individual to be partially quarantined from highly valuable network resources such as company servers (e.g., targeted individual is blocked from access to company servers) and personnel but not have their day-to-day work inhibited. Personnel may have their access to sensitive network resources (but not necessarily all network resources) disabled.

Internal trust may be based on technical knowledge, experience, organizational authority, seniority, or based on specific access rights and permissions conferred by a directory service. Trust of external entities may be based on degree of social connection, existence or frequency of past communication, level of verification of identity, digital signatures and external authentication, social authentication, authentication by a recognized $3^{rd}$ party or partner company, or by explicit authorization on the part of an employee.

Some partial examples of trust levels and resulting restrictions are:

a. External entity triggers high threat profile and is completely barred from communicating with any internal personnel. Internal personnel who have received communications from this entity are likewise shut out of all services until the threat is analyzed by information technology (IT) security personnel.

b. Potentially targeted personnel have read-only access to various resources, for example, can only read (not modify) network information, and can only read (not send) emails.

c. Potentially targeted personnel are restricted from global address books and unable to send email to executives or senior executives, but can send email in their local group. This helps defend against social engineering and phishing.

d. Potentially targeted personnel are prevented from accessing what are deemed sensitive or secure files. For instance, access to network shares could be completely disabled, or existing levels of access that the user might have (such as finance, accounting, engineering, plans, etc.) are selectively disabled. In general, access may be prevented to information that the user does not usually access which would be sensitive if leaked.

e. Any files that targeted personnel cannot usually access are automatically restricted.

f. Potentially targeted personnel are prevented from using telephony, VoIP, messaging, apps, or other services, and are prevented at the firewall and border security systems. Rather than shutting off services, these systems shut off specific packet and port access via network security enforcement.

g. Potentially targeted personnel are prevented from using specific applications on their mobile devices via mobile device management. Services are temporarily de-provisioned so their devices, while still operating on a basic level (phone/email), have for instance virtual private network (VPN) disabled, or specific applications disabled (e.g., disable Salesforce™, SAP®, custom enterprise applications, etc.)

h. User certificates are disabled, or temporarily swapped for certificates with different access, to prevent a social attacker from using the user's access permissions to cause harm.

Social engineering attacks may be hard to detect except by people trained in recognizing them, forensically after the fact, for example. Social engineering attack defense process 10 may be capable of identifying known or suspected malicious activities and timely neutralizing such attacks.

In some implementations, social engineering attack defense process 10 may receive a communication on a first communication channel. The communication may be any known type of communication, such an email, video message, text message or phone call. While the example implementation is directed towards a single communication, those skilled in the art will recognize that multiple communications received along the same communication channel may be within the scope of the present invention.

In some implementations, social engineering attack defense process 10 may identify 300 potential social engineering activity associated with one or more communications on a first communication channel of a plurality of communication channels. For example, social engineering attack defense process 10 may identify 300 the received communication to determine if the received communication is a potential social engineering attack.

Figure 5:
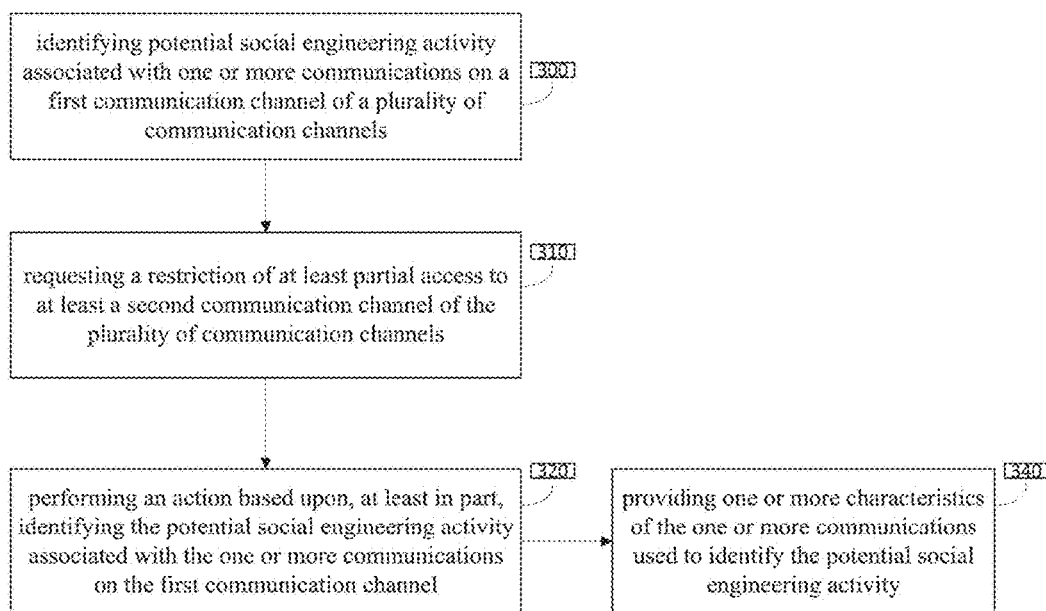
FIG. 5 is an example flowchart of a social engineering attack defense process according to one or more example implementations of the disclosure.

In some implementations, as shown in example FIG. 5, the identification 300 by social engineering attack defense process 10 (also referred to as process 10) may include providing 340 one or more characteristics used to identify the source of the communication and the likelihood of a potential social engineering attack. Since the determination of whether a communication is a social engineering attack is based, at least in part, on prior attacks, by utilizing the characteristics of the communication, the ability of social engineering attack defense process 10 to accurately determine if the communication is a social engineering attack increases. These characteristics may include, if available, a transcript of the communication session, the source of the communication, caller ID information, the dialed phone number, the identity of the caller if voice-printed; the IP address of the source of the communication, if the communication is digital; related emails or other communications that have been linked to this communication session if it is part of a series; transcripts of earlier emails or calls from this same source earlier than this call; a summary of items requested and emails and outgoing communications the victim has already unwittingly provided.

In the example case of a digital message, the following example partial list of characteristics may be used to identify a potential social engineering attack: the IP address of the source, prior email messages and/or communications linked to that IP address, information or items requested in the message, e.g., passwords, selection of links, and prior outgoing communications to the source by the receiving person or other persons. For example, a social engineering attacker via a computing device may send an email to user 46. Social engineering attack defense process 10 may then identify the IP address of the attacker and may compare it to a datastore of IP addresses (or other example combinations of characteristics) that might be malicious or contribute the address to a $3^{rd}$ party data store. The datastore of potentially malicious IP addresses may be built by company administrators based on company internal knowledge of potential malicious IP addresses or the datastore of potentially malicious IP addresses may be received from a third party source that tracks and records malicious IP addresses and universal resource locators (URLs) in real time based on emerging threats. Social engineering attack defense process 10 may identify 300 potential social engineering activity based upon the IP address of an attacker matching an IP address in the datastore. In the case of a phone call, identifying characteristics may include the caller ID and the past communication relating to this caller ID. For example, a social engineering attacker via a digital phone line, i.e. a VoIP phone call, places a call to user 46. Social engineering attack defense process 10 may identify the caller ID of the attacker and may compare it to a datastore of IP addresses that might be malicious. Social engineering attack defense process 10 may identify 300 potential social engineering activity based upon the caller ID of an attacker matching a caller ID in the datastore. These lists of characteristics are merely examples and are not meant to be limiting. Those skilled in the art will recognize that any characteristic (or combinations thereof) that may be used to identify 300 a communication as a potential social engineering attack is within the scope of the present disclosure.

Figure 6:
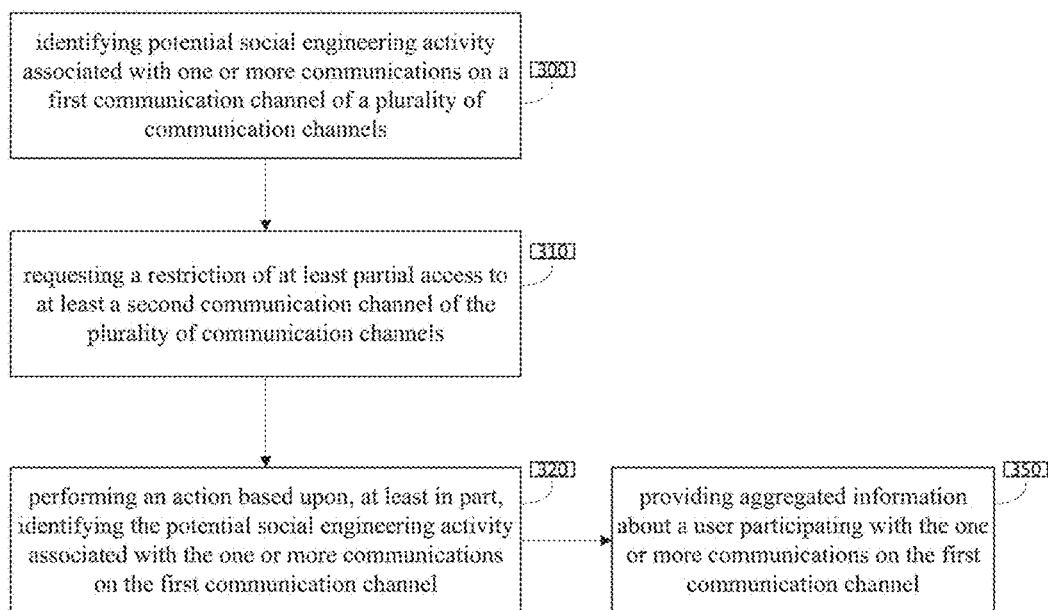
FIG. 6 is an example flowchart of a social engineering attack defense process according to one or more example implementations of the disclosure.

In some implementations, as shown in example FIG. 6, the identification 300 by social engineering attack defense process 10 may include providing 350 aggregated information about a user participating with the one or more communications on the first communication channel. Aggregated information about the user may include any information that may assist in the identification 300 of the potential social engineering attacks. This aggregated information may include, e.g., biographical information about the user, the level of access to network resources, and other information such as the user's job description, job duties, length of employment, where the user is geographically located, the user's native language, whether the user recently changed jobs, whether the user was recently promoted, the user's supervisor and any direct reports, whether the user is a member of any projects groups with the company, any changes of status, etc. This information can be used to detect both potential attackers, potential targets, and potential intermediaries.

For instance, biographical information can be analyzed for inconsistencies. Malicious attackers may create sloppy or incomplete or inconsistent social network profiles (e.g., profiles on LinkedIn®) or online profiles on other social networking or professional sites. Also, an ordinary user might have traces of biographical information on various common sites whereas a malicious user will have well maintained but thin records online (such as only a LinkedIn® profile but no other social network profiles). The user may have created their biographical profile recently or the user may have recently created most of the biographical information (e.g., "recently" may be defined on the order of days or weeks). Third party services may be used to analyze and validate or authenticate biographical information as similarly done with hiring processes for companies. Automated systems may be used to verify school and employment records with online databases in real-time to compare against the potentially malicious user's presented biographical information. Some trustworthy individuals rarely update their online profiles (e.g., because they are not looking for a new job) where some malicious profiles may be well-maintained. The duration of the profile's existence and the verifiability of the information therein may be used to determine a greater or lesser degree of trust for a user.

A user's job description may be used as an indicator of how likely it is to be used as an attacker, attack intermediary, or target. For instance, executives of a public company may be useful attack targets. Mid-level managers or rank-and-file personnel at a public company may be considered useful attack intermediaries. However, a hastily prepared profile for a supposed obscure executive (e.g., the hastily prepared profile that falsely represents to be an executive in an overseas branch) may indicate that the profile is setup by a malicious attacker. Information such as the duties listed in the job description on a social network site may be used to determine what is being sought. For example, if a company develops a line of products around WiFi™ mesh networking, a malicious attacker may include some similar experience in their profile to try to create familiarity and affinity, but other aspects of the malicious attacker's profile may identify them as a threat.

Conversely, for intermediaries and targets, the user's information such as their seniority, work experience, job description, duties, location, etc. may be used to determine how likely they are to be targeted. For example, if a company is rumored to be working on a secret (e.g., new form of WiFi™ mesh networking), an employee who lists this information on their public profile may open themselves up as a target for future attacks. Similarly, an executive who lists 15 years at a company, while likely to know many people, may be a possible intermediary or target for malicious activity. Similarly, a manager or executive at a company with copious endorsements and direct links to other personnel in company might become a target in an effort to be used as a helpful "connector" to other employees. Participation in standard groups, online groups, and other membership affinities, as well as frequency or type of status update may be used to determine for example whether a user is active with their profile and active with external communications and thus may be considered a likely target. Also, these types of users may be likely to believe, for instance, an incoming communication purporting to come from someone they know in the standards group is actually malicious. Analysis of profiles (e.g., profiles on social network sites) may determine their likelihood of being targeted.

One of ordinary skill in the art (e.g., within information security field) may be aware of other additional factors in an online profile that would make it suspicious as a potential malicious profile (e.g., disingenuous profile). Similarly, one of ordinary skill in the art may identify factors which make an employee a good target (e.g., high communication frequency but limited technical skill). Lists of rules such as conditional rules may be generated from know-how and experience of security individuals and may be built into the system to activate based on information extracted from internal databases as well as private and public online profiles in order to detect susceptible targets and potential malicious attackers.

In some implementations, social engineering attack defense process 10 may request 310 a restriction of at least partial access to at least a second communication channel of the plurality of communication channels based upon, at least in part, the identification of the potential social engineering activity associated with the one or more communications on the first communication channel. For example, once a communication has been identified 300 as a potential social engineering attack, social engineering attack defense process 10 may request 310 at least a portion of a second communication channel to be restricted. As the goal of social engineering attacks may be to gain access to information located within a computer network or to gain control over the computer network, restriction of at least partial access to at least a second communication channel may limit possible damage to a computer network by temporarily disabling or limiting the amount or methods of access to targeted network resources. For example, the social engineering attack defense process 10 may limit the ability of the attacker and the attacker's target to cause further damage.

Examples of such restrictions may include, e.g., disabling a person's email, or restricting the email to "read only" in the event of a potential phishing attack; access to sensitive network resource, but not necessarily all network resources disabled; disable some or all plugins or links to limit communication with social networks, e.g. Twitter, LinkedIn, Facebook, to limit dissemination of any viral information; limit ability to make external phone calls, messages; or beginning to monitor all ongoing communications in real time for potential social engineering attacks.

For example, social engineering attack defense process 10 may identify an email sent via a computing device to user 46 as a potential social engineering attack. Social engineering attack defense process 10 requests 310 the email of user 46 to be made "read only." This restriction may allow user 46 to continue to perform assigned job duties while preventing user 46 from responding to the email message.

In some implementations, social engineering attack defense process 10 may perform 320 an action based upon, at least in part, identifying 300 the potential social engineering activity associated with the one or more communications on the first communication channel.

Figure 4:
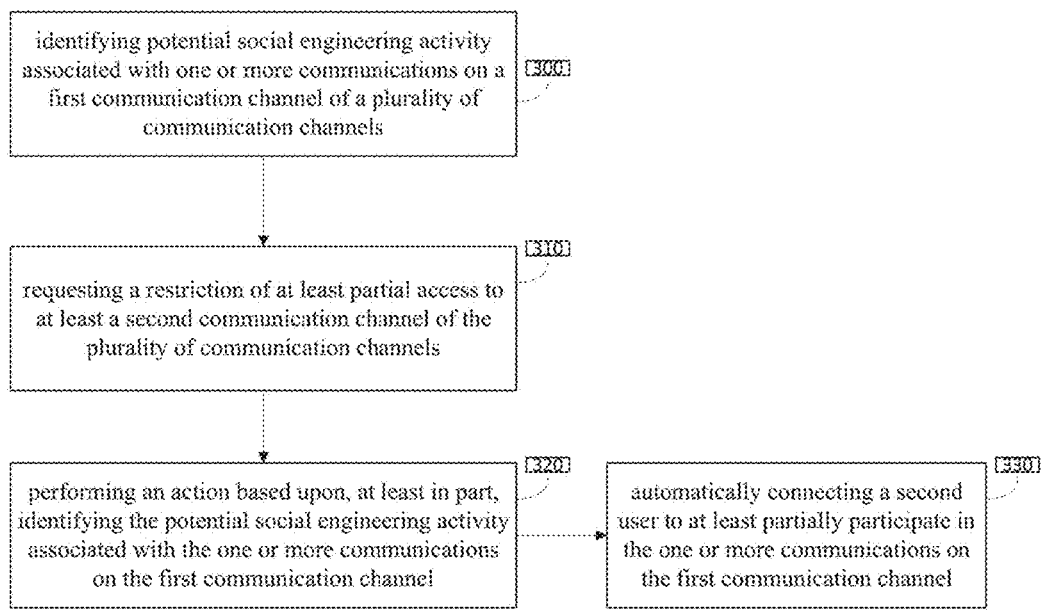
FIG. 4 is an example flowchart of a social engineering attack defense process according to one or more example implementations of the disclosure.

In some implementations, as shown in example FIG. 4, the action which is performed 320 by social engineering attack defense process 10 may include automatically connecting 330 a second user to at least partially participate in the one or more communications on the first communication channel. In some implementations, the second user (e.g., user 52) may be connected to the one or more communications to assist (e.g., confirm) with the identification of those communications as potential social engineering attacks. The second user may be trained in the recognition of human and automated social engineering attacks. Thus, in the example, the trained second user may be better able to confirm whether the potential social engineering activity identified 300 by social engineering attack defense process 10 is in fact a social engineering activity, which may be more difficult to do by the average employee or person that is unable to keep up with the sophistication level of social engineering attacks.

In one example, this implementation may operate as follows: A user (e.g., user 46) may receive a communication on any communication channel monitored by social engineering attack defense process 10 and identified 300 as potential social engineering activity that triggers an alert. The communication may be a stream-based communication such as real time audio, video chat, or text messaging or a store and forward-type communication such as email. The second user may then be automatically connected 330 by social engineering attack defense process 10 to the communication. The second user (e.g., user 52) may be automatically connected 330 to the communication as, e.g., a full participant or in a limited role, such as in a listen only basis.

The second user (e.g., automatically and/or manually via social engineering attack defense process 10) may take various actions based on the communication and the second user's training and knowledge of social engineering attacks. In some implementations, these actions may include, e.g., social engineering attack defense process 10, e.g., terminating the communication, restricting access (e.g., of user 46) to network resources, contacting user 46 (e.g., via email, text, pop-up window, etc.) to inform the user the communication is a potential social engineering attack, recording information, such as a voice print and verbal tactics about the attack for future detection of attacks by comparison, as well as determining that the communication was not a threat, thus allowing the communication to continue and terminating the second user's participation and connection to the communication.

For example, social engineering attack defense process 10 may identify 300 potential social engineering activity within a text messaging communication session between user 46 and a third party. Social engineering attack defense process 10 may perform 320 the action of automatically connecting 330 user 52 to the text messaging session. If the text message session is determined to be a malicious social engineering attack, social engineering attack defense process 10 may take various actions including terminating the text message session. For example, the social engineering attack defense process 10 may intercept the text message session and prevent the session from being transmitted to the user 46. The social engineering attack defense process 10 may temporarily de-provision the chat application (e.g., use mobile device management (MDM) to disable chat application such as WhatsApp® for the user's mobile device), log the user out of a chat system, disable packet stream for a mobile application (e.g., on a VPN or firewall or virtual local area network (VLAN) circuit, or other private network), disable a user's password temporarily for a current or future chat session, block communication between users if the social engineering attack defense process 10 has access to the chat system, disable device (e.g., laptop or smartphone) such as by logging the user out of a domain, inhibit communication at a carrier level (by e.g., de-provisioning service directly with telephone company (telco) or wireless carrier through a communication from the enterprise to that carrier—e.g., company tells service provider to disable SMS), or take another technical action to disable ongoing communication.

Figure 7:
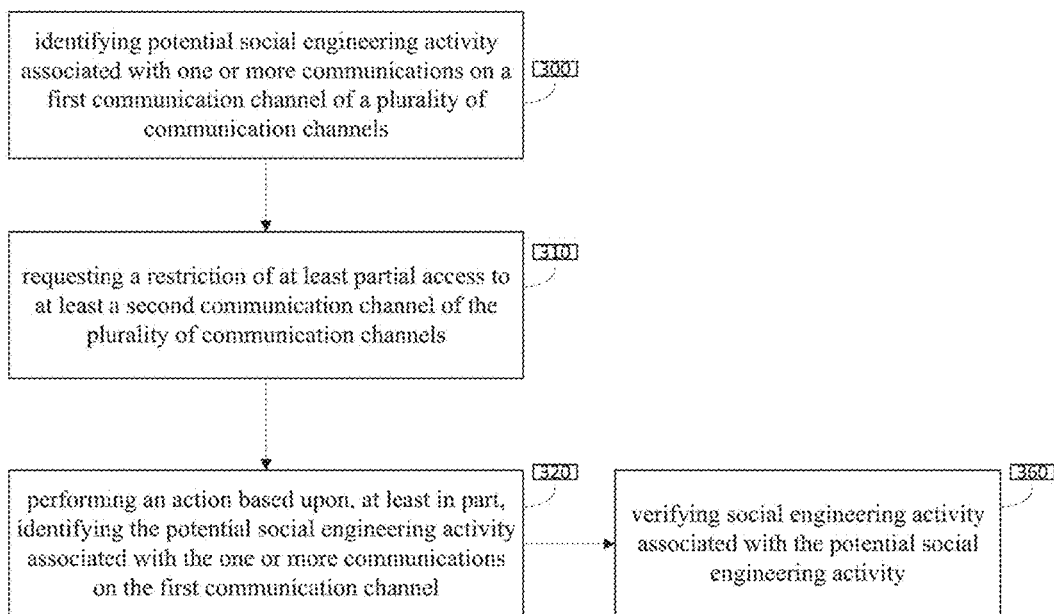
FIG. 7 is an example flowchart of a social engineering attack defense process according to one or more example implementations of the disclosure.

In some implementations, as shown in example FIG. 7, social engineering attack defense process 10 may perform the action of verifying 360 social engineering activity associated with the potential social engineering activity. Verification may be based on information obtained during the communication, and may occur during the communication, or after the end of the communication. In some implementations, the verification may occur during the communication to provide real time protection to network resources and information. The verification may be performed manually by a human operator (e.g., via social engineering attack defense process 10), such as the second user as set above. Further, verification may also be performed automatically (and/or via prompting) by social engineering attack defense process 10. In some implementations, in the event that further verification is performed, information such as voice print, source number, sequence of communications, etc. positively identifying the communication as suspicious obtained during the communication may be analyzed by social engineering attack defense process 10 using, e.g., a machine learning algorithm, a pattern matching system, or a lookup table of the source attacker information. For example, social engineering attack defense process 10 may identify e.g., voice print of communication, source number of communication, or sequence of communication that corresponds with a suspicious type of communication. For example, social engineering attack defense process 10 may identify that the sequence of communications in the transcript of the communication corresponds to an attacker trying to extract proprietary company information. The social engineering attack defense process 10 may identify that a communication has anomalies or inconsistencies that indicate that a caller is being dishonest or caller is asking for information that should not be provided on the communication line being used. The social engineering attack defense process 10 may also identify whether voice matches the voice of an ex-employee or known social engineer. The social engineering attack defense process 10 may also identify if the voice is being masked or altered such as with a digital voice-altering system. The social engineering attack defense process 10 may determine if the source of the communication is from a known bad location or unexpected location (e.g., a call received from a remote or foreign IP address) that should be domestic or the location of the communication is from an IP address commonly used to proxy overseas traffic.

If there is sufficient matching of previous social engineering attack data with the current communication by social engineering attack defense process 10, the communication may be verified (via social engineering attack defense process 10) as a social engineering attack, which may lead to social engineering attack defense process 10 taking defensive actions.

Figure 8:
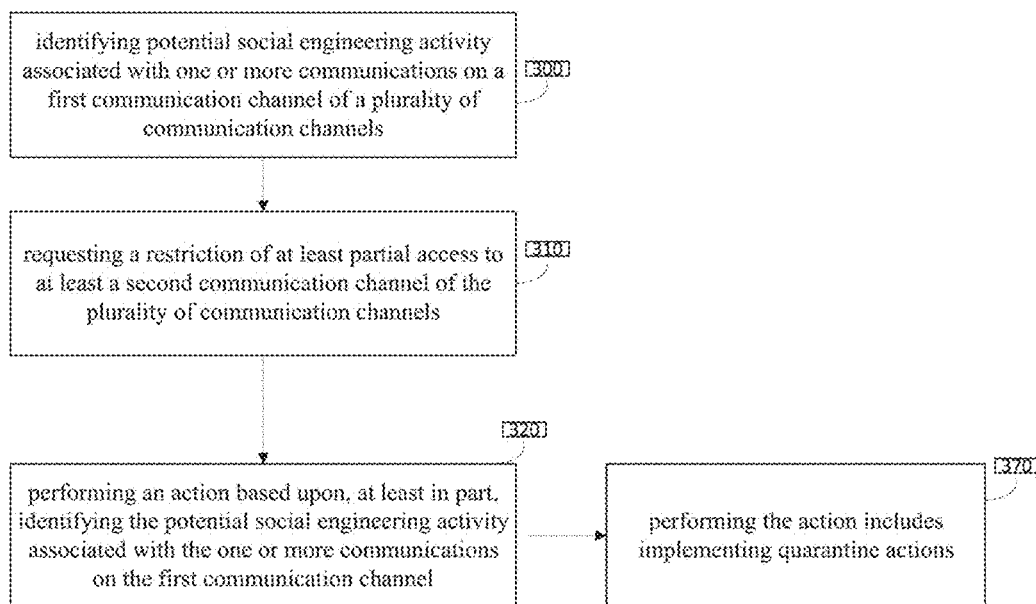
FIG. 8 is an example flowchart of a social engineering attack defense process according to one or more example implementations of the disclosure.

In some implementations, as shown in example FIG. 8, social engineering attack defense process 10 may perform the action of implementing 370 quarantine actions. Once a communication has been identified 300 to be a social engineering attack (and/or a potential social engineering activity), the user and/or the communication (e.g., email), may be quarantined. Social engineering attack defense process 10 may quarantine the email by, e.g., deleting email or transferring email to a quarantine folder that does not delete the email but removes any attachments and neutralizes the ability for the attachments to be executed. The social engineering attack defense process 10 may also make this type of quarantined communication only accessible to authorized information technology (IT) personnel who are trained or authorized to evaluate the threat. Social engineering attack defense process 10 may quarantine the user by, e.g., limiting or disabling access to documents, resources, communication channels, etc. The quarantine may be enacted by, e.g., temporarily accessing and changing user permissions under a type of user authorization list or other type of user list. The quarantine may also be enacted by changing the permissions of the quarantined file itself or changing user permission levels with respect to an application (e.g., by de-activating certain features of the application or enforcing a whitelist and/or a blacklist of who a user is authorized to communicate with). The communication may be quarantined by actions to neutralize any harmful effects, such as removing it off network systems and rendering any web link therein ineffective.

In some implementations, social engineering attack defense process 10 may include a virtual agent for at least one of monitoring and controlling one or more of the operations described throughout. For example, social engineering attack defense process 10 may include combining quarantine/disablement features with a virtual proctor (e.g., specialized/secure virtual agent). The virtual agent may be used to monitor and/or control all of the operations and steps of the social engineering attack defense process 10 as described in the sections above and below. For example, when a potential threat is identified by the social engineering attack defense process 10, the process 10 may combine quarantine/disablement activities with the virtual agent that may analyze the threat situation, and take appropriate additional actions (e.g. send warnings and/or grab/copy transaction history for any person involved in the communication such as the purported attacker that caused the threat and any person who receives the threat, etc.) that may be triggered by social engineering attack defense process 10 as a defense response. The social engineering attack defense process 10 may continue to forward trusted communications to the intended recipient or may direct them to the virtual agent during the defense response. In examples, the social engineering attack defense process 10 may invoke the virtual agent to analyze and supervise all communications relating to the purported threat, attack, or breach of security.

In addition to inbound functionality, the social engineering attack defense process 10 may also provide outbound functionality. Inbound functionality may refer to inbound activities by the social engineering attack defense process 10 such as inbound analysis and verification, interception (e.g., taking a user off line), or adding the virtual agent to aid with monitoring of potential attacks, interception of potential attacks, and responding to potential attacks. Outbound functionality by the social engineering attack defense process 10 may include outbound activities such as pinging a suspected attack vector from a safe/quarantined source to gauge the suspected attack vector's response. The social engineering attack defense process 10 may take counter measures e.g., probe tests, electronic counter measures, isolation techniques such as offensive isolation techniques, etc. In examples, the social engineering attack defense process 10 may notify a service provider such as an Internet service provider (ISP), cloud service provider, telephony carrier, etc. that the suspected attack vector is performing malicious activity or non-permitted activity. Then, the social engineering attack defense process 10 requests the shutdown of external services based on this malicious activity (e.g., by requesting service provider authorization to shut down the attack vector or by electronically filing a complaint or notice with the provider of service to the attack vector). Outbound pinging to attack vectors may also allow the social engineering attack defense process 10 to analyze data related to potential attacks. In examples, the virtual agent may be used to control, direct, or implement the outbound functionality as well as the inbound functionality of the social engineering attack defense process 10.

The Omnichannel Social Engineering Attack Avoidance Process:

In some implementations, social engineering attacks may take the form of an omnichannel attack. An omnichannel attack may generally be described as when two or more communication channels are used to perpetuate the attack. In some circumstances, the correlation of incoming communications across multiple channels may be the most efficient way to determine that a series of related communications are malicious, where a single communication across a single channel may be inconclusive. The patterns of these types of attacks may include utilizing two types of communication over two different communication channels. An attacker may wage a campaign of building up trust with an employee through one type of communication, e.g., text message, voice message, etc. After building up the trust with the employee, the attacker may convince the employee to take an action through another communication channel, e.g., email, etc., that may expose the employee and the company to malicious activity. For example, an attacker may wage a campaign designed to build up trust between the attacker and an employee by impersonating someone else or by establishing false credentials through the use of text messages. After sufficient trust has been built up between the attacker and the employee, the attacker may convince the employee to open a document that has been attached to an email or to forward the email to another employee in order to allow the attacker to have access to confidential information about the company.

Figure 9:
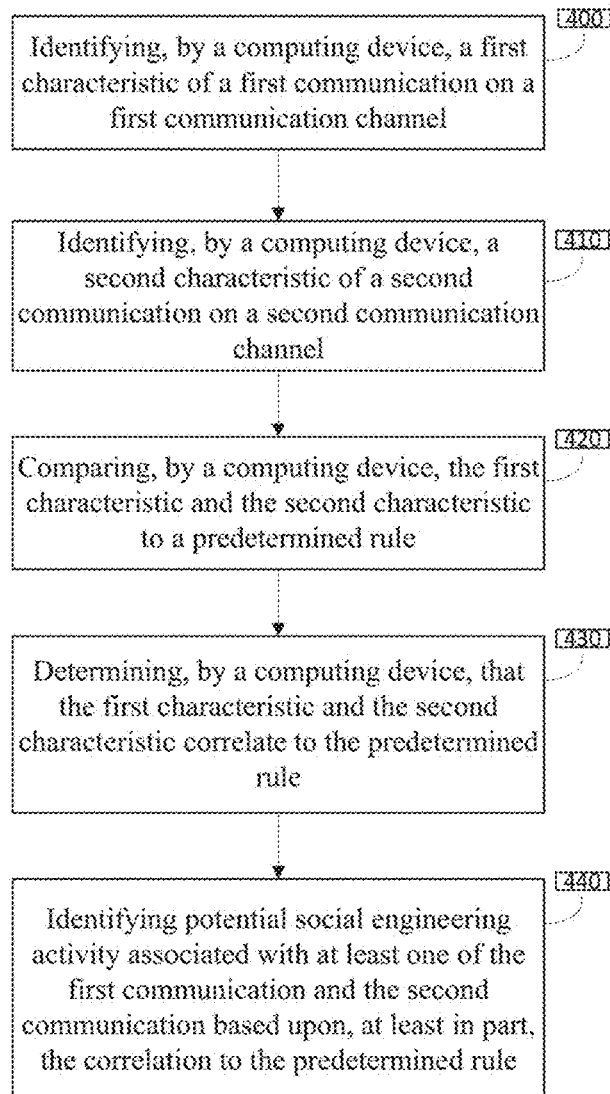
FIG. 9 is an example flowchart of a social engineering attack defense process according to one or more example implementations of the disclosure.

As discussed above and referring also to at least an example implementation of FIG. 9, social engineering attack defense process 10 may identify 400 a first characteristic of a first communication on a first communication channel. Social engineering attack defense process 10 may identify 410 a second characteristic of a second communication on a second communication channel. Social engineering attack defense process 10 may compare 420 the first characteristic and the second characteristic to a predetermined rule. A determination 430 may be made by social engineering attack defense process 10 as to whether the first characteristic and the second characteristic correlate to the predetermined rule. The identification 440 by social engineering attack defense process 10 of potential social engineering activity associated with at least one of the first communication and the second communication may be based upon, at least in part, the correlation to the predetermined rule.

In some implementations, social engineering attack defense process 10 may include machine learning algorithms to evaluate future threats and may also include a feedback system that allows combinations of communications to be identified as related and malicious. For example, a combination of a text message and a voice mail received by an employee may be determined to be suspicious. Social engineering attack defense process 10 may utilize machine learning algorithms to capture metadata of the communications, such as but not limited to, the time relation between the two communications and the sources of the communications, such as but not limited to, IP addresses and email mail header information, where this information may be used by the machine learning algorithms of social engineering attack defense process 10 to determine potential future social engineering attacks. The machine learning algorithms may include e.g., an association between the metadata of the communications and known malicious attacks and/or an association between sources of communications and known attackers. This type of association within the learning algorithms may be used to determine potential future social engineering attacks.

The machine learning algorithms may be part of a machine learning process (e.g., from social engineering attack defense process 10). The machine learning process may analyze large numbers of communications, such as any or all communications that are passed into and out of an enterprise in any form. The machine learning process may be provided with historical examples of identified threats and suspected threats, such as those provided by internal or $3^{rd}$ party human analysis services. The machine learning algorithms may begin to determine which features of a communication or which combinations of features are most effective in predicting or identifying a potential attack and will iteratively improve detection as more data is produced. As the machine learning process provides candidate attacks to human operators, these human operators may confirm or deny that an attack was in fact suspected or the human operators may confirm that a communication was otherwise suspicious. The machine learning process may continue to improve its ability to determine potential future social engineering attacks over time.

In some implementations, a predetermined rule may be a rule established at any time up to and including the time of its comparison 420 to the first characteristic and the second characteristic. For example, social engineering attack defense process 10 may utilize iterative machine learning algorithms to develop predetermined rules.

In some implementations, a predetermined rule may be made up of various criteria, e.g., characteristics, involving communications across multiple channels. These criteria may include any characteristic of subject matter, such as type and origin of communications across multiple channels. For example, a predetermined rule may indicate that a potential social engineering attack may exist if a voice message and an email message are received from the same source, e.g., within a 24-hour period where the text transcript of the phone call instructs the user to read the email message and where the source of the communication is not a usual communicator of the user. Further, the predetermined rule may indicate that the potential social engineering attack exists where a URL in the email message (e.g., email message instructs user to contact URL) is not on a whitelist of trustworthy or safe sites or is on a blacklist of unsafe sites. As another example, a social engineer attacker may send a communication to the target via a social network and send the same identical communication via email or text message. The message in the communication may include a potentially malicious call to action such as "open my attachment" or "connect to this URL" or "call this number". It will be appreciated that other aspects of communications may be used for indicating a potential social engineering attack without departing from the scope of the present disclosure.

In some implementations, the comparing of the first characteristic of a first communication on a first communication channel and the second characteristic of a second communication on a second communication channel to a predetermined rule may include assessing the similarities and differences of these characteristics to the predetermined rule. For example, the predetermined rule may involve the use of statistical classifiers. Two different textual communications may be compared using the predetermined rule. An inclusive classifier test may attempt to determine if the target text is similar to a malicious communication based on a classifier using a training set and a corpus of malicious communications and non-malicious communications. Then, a different classifier uses a different training set of information that may be used to determine differences, how the communication may be dissimilar to a set of malicious communications, etc. The predetermined rule may be used in performing an assessment of both similarities and differences of the text with respect to malicious communications. The two classifiers, in this example, may also be used to compare against non-malicious communications, or both malicious and non-malicious communications. In addition to statistical classifiers, other techniques may be used in the calculation of similarities and dissimilarities, for instance a keyword matching technique or a grep (text pattern matching technique) may be used. It will be appreciated that any known methodology of comparison may be used without departing from the scope of the present disclosure.

In some implementations, the correlation between the first characteristic of a first communication on a first communication channel and the second characteristic of a second communication on a second communication channel to a predetermined rule may occur when the characteristics are related, e.g., similar to the predetermined rule. Predetermined rules, may be described as adaptive sets of logic, updated as the system operates, that combine multiple characteristics across multiple communications and use these multiple characteristics to determine how likely the communications are to constitute a particular event. For example, a social engineering attack may use an unusual channel for the target, such as a lesser-used chat program or a social networking chat function. As a result, the attacker may have limited or selective means of communicating with the target. The attacker may then choose another unusual or lesser-used communication channel, such as an email address at an enterprise or some other communication channel found online. The social engineering attack defense process 10 may look at combinations of characteristics such as an "old email address" (e.g., first characteristic of first communication on first communication channel) and an "unusual social network communication" (e.g., second characteristic of second communication on second communication channel) may be construed by the social engineering attack defense process 10 as safe communications (e.g., "old friend trying to get hold of person") or unsafe communications (e.g., "malicious attack") based on the predetermined rule. Then, the contents of the messages provide additional characteristics that may be used by the social engineering attack defense process 10 to determine degree of maliciousness. For example, "hey call me on this number, let's get together some time" has characteristics that would be considered less suspicious than e.g., "I found this cool website, click the link" or "open this attachment, it has the answer to your question". Over time, additional malicious approaches may be developed by attackers and the techniques may be learned from these new approaches whether learned by machine learning or manually programmed into the social engineering attack defense process 10. It will be appreciated that any known methodology of correlation may be used without departing from the scope of the present disclosure.

In this implementation, social engineering attack defense process 10 may compare 420 communications from two different communication channels against a predetermined rule to determine if the combination of communications will be a potential social engineering attack. For example, user 46 may receive a voice message from an attacker who is pretending to be from the user's bank. User 46 may also receive an email from the same attacker. The voice message may state that user 46 needs to update his online information with the bank due to a breach in security of the bank's online database. This statement may be used to gain the trust of user 46. The message may further instruct user 46 to update his online information by selecting an unknowingly malicious link located in the previously received email. In this example, social engineering attack defense process 10 may utilize a predetermined rule that indicates if a user receives communications on two or more different communications channels from known sources of social engineering attack activity, those received communications may be potential social engineering attack activity.

The social engineering attack defense process 10 may compare 420 the IP address of the email to a data store of malicious email addresses and the caller ID of the voice message to a data store of malicious caller IDs to the predetermined rule. Social engineering attack defense process 10 may then determine 430 if either of the IP address or caller ID is similar to an IP address or caller ID located in the data store sufficiently to correlate to the predetermined rule (e.g., meets a threshold such that the caller ID or the IP address is similar enough to conclude that the caller ID or the IP address is malicious). For instance, if the IP address of the communication is identified as coming from overseas or through a relay service (i.e., also possibly from overseas), or if the IP address is checked with a real-time list of malicious IP addresses and identified as potentially malicious and the other communication from the user was on a less-used communication channel (e.g., a social networking messaging function or a lesser-used email address) then the IP address may be identified as malicious (i.e., IP address correlates to the predetermined rule). The social engineering attack defense process 10 may then identify 440 the series of communications to be a potential social engineering activity. Once the communications are determined to be potentially malicious, the communications may be added to the data store for use with future analysis.

By further example, social engineering attack defense process 10 may also utilize a predetermined rule that indicates if a user receives communications on two or more different communications channels having content requesting the recipient of those communications to take a specific action (e.g., select a malicious link, download a file, respond to email, call a phone number, forward a communication to others, provide information about internal information or personnel, contact an executive, forward information to multiple other parties, install a program or application, activate or provision a service or feature in a mobile or desktop application, permit access to cloud resources via open authorization (OAuth) access, etc.). The received communications may be potential social engineering attack activity. Social engineering attack defense process 10 may compare 420, for example, the content of the received email and the content of the voice message to the predetermined rule and may determine 430 both received email and received voice message request that user 46 to take the specific action, e.g., in this example, to update user's 46 online bank information, correlate to the predetermined rule. Upon such a determination 430 of the correlation, social engineering attack defense process 10 may then identify 440 the series of communications to be the potential social engineering activity.

Figure 10:
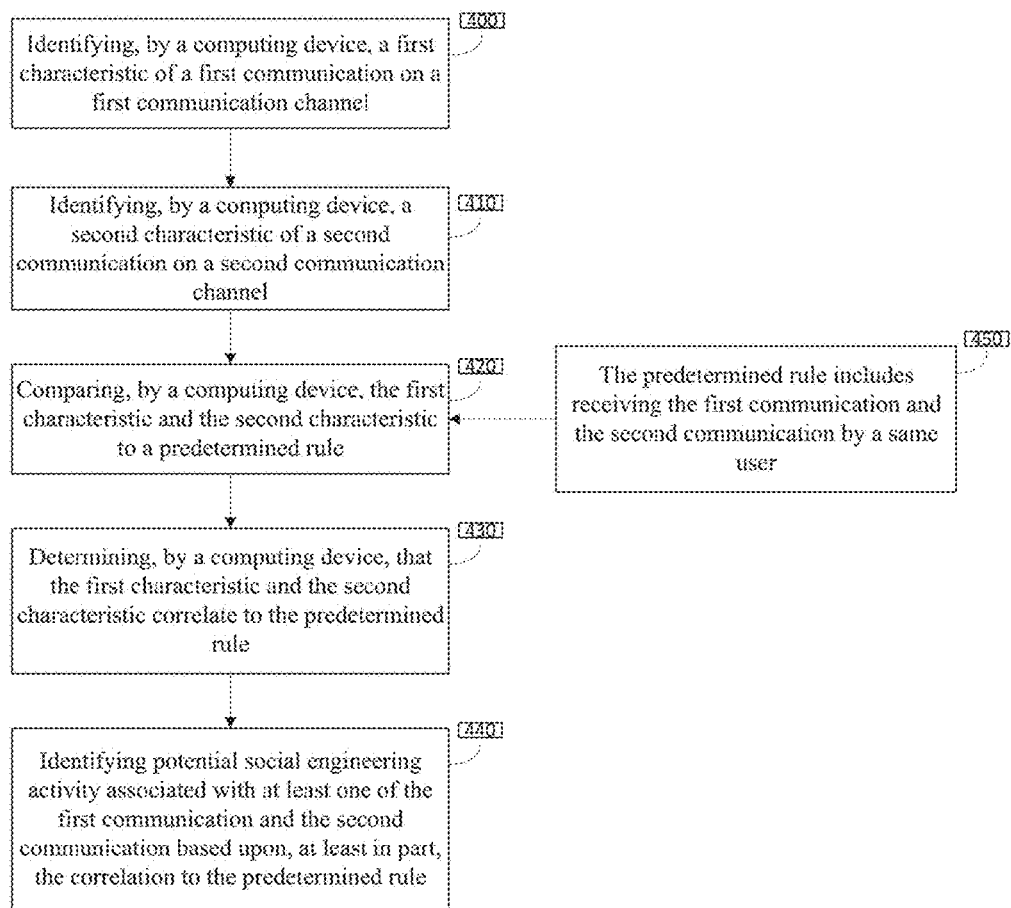
FIG. 10 is an example flowchart of a social engineering attack defense process according to one or more example implementations of the disclosure.

In some implementations, as shown in example FIG. 10, the comparing 420 by social engineering attack defense process 10 may include applying a predetermined rule that may include receiving 450 the first communication and the second communication by the same user. For example, an attacker may send a combination of malicious messages, e.g., email messages and text messages. These messages may be perceived as innocuous or non-harmful when received in isolation, but in combination, may match a pattern of malicious activity such that the predetermined rule may be based on this pattern of malicious activity. In addition to the example of receiving a virus payload on one communication channel and a call to action to open the virus payload on another communication channel, there are numerous patterns that represent potential malicious activity. Example patterns (related to one or more predetermined rules) may include patterns inferred from first or second communications presumed to be from the same entity, e.g. an attempt to send money on one channel and a request for information on another channel; a request that someone do a favor on one channel and a duplicate message on another channel; multiple phone calls on different company lines seeking the same target person, from personnel not known to the company; an attempt to call and change a password or access account information which, after denial, is attempted again on a different call or channel; a bug report filed, followed by an attempt to directly contact the engineer who responds to the bug report via an unauthorized channel (e.g., telephone call for a text only support service); a multi-stage attempt to communicate with an executive, such as posing as an associate of the executive and communicating with multiple personnel in a company via two or more communications with the same basic message (e.g., "I'm an old friend of executive X, I lost their contact info, can you get me in touch with them?"); etc. Other combinations of patterns or potentially malicious activity may be known to those skilled in the art with respect to the same user receiving two communications on different channels. Additional combinations of potentially malicious activity, when not programmed in as rules developed manually, may be derived through regression analysis and machine learning over a corpus of all monitored communications and known malicious communications, and these patterns, whether in the form of derived rules, implicit knowledge, neural network configurations, vector weights or parameters, constitute further predetermined rules.

Figure 11:
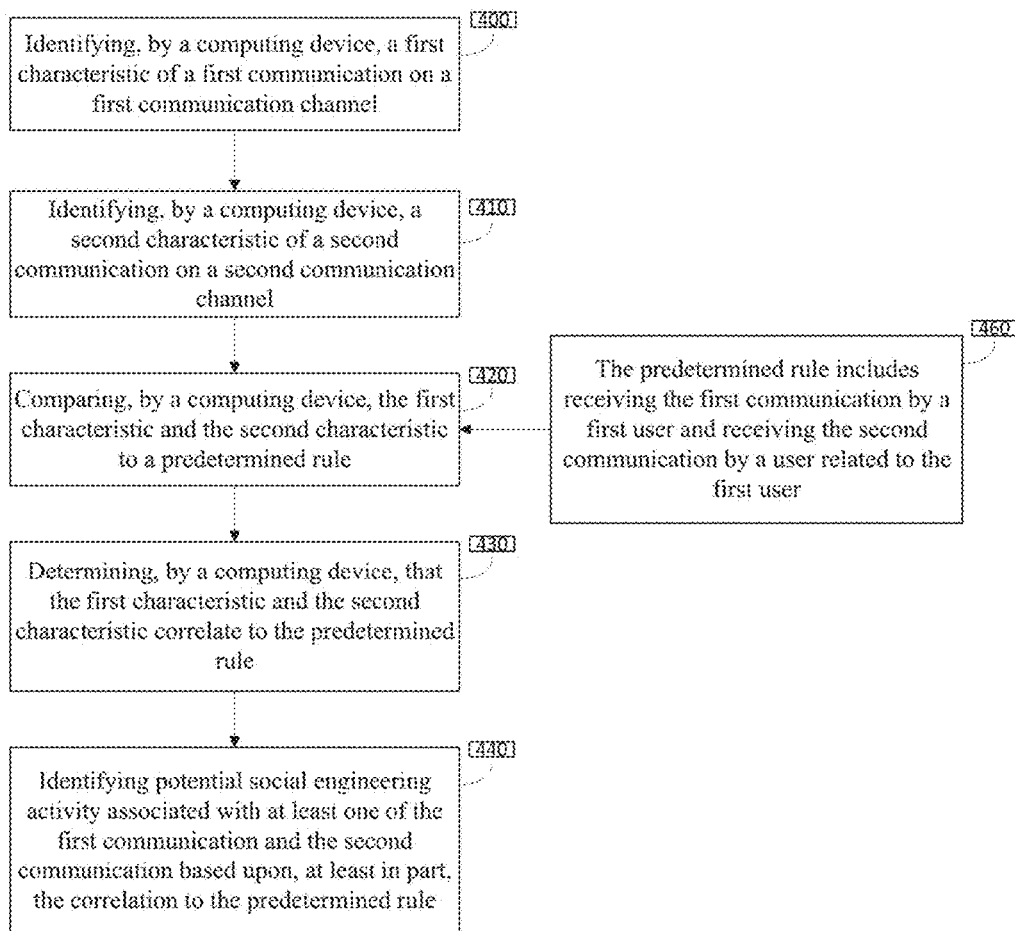
FIG. 11 is an example flowchart of a social engineering attack defense process according to one or more example implementations of the disclosure.

In some implementations, as shown in example FIG. 11, the comparing 420 by social engineering attack defense process 10 may include applying a predetermined rule that may include receiving 460 the first communication by a first user and receiving the second communication by a user related to the first user. In some implementations, this predetermined rule may be based on the relation between the users. There are circumstances where a user and a related user have a familiar connection with each other. For example, they may be employees within the same department, project group or other common connection. In some implementations, this predetermined rule may be based on the relation between the communications. For example, but not limited to, a similar source of the communications to both parties, similar language style in the communications and a related topic in the communications (e.g. similar source may be email address, similar language may be a form of writing used in previous emails between parties, related topic may be a subject or topic used in previous emails between parties, etc.). For example, a malicious attacker may communicate with a different fake name to multiple parties (e.g., targeting multiple people in a group) but the communications originate from the same IP address or proxy. In another example, the communications may be sufficiently diverse in origin but the content of the communications is a close match, except for the change of contact name. In another example, the communications may be entirely customized to their targets and come from different directions, but may contain the same payload, or have language that when processed with natural language processing (NLP), results in a same call to action (call a number, open a URL, open an attachment, forward a communication to an executive, etc.). In another example, the communications may use the same vocabulary as analyzed via word frequency. The communications may have the same spelling or grammar errors or use the same specialized terms. The communications may be identified as being part of a logical continuous thread of back-and-forth communications between two parties even though they switch between different channels. For example, one party receives an email to jump onto instant messaging application (e.g., skype™) and the communication continues on the instant messaging application. Then, one party may request that other party join them on chat application on another website. User may then switch to website and communication continues there, but the communication topic remains the same (e.g., "help me speak to executive" or "what are some of the details of the upcoming product" or "I'm a vendor and I'd like to provide you with technology for your secret project").

This type of social engineering attack may involve multiple employees, or users, to compromise a company's security efforts. Social engineering attack defense process 10 may utilize this predetermined rule when determining 430 the communications of two separate employees. Social engineering attack defense process 10 may identify 440 potential social engineering attacks by the correlating of characteristics of the two separate communications, e.g., similar source communication to both parties, similar language style, related topic, etc. with this predetermined rule. For example, user 46 may receive email communications from an attacker and may come to trust the attacker believing the attacker is a more senior employee in the company. User 48 may then receive an email communication from the attacker having a link to a malicious website. User 46 may then receive a communication from the attacker to remind user 48 to comply with the request to select the malicious link in the email communication. In the example, user 46 may believe that the request is a valid request, may urge user 48 to comply with the request to select the malicious link. User 48 may comply with the request as user 48 trusts user 46. Social engineering attack defense process 10 may utilize a predetermined rule looking for a call to action (e.g., opening a malicious link) when comparing 420 the communications of user 46 and user 48. The social engineering attack defense process 10 may determine 430 the communications to user 46 and user 48 correlate to this predetermined rule about malicious links or the communications may match a predetermined rule correlating to specious executive identity. Social engineering attack defense process 10 may then identify the communications to Users 46 and 48 as potential social engineering activity.

Figure 12:
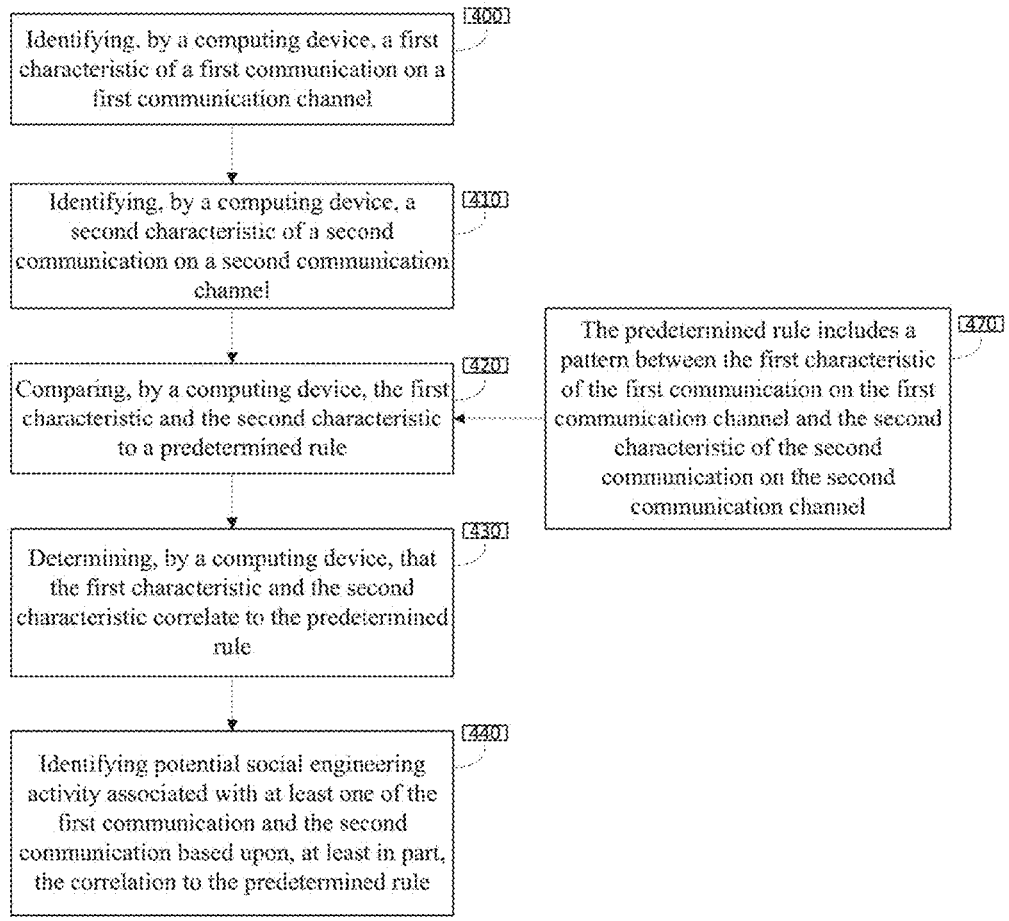
FIG. 12 is an example flowchart of a social engineering attack defense process according to one or more example implementations of the disclosure.

In some implementations, as shown in example FIG. 12, the comparing 420 by social engineering attack defense process 10 may include applying 470 a predetermined rule that may be based, at least in part, on a pattern between the first characteristic of the first communication on the first communication channel and the second characteristic of the second communication on the second communication channel. A pattern may be a repeating form of communication and may be explicit or implicit. An explicit pattern may be readily detected within the communication. For example, an email with a link followed by a request to open the email is an explicit pattern. In contrast, an implicit pattern may not be readily detectable. An example of an implicit pattern may be the combination of communications that are later deemed to be part of a related attack. Social engineering attack defense process 10 may utilize machine learning algorithms to detect implicit patterns, such as but not limited to, hidden or latent variables; combinations of different communications; and on extracted content/intention, within the communications.

For example, social engineering attack defense process 10 may identify 400 an email message and may identify 410 a VoIP message to user 46. Social engineering attack defense process 10 may compare 420 these communications by, e.g., applying 470 this predetermined rule to those communications. If there is a determination 430 that a correlation between those communications and the predetermined rule exists, social engineering attack defense process 10 may identify 440 the communications as a potential social engineering attack.

Figure 13:
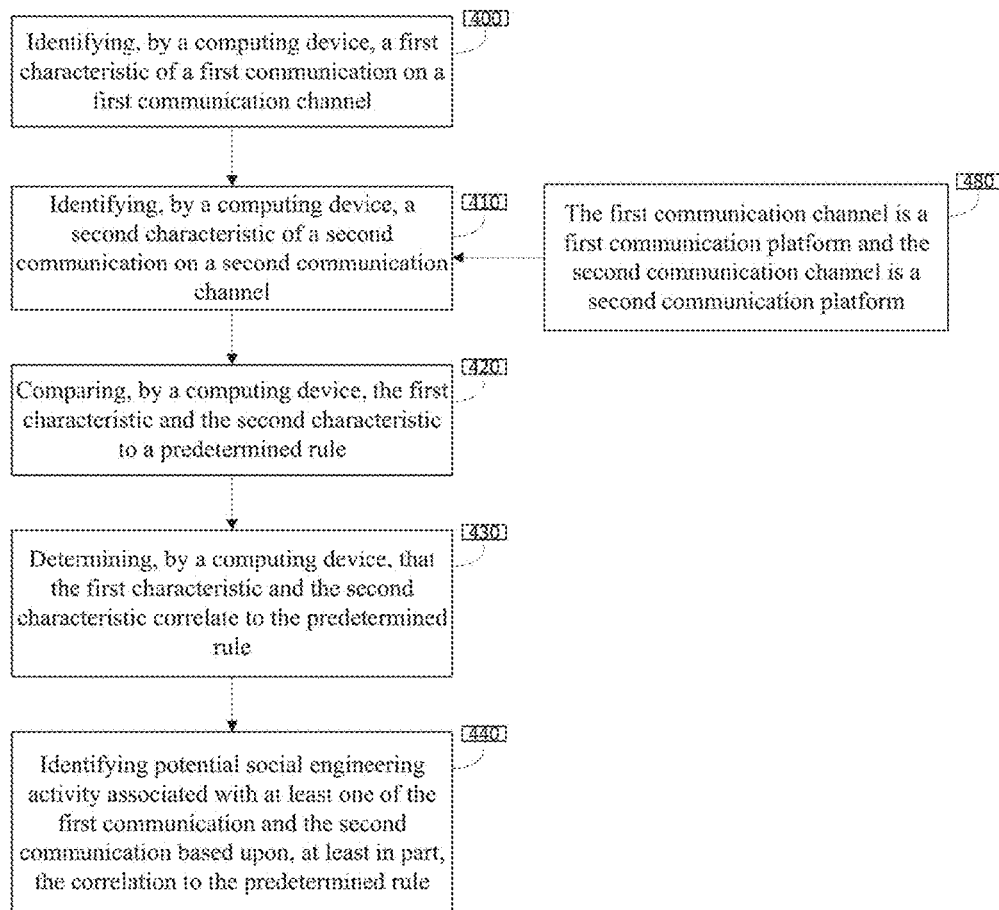
FIG. 13 is an example flowchart of a social engineering attack defense process according to one or more example implementations of the disclosure.

In some implementations, as shown in example FIG. 13, social engineering attack defense process 10 may identify 400/480 the first characteristic and identify 410/480 the second characteristic, where the first communication channel may be a first communication platform and the second communication channel may be a second communication platform. A communication platform may allow for a plurality of communication applications to be integrated. Communication platforms may include, but are not limited to, social messaging systems, instant messaging systems, voice services, voice chat applications, along with hybrid systems. An example is shown with a social messaging system. This type of platform may include, e.g., text, video and voice communication applications. Examples of hybrid systems may include, e.g., Snapchat, which allows for pictures, video clips, messages to be sent along with Instagram, which allows for pictures, filtered images and text to be sent. Further examples may include augmented reality, virtual reality and avatar-based communication systems, along with e-commerce messaging systems and help-desk messaging systems.

In an example of this implementation, user 46 may receive a text message from an instant messaging system, e.g., the first communication platform, and a voice message from a VoIP service, e.g., the second communication platform, where social engineering attack defense process 10 may identify 400 the first characteristic of the text message and may identify 410 the second characteristic of the VoIP message. Social engineering attack defense process 10 may compare 420 and determine 430 if the two characteristics correlate to a predetermined rule. For example, social engineering attack defense process 10 may use the predetermined rule to identify whether characteristics correlate with known malicious characteristics (e.g., characteristics associated with social engineering activity). For example, the text message may tell the user they are going to get a call with an offer (e.g., first characteristic of text message). The VoIP message may then provide the user with the details of the offer and a call to action to provide credit card information (e.g., second characteristic of VoIP message). In another example, the text message may tell the user that a government agency (e.g., Internal Revenue Service) is going to put a lien against them (e.g., first characteristic of text message), and the VoIP call from the same number may be a person seeking payment information for a purported IRS debt to a government (e.g., United States government) (e.g., second characteristic of VoIP message). Thus, the social engineering attack defense process 10 may use the predetermined rule to identify that the above described characteristics correlate with known malicious characteristics (e.g., characteristics such as IRS-related messages or the combination of offer details with the call of action to provide credit card information may be considered malicious characteristics).

Figure 14:
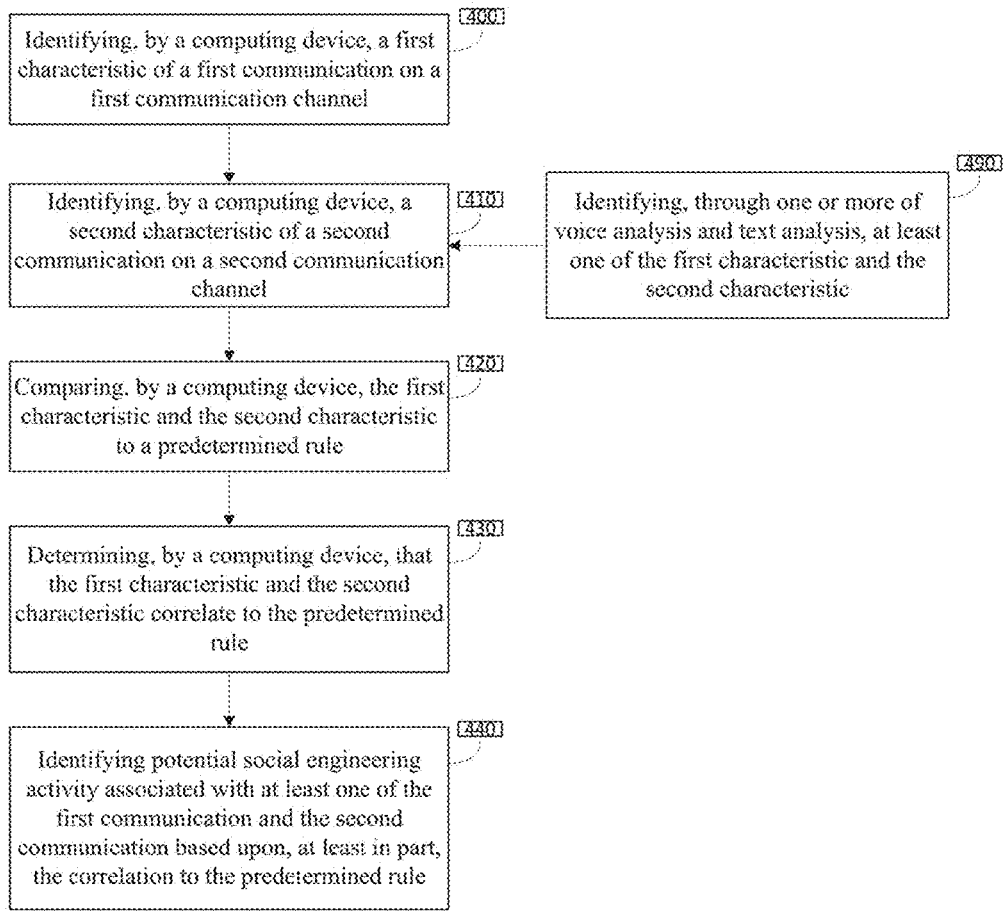
FIG. 14 is an example flowchart of a social engineering attack defense process according to one or more example implementations of the disclosure.

In some implementations, as shown in example FIG. 14, the identification 400 the first characteristic and the identification 410 the second characteristic by social engineering attack defense process 10 may include one or more of voice analysis and text analysis 490. Voice analysis may generally involve the study of speech sounds for purposes other than linguistic content, such as in voice recognition, e.g., recognizing who is speaking. Text analysis may generally involve the process of structuring input text, deriving patterns within the structured input text, and evaluation and interpretation of the output. This analysis may include evaluating word frequency; collocation, e.g., words commonly appearing near each other; concordance, e.g., the contexts of a given word or set of words; N-grams, e.g., common two-, three-, etc.- word phrases; entity recognition, e.g., identifying names, places, time periods, etc.; and dictionary tagging, e.g., locating a specific set of words in the texts. The one or more of voice analysis and text analysis 490 may also include intent extraction and/or intent parsing through natural language processing, e.g., to determine the possible intent of a communication.

For example, user 46 may receive an email and a voice message purportedly from an executive within the user's company. Social engineering attack defense process 10 utilizing text analysis may identify 400 a first characteristic of the email message, e.g., a pattern of words, and may identify 410 a second characteristic of the voice message, e.g., the voice patterns of the speaker. Social engineering attack defense process 10 may compare 420 the two characteristics to a predetermined rule that may require both communications to match the identified executive. If the voice analysis and/or the text analysis do not match the identified executive, social engineering attack defense process 10 may determine 430 there is a correlation of the two characteristics to this predetermined rule, and may identify 440 that social engineering activity is associated with one of the two communications.

Figure 15:
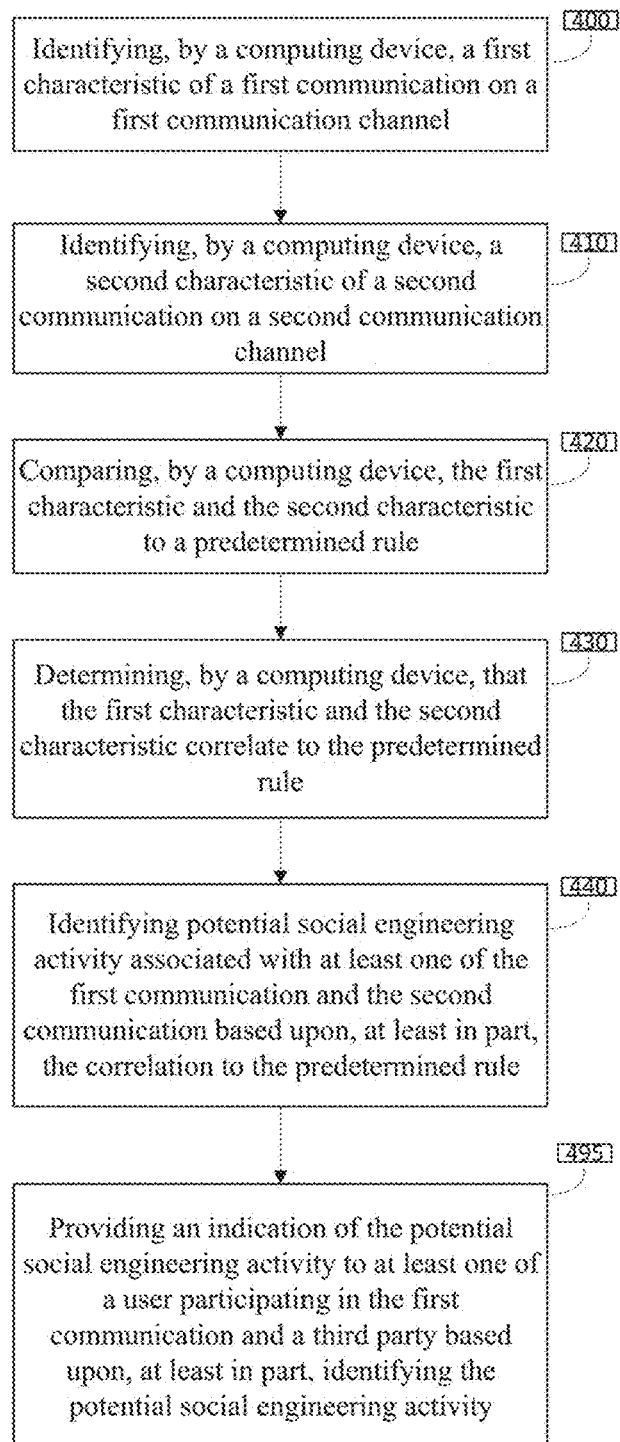
FIG. 15 is an example flowchart of a social engineering attack defense process according to one or more example implementations of the disclosure.

In some implementations, as shown in example FIG. 15, social engineering attack defense process 10 may provide 495 an indication of the potential social engineering activity to at least one of a user participating in the first communication on the first communication channel and a third party based upon, at least in part, the identified potential social engineering activity. The third party may be, e.g., an external social engineering defense provider. For example, once social engineering attack defense process 10 identifies 440 a communication, e.g., email, etc., to be a potential social engineering activity, process 10 may notify user 46 and/or a third party that this communication may be a potential social engineering activity to be a potential social engineering activity, social engineering attack defense process 10 may notify user 46 and/or a third party that this communication may be a potential social engineering activity.

In some implementations, the notification by social engineering attack defense process 10 may trigger the establishment of monitoring or two-way communication with the third party for potential social engineering attack data for threat analysis purposes. This data may be used by social engineering attack defense process 10 to identify a communication characteristic or determine a communication pattern for confirming and/or validating that the communication is malicious activity.

The Audio Fingerprinting for Attack Detection Process:

Social engineering attacks may utilize multiple communication channels to hide their source and to add to apparent validity. Social engineering attack defense process 10 may analyze media channels to extract features of the communications across those media channels to detect social engineering attacks.

Figure 16:
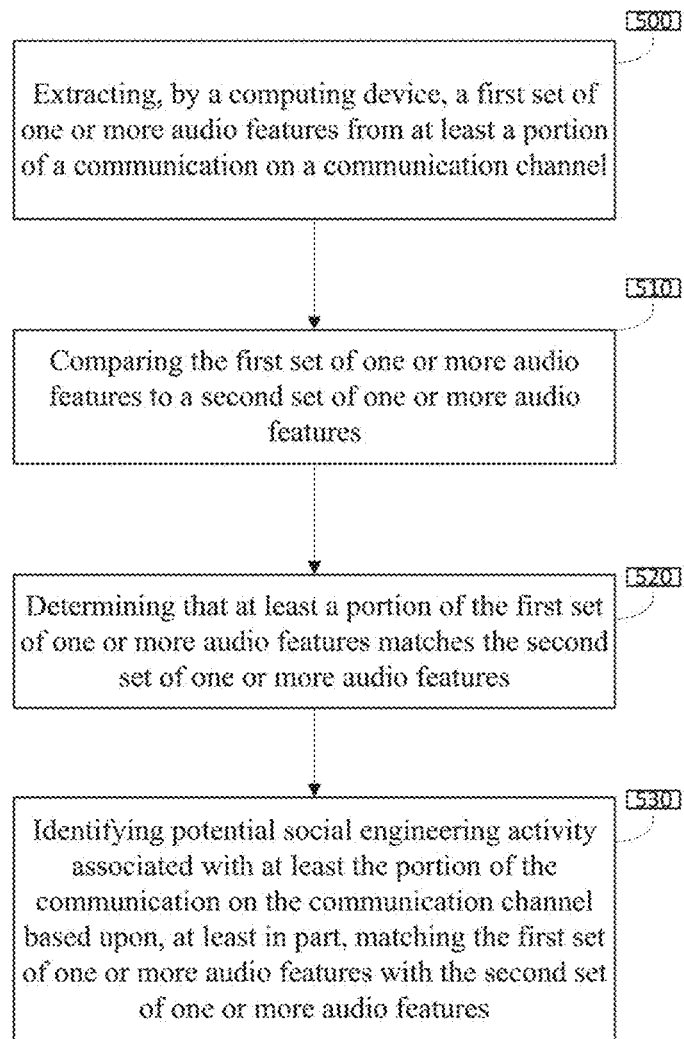
FIG. 16 is an example flowchart of a social engineering attack defense process according to one or more example implementations of the disclosure.

As discussed above and referring also to at least an example implementation of FIG. 16, social engineering attack defense process 10 may extract 500 a first set of one or more audio features from at least a portion of a communication on a communication channel. The first set of one or more audio features from at least a portion of the communication may be compared 510 by social engineering attack defense process 10 to a second set of one or more audio features to have social engineering attack defense process 10 determine 520 that at least a portion of the first set of audio features matches the second set of one or more audio features. Identification 530 of potential social engineering activity associated with at least a portion of the communication on the communication channel by social engineering attack defense process 10 may be based upon, at least in part, a match between the first set of audio features with the second set of one or more audio features. The extraction 500 and comparison 510 may be performed in real time by social engineering attack defense process 10.

In some implementations, social engineering attack defense process 10 may extract 500 a first set of one or more audio features from at least a portion of a communication on a communication channel. These audio features may include, e.g., any measurable property of the communication that may be utilized with, e.g., machine learning and pattern recognition, including but not limited to, frequency, intensity, and timing. By way of example, audio features may be extracted from a voice biometric of a communication. Voice biometrics are generally the unique, distinguishable physiological characteristics and behavioral features of a person's voice, that may be used to identify that person. Due to a person having unique physical characteristics, such as vocal tract shapes, larynx sizes, and other parts of voice production organs, the shape of the sound of a person's voice may be measured and extracted as an audio feature (e.g., via social engineering attack defense process 10). Additionally, the communication, or a portion of the communication, may be translated into text, or the identity of the person speaking in an audio communication may be identified.

Social engineering attack defense process 10 may compare 510 the extracted first set of one or more audio features with a second set of one or more audio features. The second set of audio features may be stored in a data store or with a third party, and may include audio features from communications associated with known prior social engineering attacks. Social engineering attack defense process 10 may determine 520 that at least a portion of the first one or more audio features matches the second set of one or more audio features based on the comparison of these two sets of features.

Social engineering attack defense 10 may identify 530 potential social engineering activity associated with at least the portion of the communication on the communication channel based upon, at least in part, the match between the first set of one or more audio features and the second set of one or more audio features. For example, a phishing-type VoIP digital phone call may be received by the user 46. Social engineering attack defense process 10 may extract 500 a first set of one or more audio features from the speech contained within this digital phone call that may include frequency, intensity and timing of the speech. Social engineering attack defense process 10 may then compare 510 the first set of audio features to a second set of audio features contained within a datastore. Social engineering attack defense process 10 may determine 520 if the first set of audio features matches the second set of audio features. Based upon, at least in part, the first set of one more audio features matching the second set of audio features, social engineering attack defense process 10 may identify 530 potential social engineering activity associated with at least the portion of the phone call.

Figure 17:
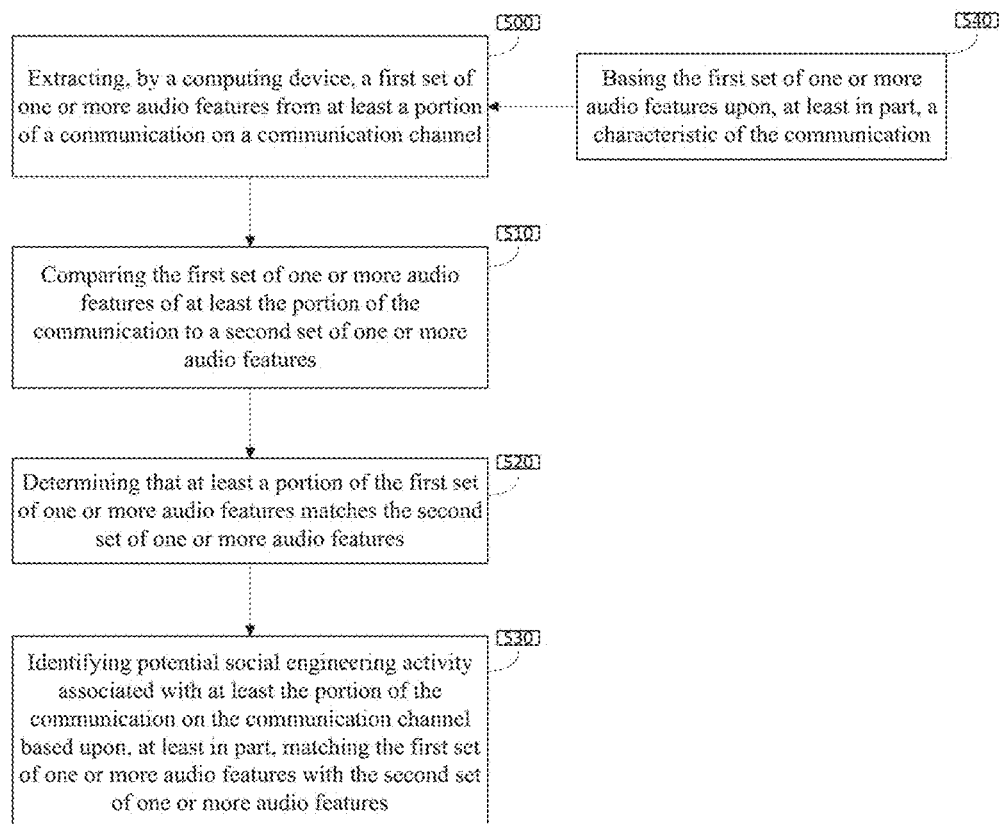
FIG. 17 is an example flowchart of a social engineering attack defense process according to one or more example implementations of the disclosure.

In some implementations, as shown in example FIG. 17, social engineering attack defense process 10 may base 540 the first set of one or more audio features upon, at least in part, an audio characteristic of the communication. These audio characteristics may include, but are not limited to, information regarding how the communication was presented. Examples of such information may include, but are not limited to, intonation, stress, and rhythm. An example of this implementation may include a user 46 receiving a phishing-type VoIP digital phone call. Social engineering attack defense process 10 may extract 500 the intonation and rhythm of the speaker's voice delivering the phone call, at least in part, from the first set of one or more audio features of the communication.

Figure 18:
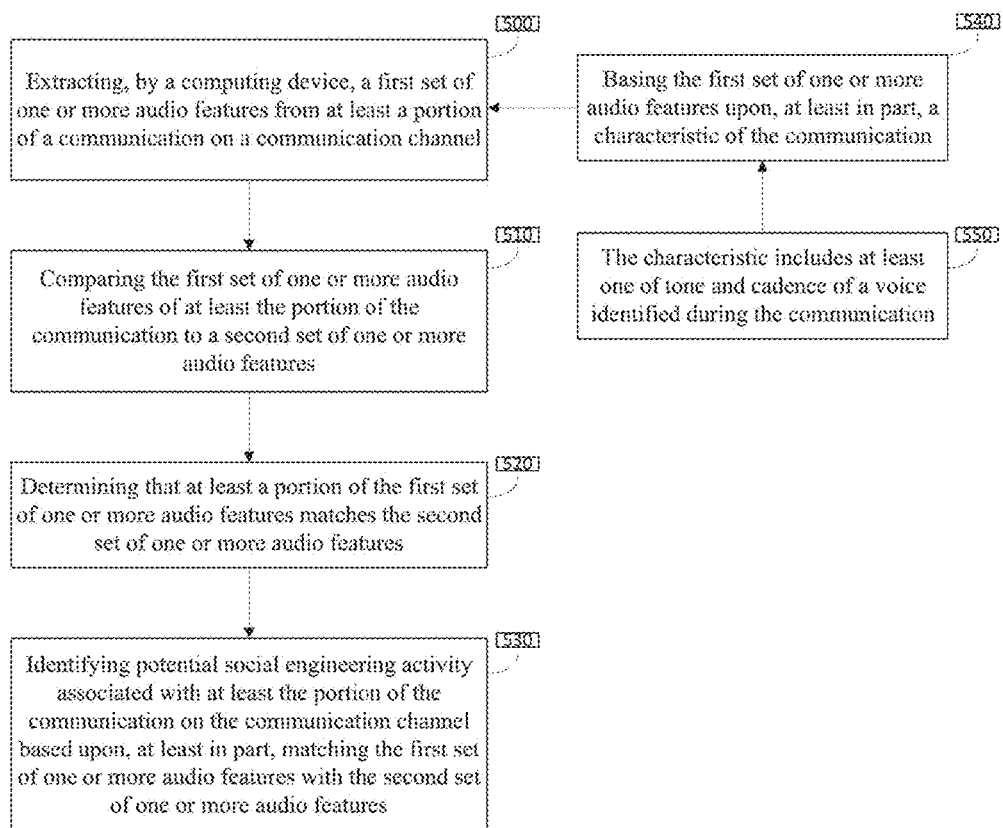
FIG. 18 is an example flowchart of a social engineering attack defense process according to one or more example implementations of the disclosure.

As shown in example FIG. 18, this audio characteristic may include 550 at least one of tone and cadence of a voice identified during the communication. Social engineering attack defense process 10 may analyze the tone and cadence of a communication as part of a determination of an identification of a particular person's voice. In some implementations, this analysis may include comparing the tone and cadence to a database of previously identified voices. The tone of a communication may be used to determine the emotional state of the caller (e.g., correlate a tone as happy, sad, angry, etc.). For example, analysis of tension in the voice as known by one of skill in the art may be used to determine whether the caller sounds nervous or rushed, if the caller is hesitant to answer certain questions, or whether the caller is angrily insisting compliance. In another example, a general emotional level or affect of a caller may be extracted from the communication and used as a comparison, either for other attackers who exhibit a similar affect or to determine if the same caller has an appropriate affect for the type of transaction or communication they are attempting to achieve. The cadence may be used to determine the general inflection or modulation of the voice. For example, user 46 may receive a phishing-type VoIP digital phone call. Social engineering attack defense process 10 may extract 500 the tone and cadence of the voice of the caller making the phone call. Further, social engineering attack defense process 10 may analyze the tone and/or cadence of the voice to determine if the voice is a synthesized voice. This analysis may be performed by a speech synthesis process associated with the social engineering attack defense process 10. Factors, including but not limited to, inflection, modulation, cadence of the message, awkward prosody, errors when words are concatenated together, and mispronounced words, may be used to determine if a voice is synthetic or if the voice is being altered through a digital masking or emulation system. Each of the extracted voice features may be used in the automatic generation of rules through machine learning system. Voice features may also be used in the manual construction of rules by experts, who may craft such rules as "rushed delivery of a call to action to communicate with an executive is deemed suspicious" or "unfriendly request to pay a fee combined with unusual communication channel or unusual source IP address is deemed suspicious".

Figure 19:
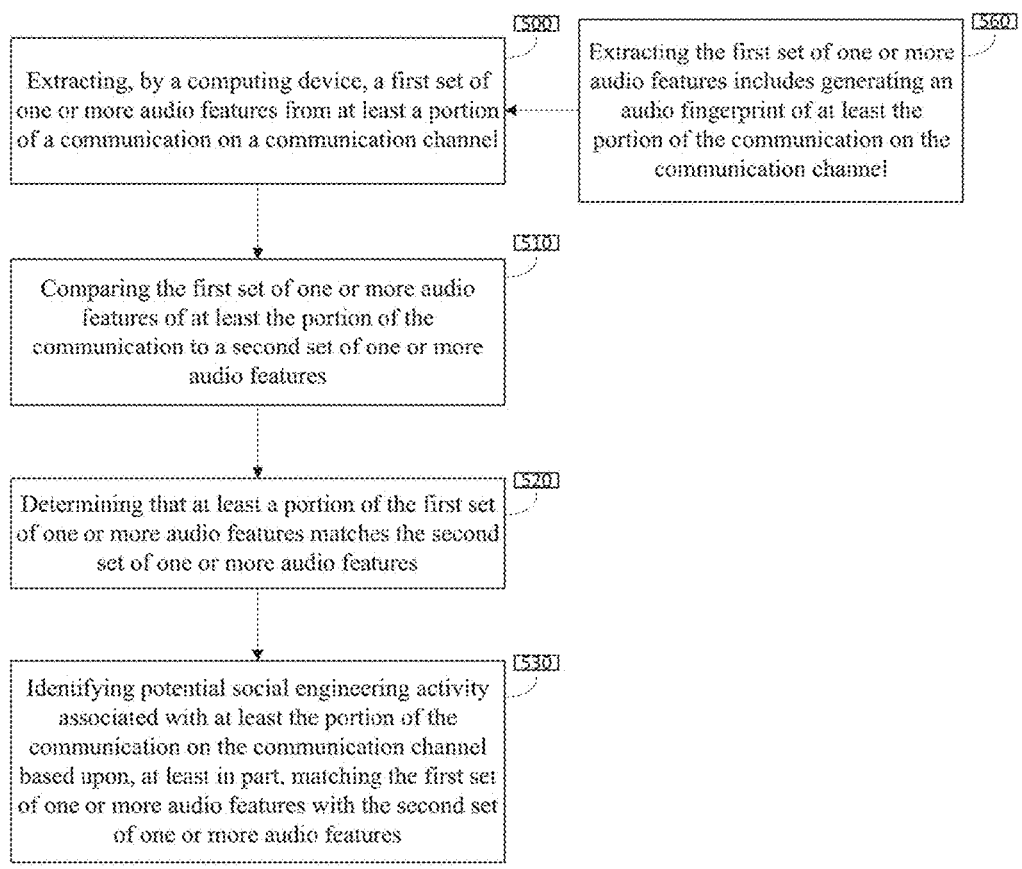
FIG. 19 is an example flowchart of a social engineering attack defense process according to one or more example implementations of the disclosure.

In some implementations, as shown in example FIG. 19, the extracting 500 of the first set of one or more audio features by social engineering attack defense process 10 may include generating 560 an audio fingerprint of at least the portion of the communication on the communication channel. An audio fingerprint may generally be described as a condensed digital summary of the audio characteristics of an audio signal, that can be used to identify that audio sample. For example, user 46 may receive a phishing-type VoIP digital phone call that includes unique audio characteristics, for instance a frequency spike of 823 Hz at the one minute mark. Social engineering attack defense process 10, utilizing these unique audio characteristics, may generate 560 an audio fingerprint of at least a portion of the phone call. Social engineering attack defense process 10 may compare 510 the audio fingerprint of the phone call with one or more audio fingerprints of known social engineering attack communications located within a datastore. Social engineering attack defense process 10 may determine 520 if the audio fingerprint of the phone call matches one or more audio fingerprints located within the datastore. Based upon, at least in part, the audio fingerprint of the phone call matching an audio fingerprint of a known social engineering attack communication located within the data store, social engineering attack defense process 10 may identify 530 potential social engineering activity associated with at least a portion of the phone call.

Figure 20:
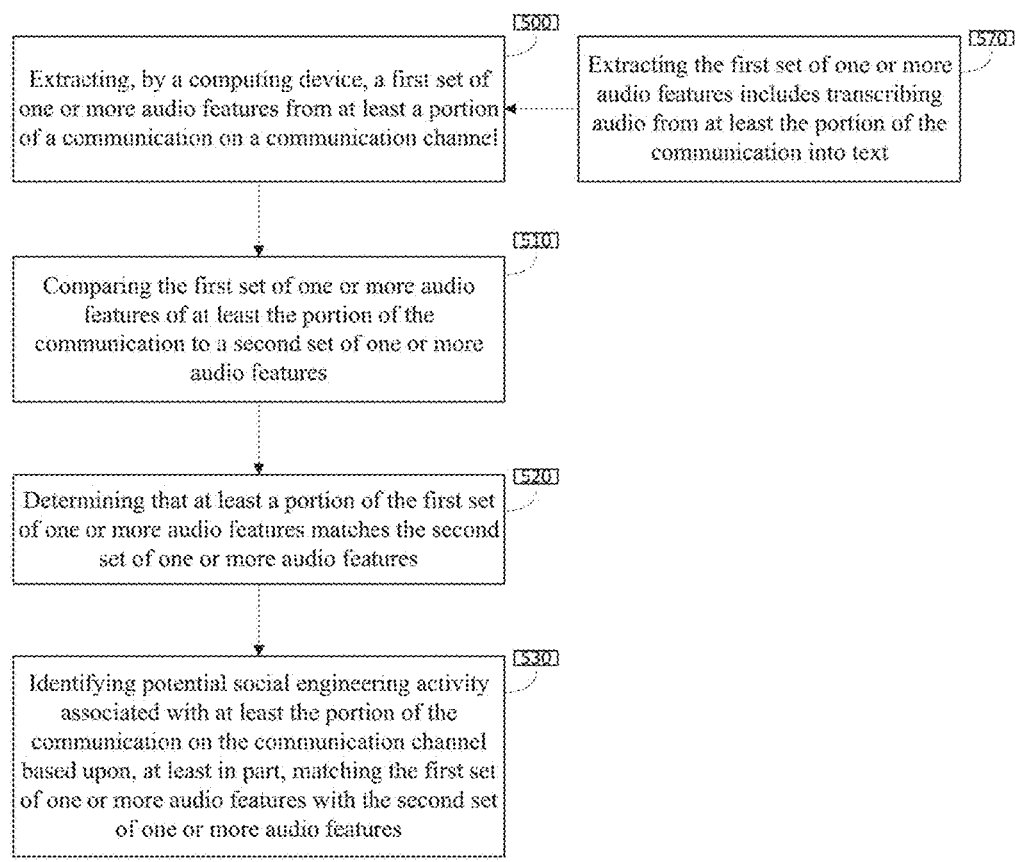
FIG. 20 is an example flowchart of a social engineering attack defense process according to one or more example implementations of the disclosure.

In some implementations, as shown in example FIG. 20, the extracting 500 the first set of or more audio features by social engineering attack defense process 10 may include transcribing 570 audio from at least the portion of the communication into text. The transcribed audio may allow for the communication to be analyzed through an automated speech recognition process and a natural language process associated with social engineering attack defense process 10. Through a natural language process, the nature of the communication may be determined. For example, user 46 may receive a voice message over a VoIP digital phone call urging user 46 to call a known social engineering attack phone number. Social engineering attack defense process 10 may transcribe this communication into text, which may allow social engineering attack defense allow process 10 to analyze the communication by, e.g., a natural language process.

Figure 21:
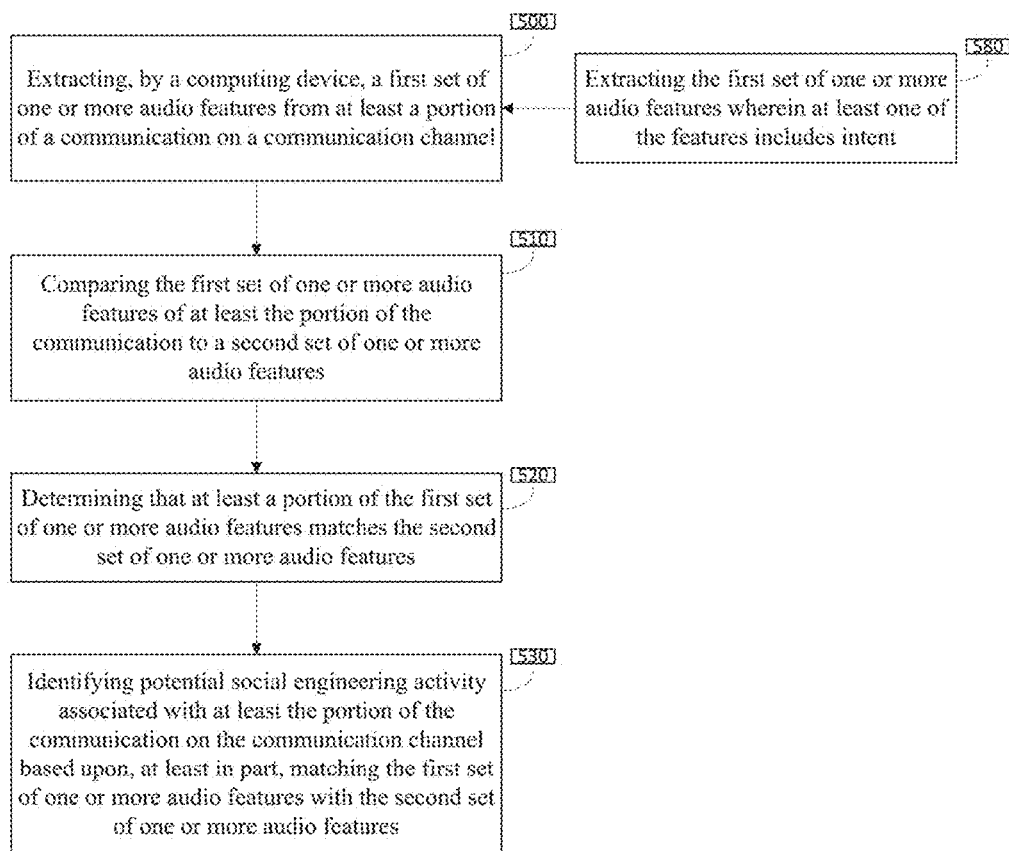
FIG. 21 is an example flowchart of a social engineering attack defense process according to one or more example implementations of the disclosure.

In some implementations, as shown in example FIG. 21, one of the audio features of the extracted 500 at least one of the features of the first set of audio features by social engineering attack defense process 10 may include 580 intent. Social engineering attack defense process 10 may include transcribing audio from at least the portion of the communication into text. The transcribed audio may allow for the communication to be analyzed through an automated speech recognition process and a natural language process. Social engineering attack defense process 10, by utilizing machine learning algorithms and/or a natural language process that extracts the intent from the communication, may determine the nature of the communication. For example, the nature of the communication may be analyzed to determine the intent of the communication, such as but not limited to, attempting to have an email opened or to urge a potentially harmful activity to be performed. For example, user 46 may receive a voice message over an instant messaging system urging user 46 to access a specific website. In analyzing this message for potential social engineering attack activity, social engineering attack defense process 10 may transcribe and analyze the voice message by utilizing a natural language process to determine the intent of the communication. For example, the national language process may determine intent by analyzing words and sentences within voice messages against a database of language definitions (e.g., based on grammar and word usage). Intent analyzers, as appreciated by one of skill in the art, may use an ontology of objects, nouns, verbs, and known entities for a subject and use natural language processing to map user utterances into a set of candidate requests or statements within that topical ontology. For example, a long voice mail urging a user to call in and settle a purported debt may be analyzed and the intent extracted. Various phrases such as "you owe money", "we are the IRS", "you have not paid", "you are going to receive a lien", and additional phrases may be analyzed to extract an intent. The extracted intent may be represented in the system as an imperative command in a more abstract form, e.g. "call this number and provide payment information". In analyzing a different communications, the intents extracted may be "I am a friend of executive X" or "provide me with the contact information for executive X". Use of the NLP combined with verb/noun analysis as mapped into the ontology may extract the intent of a communication trying to contact an executive such as "provide me with contact information" and may trigger a corresponding rule.

Figure 22:
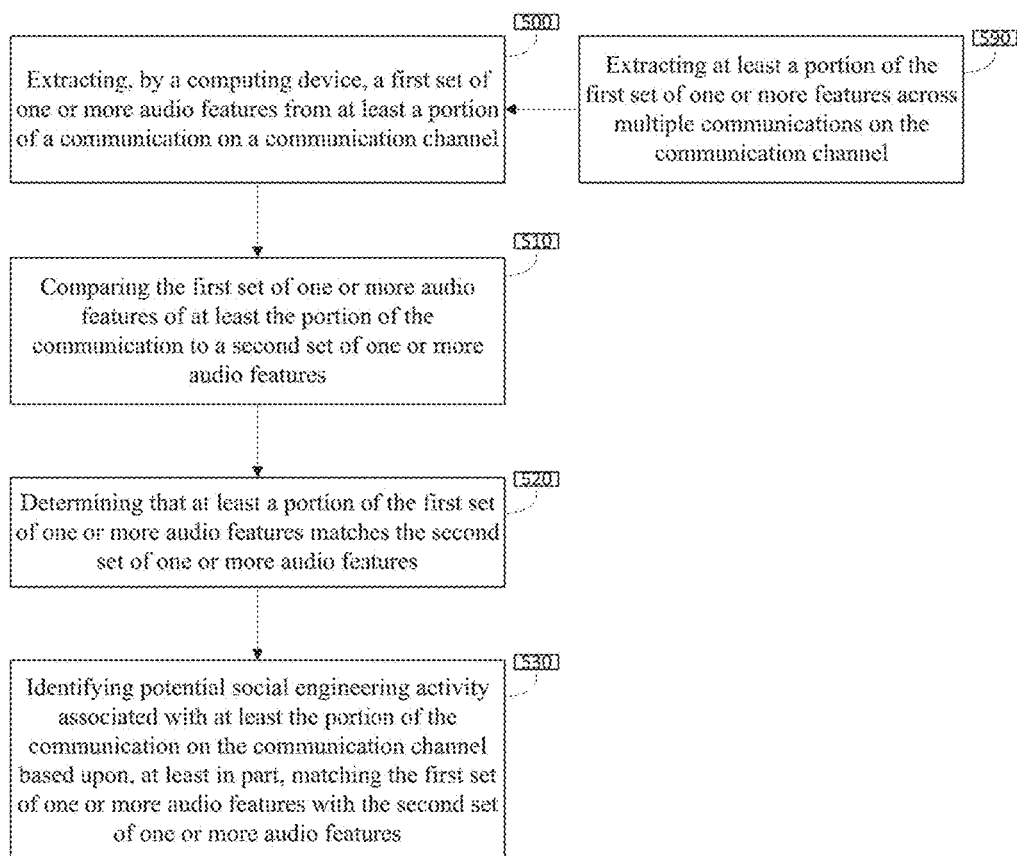
FIG. 22 is an example flowchart of a social engineering attack defense process according to one or more example implementations of the disclosure.

Social engineering attacks may involve multiple communications as part of a larger social engineering campaign. Earlier communications may be used to establish communications with a potential victim. Later communications may be used to build trust with that potential victim. Final communications may be used to execute the attack. In some implementations, as shown in example FIG. 22, the extracting 500 by social engineering attack defense process 10 may include extracting 590 at least a portion of the first set of one or more features across multiple communications on the communication channel.

In some implementations, social engineering attack defense process 10 may extract and analyze features from the multiple communications to determine the intent of the communications. Social engineering attack defense process 10 may utilize one or more processes to extract and analyze these features, including but not limited to, a natural language process, a dialog manager, machine learning algorithms, and an intent extractor process. In some implementations, social engineering attack defense process 10 may utilize the extracted features to create a model of the intent of the potential social engineering attacker.

For example, user 46 may receive over time three VoIP messages from the same person. Social engineering attack defense process 10 may extract 500 a first set of one or more audio features made up from features from each of three VoIP messages. Social engineering attack defense process 10 may determine 520 that at least a portion of the first set of audio features matches a second set of one or more audio features located within a datastore. If there is a match between the first set of audio features with the second set of one or more audio features, social engineering attack defense process 10 may identify 530 potential social engineering activity associated with at least a portion of the three VoIP messages.

The Deep Learning on Attack Energy Vectors Process:

Social engineering attacks may also utilize multiple communication channels, both to hide the source of the attacks and to add to the apparent validity. Social engineering attack defense process 10 may be capable of detecting patterns of activity that can be recognized across multiple channels, and may be capable of performing this detection in a computationally scalable manner without having to conduct deep content inspection on all incoming and outgoing communication traffic simultaneously.

In some implementations, social engineering attack defense process 10 may be capable of detecting these patterns by monitoring the communication activity across multiple communication channels and assigning a score to each communication based on the communication's activity record, such as but not limited to, when the communication occurred, how much data was used for the communication, the communication's source, the communication's destination, and the frequency of communications. The score may be defined as a weighted combination of numerically rated communication factors, e.g. a score based on the frequency of communications with a particular source, or the frequency of communications directed at a particular person, or the frequency of voice mail messages being left for non-sales personnel, or the size and frequency of text messages from a set of sources with destinations in upper management. For example, a given channel may have a score such as an average frequency of communication for that channel and a user of that channel, or may have a different score such as an average frequency of communication for that channel and a category of user (e.g., engineer, manager, executive) for that channel. In another example, the given channel may have another score such as an average frequency for the whole company for that channel. Some companies may, as a policy, prohibit the use of social media messaging or specific messaging applications for business communication, and thus any communication on these types of restricted channels may produce a score that exceeds a threshold. In other examples, a user may only occasionally use a channel thus a sudden spike in usage of the channel for the user would result in a score exceeding a threshold for that engineer user (even though sales department personnel may use it frequently). Similar statistics may be recorded and maintained based on size of message e.g., whether the channel is used for a short burst type of coordinating communication (e.g., "see you at 8") versus a large textual type of communication (e.g., "can you tell me the measurements for that part"). Additionally, the social engineering attack defense process 10 may be provided with information on both source and destination parties as well as IP addresses. The social engineering attack defense process 10 may use this information to determine if the source party (e.g., calling party), the destination party (e.g., receiving party), or the location of the calling or receiving party is as expected or exceeds thresholds for that category of score. Additionally, there are usual times of day, week, month, or year that specific communication channels are used, e.g., most support calls occur during business hours; sales calls do not occur in the early morning; emergency IT support calls may occur at any time of day, etc. However, SMS messages and other text systems especially email are likely to be used outside of business hours, especially if they are not believed to interrupt a user outside of work. Thus, there may be thresholds for certain categories of score based on ongoing analysis of when it is appropriate to monitor whether activity on a particular communication channel would be potentially suspicious activity.

The communication's activity record may also be known as the communication's energy. The content of the communication, however, may not be analyzed in some implementations. Social engineering attack defense process 10 may add the scores of each communication across the multiple communication channels, and may determine if the combined score exceeds a threshold score. If the threshold score was exceeded, social engineering attack defense process 10 may be capable of analyzing the content of those communications that exceeded the threshold score for potential social engineering attacks.

In some implementations, due to the volume of social engineering attacks, social engineering attack defense process 10 may utilize machine learning, such as but not limited to, within a neural network, to detect patterns of communication. Social engineering attack defense process 10 may utilize one or more techniques in the detection of patterns of communications. These techniques may include, but are not limited to, pattern matching, dialog understanding, and analysis of a broad set of communication energy. Pattern matching may involve matching a communication to a known social engineering attack. For example, when social engineering attack defense process 10 is analyzing an audio communication, it may match the voice on the audio with a voice known as a social engineering attacker. Dialog understanding may involve analyzing the flow of the conversation (e.g., analyze the way in which social engineering attacker speaks by analyzing the words or phrases that are used). For example, social engineering patterns may include conversations intended to establish familiarity, create points of agreement, and to relax the target and establish the specious identity of the caller or to elicit sympathy. This may be followed by a call to action to compromise the target's system, followed by a fallback to other compromising attempts, and/or followed by attempts to repair the rapport if needed. The conversation may be analyzed and intents (e.g., "trust me", "I am who you believe I am", "please give me access to this protected resource") may be extracted. The flow or sequence of the conversation may likewise be analyzed (e.g., an attempt to establish rapport or identity followed by an attempt to vary a rule; or a failed attempt to authenticate followed by an alternate attempt to authenticate, then followed by an attempt to vary a rule; or an attempt to substantially change multiple aspects of an account such as an email, a phone number, and a password). Social engineering attack defense process 10 may utilize natural language processing to extract intent from each phase of the conversation. Social engineering attack defense process 10 may utilize the natural language process to determine the intent of the attacker. An analysis of a broad set of communication energy may involve tracking the various aspects of the multiple communications, including but not limited to source, timing, duration, size, and text of the conversation. Social engineering attack defense process 10 may utilize machine learning algorithms to analyze these aspects across all communication channels to determine if there is a match to known multi-channel threat scenarios. Training of social engineering attack defense process 10 may be performed by utilizing a set of known communication data and a set of known social engineering attack data.

Figure 23:
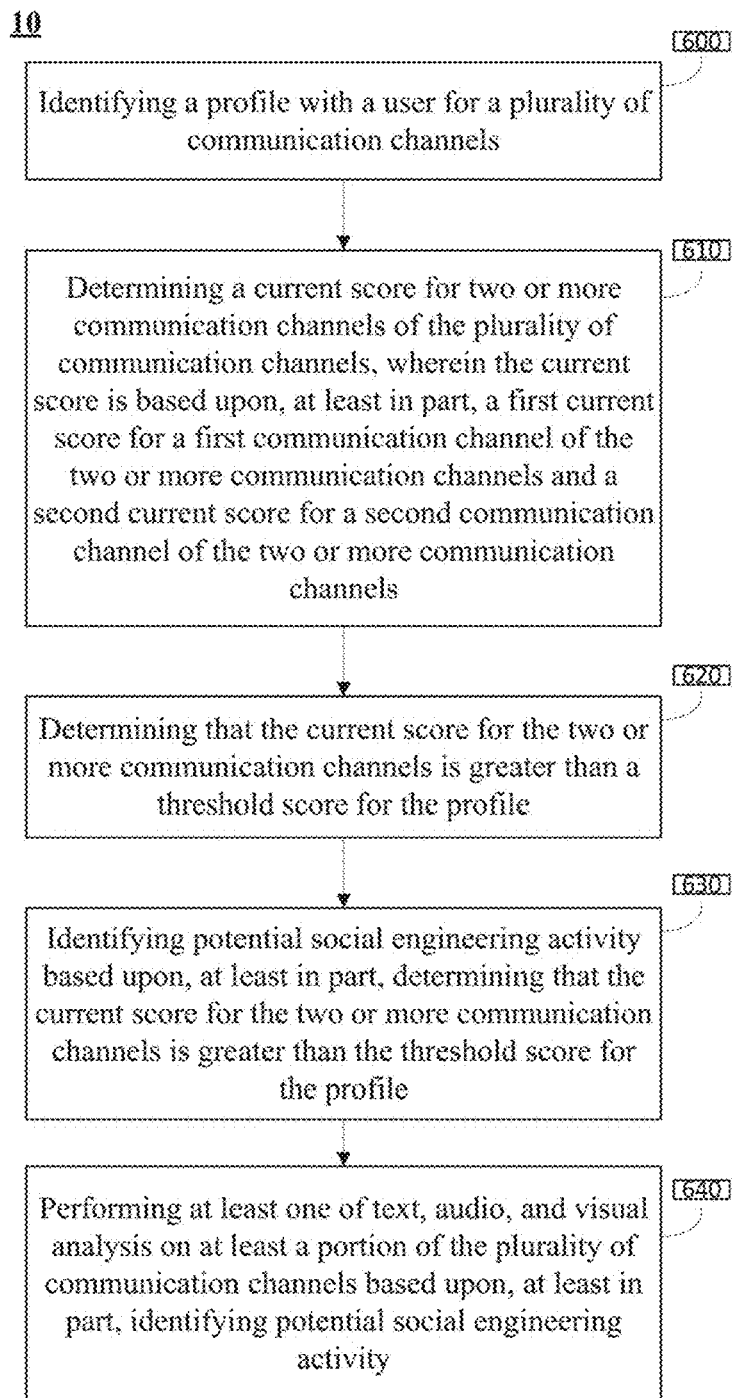
FIG. 23 is an example flowchart of a social engineering attack defense process according to one or more example implementations of the disclosure.

As discussed above, and referring also at least to the example implementation of FIG. 23, social engineering attack defense process 10 may identify 600 a profile with a user for a plurality of communication channels and may determine 610 a current score for two or more communication channels of the plurality of communication channels. The current score may be based upon, at least in part, a first current score for a first communication channel of the two or more communication channels and a second current score for a second communication channel of the two or more communication channels. A determination 620 of whether the current score for the two or more communication channels is greater than a threshold score for the profile may be made by social engineering attack defense process 10. Identifying 630 potential social engineering activity may be based upon, at least in part, a determination that the current score for the two or more communication channels is greater than the threshold score for the profile. Based at least in part upon the identification of potential social engineering activity, at least one of text, audio, and visual analysis may be performed 640 upon at least a portion of the plurality of communication channels.

In some implementations, social engineering attack defense process 10 may monitor communication activity across multiple communication channels and may assign a score to each communication based on the communication's activity record, and may determine if each score or sum of scores from multiple communications exceed a threshold score. For example, during a typical day, user 46 may receive communications from VoIP phone calls, email messages, text messages, and messages from social media websites. Social engineering attack defense process 10 may monitor these communications and may determine 610 a current score to each communication based on the activity record for each communication. Social engineering attack defense process 10 may add the current score from at least two of these communications and may determine 620 if the current score is greater than the threshold score for user 46. If the current score is greater than the threshold score, social engineering attack defense process 10 may identify 630 that a potential social engineering attack may exist and may perform 640 analysis on the communication channels.

Figure 24:
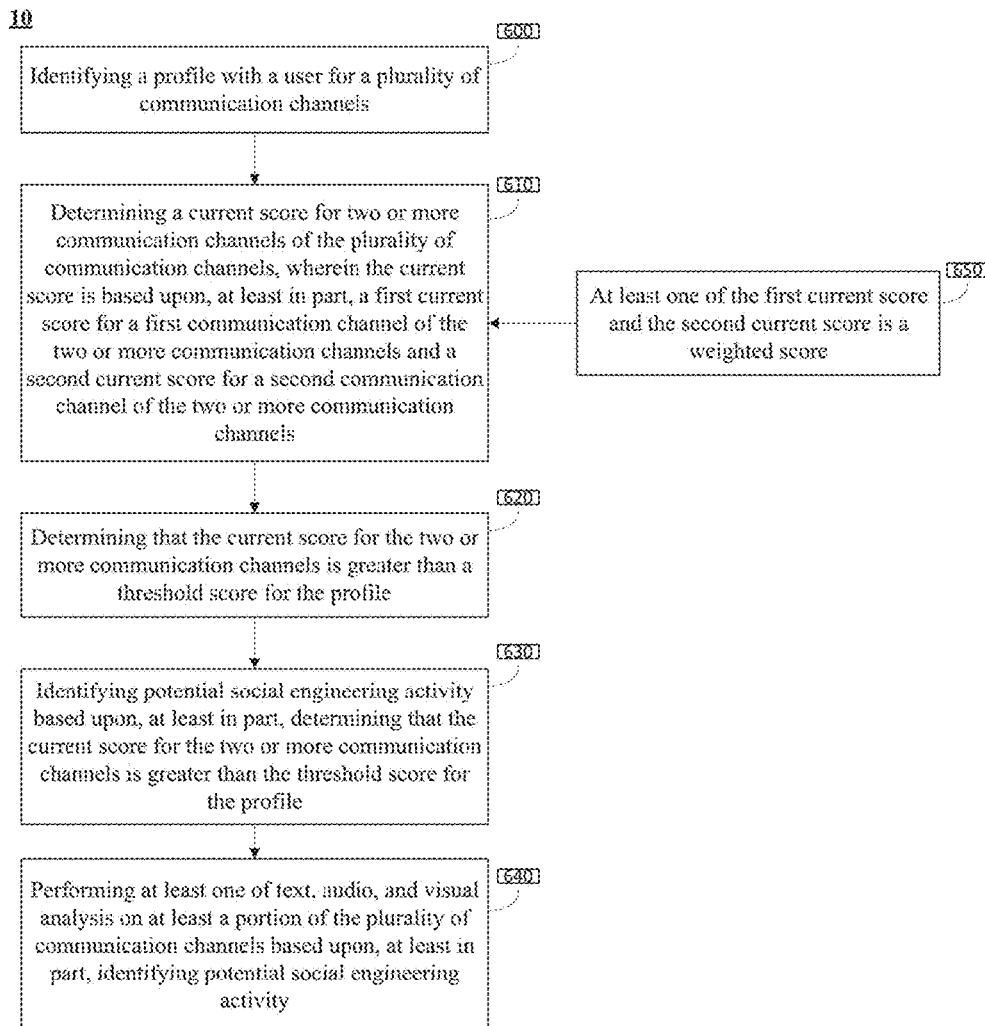
FIG. 24 is an example flowchart of a social engineering attack defense process according to one or more example implementations of the disclosure.

In some implementations, as shown in example FIG. 24, social engineering attack defense process 10 may determine 620 a current score where at least one of the first current score and the second current score may be a weighted score 650. A weighted score may generally be described as a score that is enhanced due to one or more factors, such as frequency or duration of a communications. For example, user 46 may have a threshold score that is based on receiving twenty VoIP phone calls in a day. Social engineering attack defense process 10 may monitor ten VoIP phone calls to user 46 in an hour. Social engineering attack defense process 10 may give a value to the frequency of VoIP phone calls, e.g., give a weighted score based on the time between the VoIP phone calls. Thus, while a non-weighted score for ten received VoIP phone calls may typically be less than the threshold score for user 46, due to the score being weighted based on the frequency of the calls, social engineering attack defense process 10 may determine that the threshold score of the user may be exceeded e.g. threshold 1=10-20 calls per day; threshold 2=2-15 minutes per call; threshold 3=10-40 minutes between calls or 2-3 calls per hour. The weighted score may contain a scalar component of each attribute, e.g. score=a x (calls per day)+b x (call duration)+c x (call spacing), where a, b, and c are adjustable weights for each component of the score.

Figure 25:
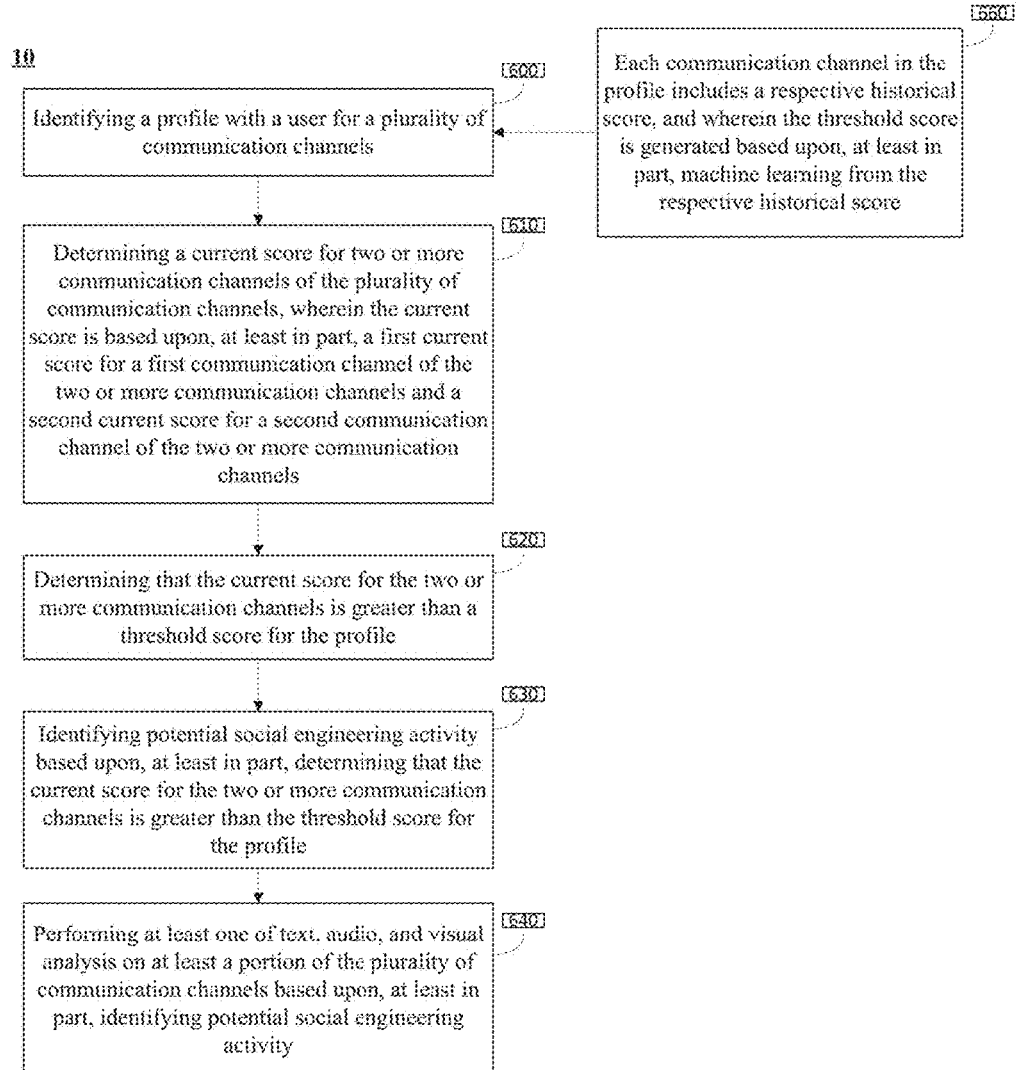
FIG. 25 is an example flowchart of a social engineering attack defense process according to one or more example implementations of the disclosure.

In some implementations, as shown in example FIG. 25, social engineering attack defense process 10 may identify 600 a profile where the profile may include a respective historical score and the threshold score may be generated based upon, at least in part, machine learning from the respective historical score 660. A historical score may be based on a specific user's historical activity, e.g., a user's regular communication activity level. An example of specific historical activity may include user 46 receiving five VoIP phone calls and ten text messages each day. A generic threshold score may be based on a combination of the specific historical activity with a particular job classification, e.g., a computer programmer typically receives two VoIP phone calls and twenty text messages each day with each call lasting 5-10 minutes. Thus, the threshold score may be generated based on a combination of expected values for a specific user and expected values averaged across members of the user's particular job classification. Machine learning may include a deep learning algorithm, e.g., Back Propagation (BP), which may generally be described as a method of training artificial neural networks containing hidden layers that may be used to consistently recognize patterns within the communication channels.

Figure 26:
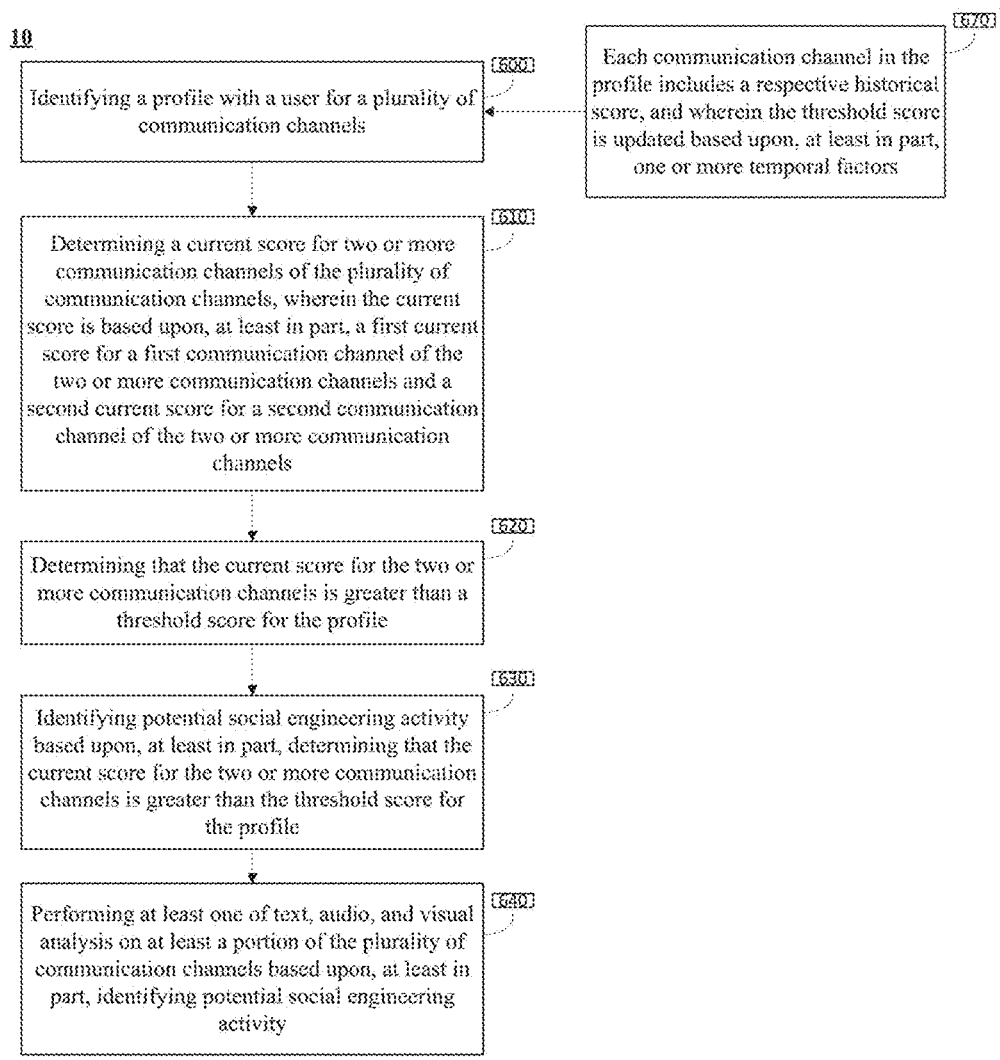
FIG. 26 is an example flowchart of a social engineering attack defense process according to one or more example implementations of the disclosure.

In some implementations, as shown in example FIG. 26, social engineering attack defense process 10 may identify 600 a profile where the profile may include a respective historical score and the threshold score may be updated based upon, at least in part, one or more temporal factors 670. Temporal factors may be those activities from the user's activity record relating to time, e.g., the length of a voice message, the length of a VoIP phone call, the time of day an email message was received, etc. For example, user 46 may have a historical score based on historical activity of user 46, e.g., user 46 typically receives five VoIP phone calls and ten text messages each day. Social engineering attack defense process 10, when determining the threshold score for user 46, may update 670 the threshold scored based on the time of day and length of most recent VoIP phone calls for user 46.

Figure 27:
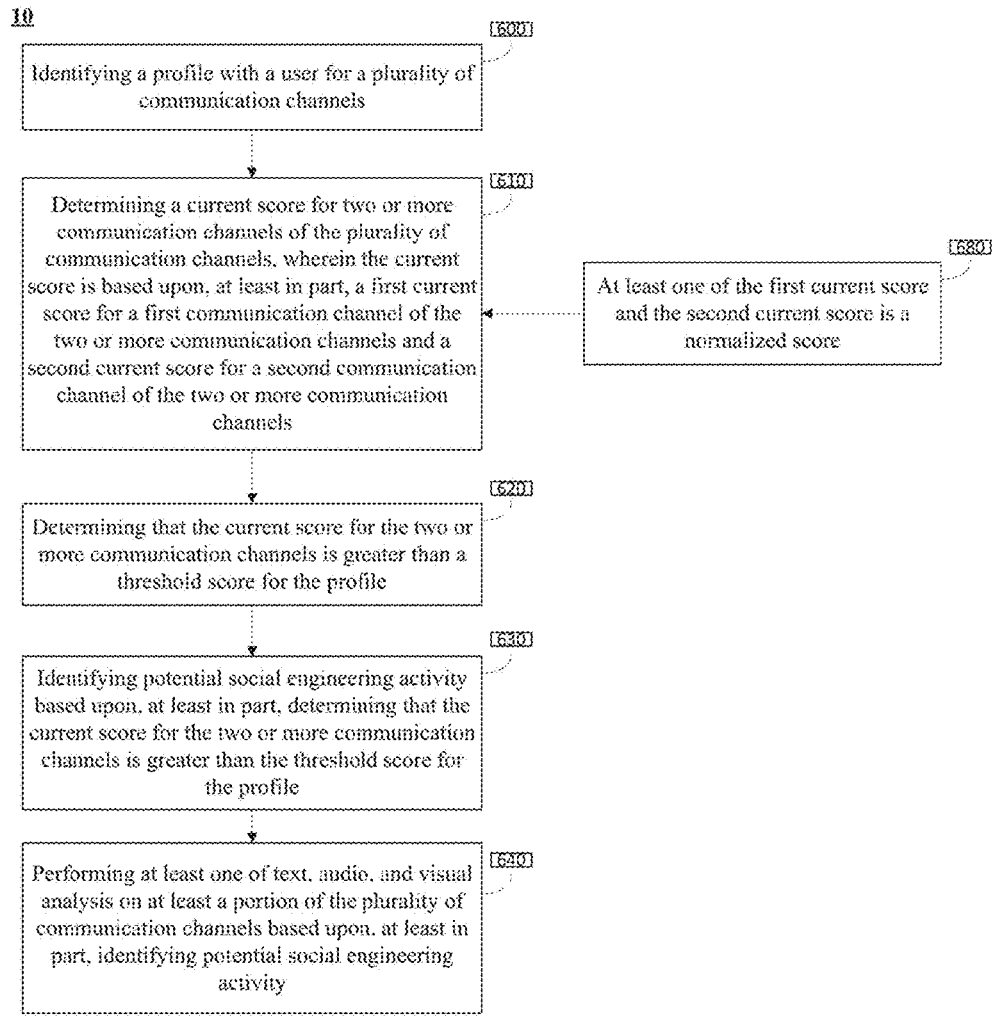
FIG. 27 is an example flowchart of a social engineering attack defense process according to one or more example implementations of the disclosure.

In some implementations, as shown in example FIG. 27, social engineering attack defense process 10 may determine 620 a current score where at least one of the first current score and the second current score may be a normalized score 650. A normalized score may generally be described as a score that includes adjustments to values measured on different scales so as to have a common scale. For example, social engineering attack defense process 10 may monitor multiple VoIP phone calls and multiple text messages to user 46. Social engineering attack defense process 10 may assign a first current score to the VoIP phone calls based on the frequency and duration of the VoIP phone calls, and may assign a second current score to the text messages based on the frequency and size of the text messages. For example, a first current score for the VoIP phone calls for a particular user or group of users may be based on a call duration between 5-10 minute calls to about 30 minute calls, with expected frequencies around three per day and 12 per work-week. A second score may be based on an example average size of text messages (e.g., on a messaging service) of 80 characters and send these messages in clusters, with e.g., frequency of every 30 seconds for 20 minute session periods. A set of large text messages in rapid succession or a single small text message from an usual source would be a divergence from the expected values as expected in a rule. The combination of unusual patterns of message sizes or frequencies plus unusual call sizes or frequencies, when identified as related in some way (same source, same topic, same time frame) could match a rule of suspicion. A rule of suspicion may be based on examples and may be based on measurements over time and new baseline sets. In general, the rule of suspicion may vary per person, per company, per industry, per category of user, etc. This may result in a difference scales between the duration of the VoIP phone calls and the size of the text messages. When social engineering attack defense process 10 determines 610 a current score for the VoIP phone calls and text messages, the measured values of the duration of the VoIP phone calls and size of the text messages may be adjusted by social engineering attack defense process 10 so that these values are on a comparative scale.

Figure 28:
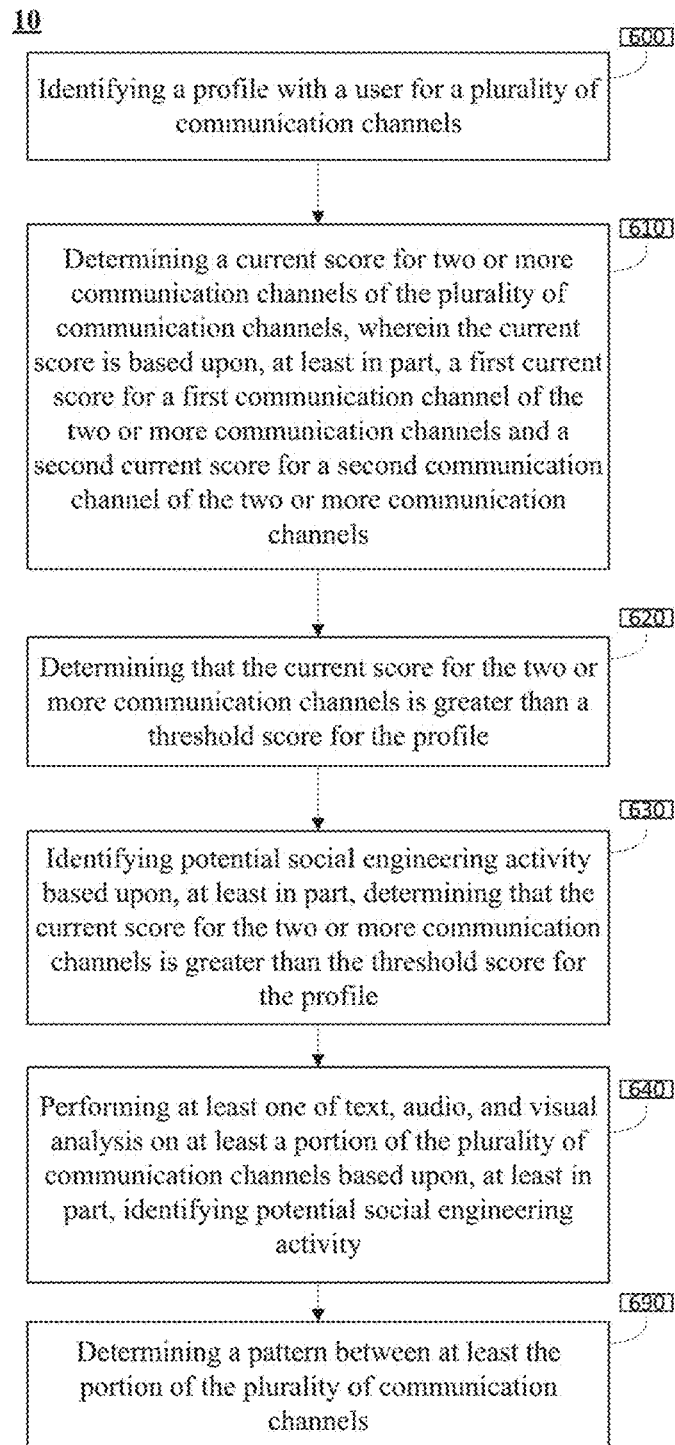
FIG. 28 is an example flowchart of a social engineering attack defense process according to one or more example implementations of the disclosure.

In some implementations, as shown in example FIG. 28, social engineering attack defense process 10 may determine 690 if there is a pattern between at least a portion of the plurality of communication channels. A pattern may generally be described as a repeating form of communication and may be explicit or implicit. An explicit pattern may be readily detected within the communication. For example, an email with a link followed by a request to open the email. In contrast, an implicit pattern may not be readily detectable. An example of an implicit pattern may be the combination of communications that are later deemed to be part of a related attack. Implicit patterns may generally be discernable through finding connections across a plurality of communication channels. For example, user 46 may receive on a daily basis multiple VoIP phone calls, text messages and email messages. Social engineering attack defense process 10 may monitor each of these communications and may determine 610 a current score for these communications. Social engineering attack defense process 10 may also determine that user 46 receives VoIP phone calls, text messages and email messages from the same source every third day at same time each day. Social engineering attack defense process 10 may determine 690 these communications could be a pattern leading to a potential social engineering attack.

Figure 29:
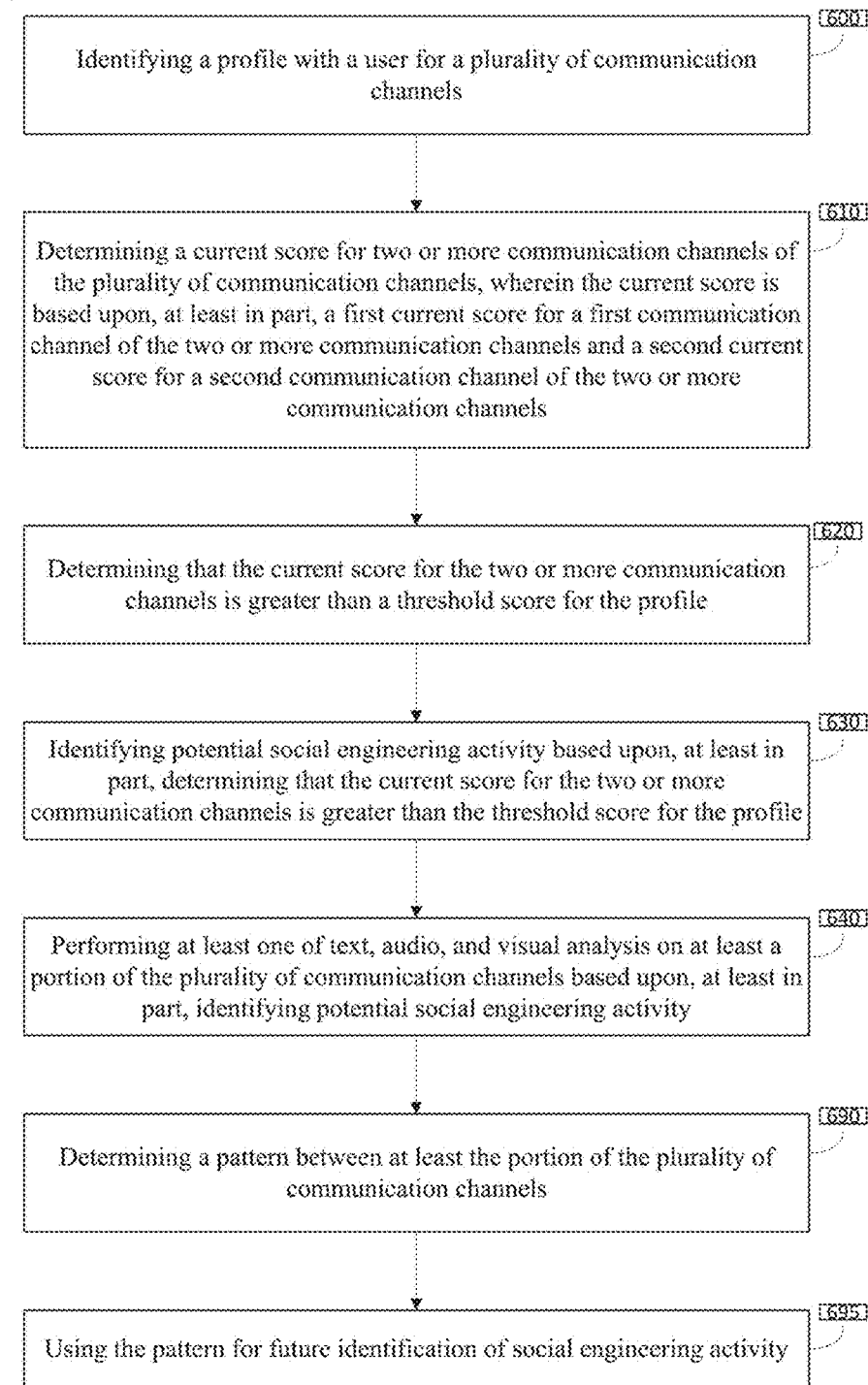
FIG. 29 is an example flowchart of a social engineering attack defense process according to one or more example implementations of the disclosure.

In some implementations, as shown in example FIG. 29, social engineering attack defense process 10 may determine 690 if there is a pattern between at least a portion of the plurality of communication channels and may use 695 this pattern for future identification of social engineering activity.

For example, as noted above, social engineering attack defense process 10 may determine 690 that a plurality of VoIP phone calls, text messages and email messages to user 46 follows a pattern that may indicate the potential social engineering attack. The information establishing this pattern may be stored on storage device 16 for use 695 by social engineering attack defense process 10 in the identification of future social engineering activity.

The Deprovisioning Process:

In some implementations, a user may utilize a third party network for both work and personal purposes. Third party networks may include, but are not limited to, social networks, social messaging system, and future social affinity group communication mechanisms. The use of these types of communication channels may expose business-critical information to social engineering attacks. This exposure may become critical when a person is no longer an employee of a company e.g., because the organization may have limited ability to track former employee's activity as well as limited ability to control activity by former employee. For example, the former employee may have left on bad terms or not all personnel may be aware that the former employee has left and thus may communicate with the former employee with the same level of security as when the employee was employed, and thus may provide proprietary information inadvertently. Due to the inability to track and monitor the communications on these types of communication channels, the risk of a social engineering attack may be increased.

In some implementations, social engineering attack defense process 10 may modify access to personal information within a company network or a third party network based on a change in status of an employee. Social engineering attack defense process 10 may modify the access directly, e.g., social engineering attack defense process 10 performs the changes in the access capabilities, may provide a prompt to a third party network in order for the third party network to effectuate the changes in the access capabilities or may provide a prompt to a third party communication audit company in order for that company to effectuate the changes in the access capabilities. In some implementations, an interface, such as but not limited to an application programming interface (API), may be created to assist with the communication between social engineering attack defense process 10 and a third party network.

In some implementations, the modification of access may include a complete severing of access to all information or a partial restriction to the information. For example, when a first user is no longer employed with a company, his/her access to personal information of other company employees contained on a third party social media network may be completely severed or may be modified to allow only publicly available information to be accessed (e.g., social engineering attack defense process 10 may modify the authorizations of the first user such that the first user is removed from accessing non-public information on the third party social media network). For example, company human resource (HR) systems may contact a social network application and request that the first user no longer be listed as with the company or may simply revoke a digital signature that indicated to the social network application that the employee was verified as employed with the company. In another example, the company HR system may activate "circles", "groups", or access permission features within the social network and may disallow or limit access to a company-specific group on the social network, using features such as group membership administration on the social network.

Figure 30:
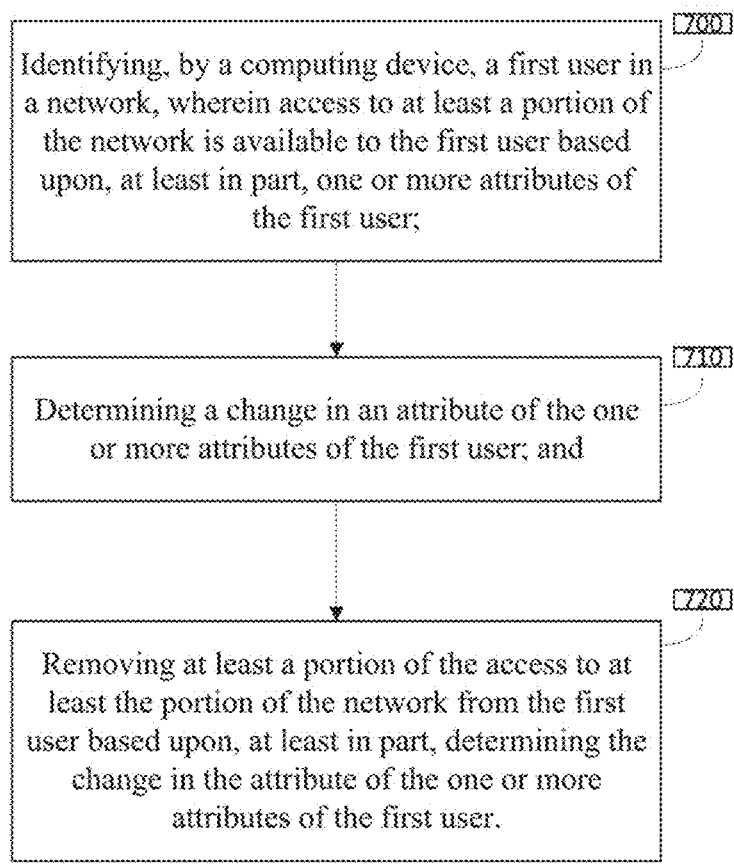
FIG. 30 is an example flowchart of a social engineering attack defense process according to one or more example implementations of the disclosure.

As discussed above, and referring also at least to the example implementation of FIG. 30, social engineering attack defense process 10 may identify 700, by one or more computing devices, a first user in a network. Access to at least a portion of a network is available to the first user based upon, at least in part, one or more attributes of the first user. A determination 710 by social engineering attack defense process 10 may be made that a change in an attribute of the one or more attributes of the first user has occurred. At least a portion of the access to at least a portion of the network by the first user may be removed 720 by social engineering attack defense process 10 based upon, at least in part, the determination of the change in the attribute of the one or more attributes of the first user.

In some implementations, the network may be an internal network controlled by a company or an external third party network outside of a company, e.g., social media networks such but not limited to Linkedin and Facebook, and cloud server sharing networks, such as but not limited to, Microsoft Sharepoint.

In some implementations, an attribute may be a quality or characteristic associated with a user. An attribute may be associated to user's employment. For example, but not limited to, the user's employment status, e.g. currently employed; the user's position within the company, e.g., CEO, computer programmer, receptionist; and the user's access to business-critical information, e.g., financial information, personnel information. An attribute may also include, but not be limited to, employment start date, employment end date, tenure, job titles and positions, executive status, human resources data, membership in company committees or groups, active directory data, filtered active directory data, lightweight directory access protocol (LDAP) information, access permissions, single-sign on credentials and access lists.

In some implementations, social engineering attack defense process 10 may identify 700 a first user in a network. The network can be any computer based network, e.g., an enterprise network or a social media network, having the capability of a plurality of users having access to a plurality of information. Access can be obtained through established standard communication environments, such as, but limited to, email, text messaging and social networks. For example, social engineering attack defense process 10 may identify user 46 who has access to a computer based social media network.

In some implementations, social engineering attack defense process 10 may determine 710 that one or more attributes of the first user has changed. For example, user's 46 employment may be terminated. Social engineering attack defense process 10 may determine by monitoring a social media network utilized by user 46 of a change of employment by user 46 (e.g., social engineering attack defense process 10 may determine change of employment when user 46 changes profile on social media network from employment at company X to employment at company Y, or when company X's HR system revokes a certificate that indicates to the social media network that user 46 is employed at company X).

In some implementations, social engineering attack defense process 10 may remove 720 at least a portion of the access to at least a portion of the network by the first user, based upon, at least in part, the determination 710 of the change in the attribute of the one or more attributes of the first user. The removal of access by social engineering attack defense process 10 may be performed by social engineering attack defense process 10, by providing a prompt to a third party network in order for the third party network to effectuate the removal, or by providing a prompt to a third party communication audit company in order for that company to effectuate the removal.

For example, once social engineering attack defense process 10 determines that user's 46 employment status has changed from currently employed to former employee, social engineering attack defense process 10 may provide a prompt to a third party network, e.g. Linkedin, notifying the third party network of the change in user's 46 change of employment status so that the third party network may remove user's 46 access on its network to some or all of the company's contact information for its current employees.

In some implementations, a second user may have access to at least a portion of a network based on one or more attributes of the first user. The second user may be internal to the company where the first user is employed, e.g., a co-worker, or external to the company, e.g., a personal friend not employed at the same company as the first user. For example, in the case of an internal second user, the first user and second user may be part of the same business group where the second user may have access to business critical information created by the first user. Further, in the case of an external second user, the second user may have access to the first user's company network due to the first user's use of a company email address with an external social media network (e.g., second user may have access to documents shared between first user and first user's company network). This may occur simply because the second user is connected to the first user and the first user has given the second user access to shared information (e.g., business critical information shared with company network) or because the information was shared in the process of co-participation in conferences or standards groups or a client/provider relationship, where the information might have been shared through a business file sharing service or cloud storage service. In other examples, the second user may have access to the first user's company network where the second user was granted limited access to company information for the purposes of discussing a business relationship or where the second user's "friends" or "contacts" of the first user automatically inherit the ability to receive information or blog posts or messages sent by first user as part of the features of the social network. In another example, the second user may be able to view all the contacts of first user (based on there being a second degree of separation between second user and first user) and thus have detailed information about all company employees known to first user (e.g., detailed information on third party network such as LinkedIn™).

Figure 37:
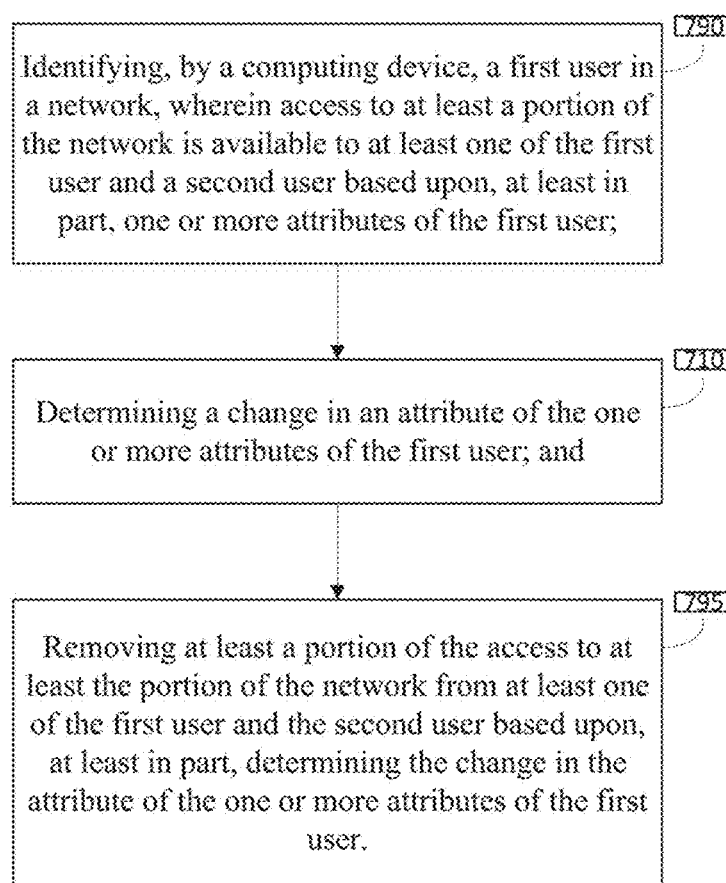
FIG. 37 is an example flowchart of a social engineering attack defense process according to one or more example implementations of the disclosure.

In this implementation, as shown in example FIG. 37, access to at least a portion of the network may be available to at least one of the first user and a second user based upon, at least in part, one or more attributes of the first user. In this implementation, social engineering attack defense process 10 may remove 795 at least a portion of the access to the at least the portion of the network from at least one of the first user and the second user may be based upon, at least in part, determining the change in the attribute of the one or more attributes of the first user. For example, user 48 may be external to user's 46 employment and both users 46 and 48 may be part of the same social media network where user 48 has access to user's 46 company contact information. In an example, when social engineering attack defense process 10 determines 710 user 46 is no longer employed with the company, social engineering attack defense process 10 may remove 795 some or all company contact information from user's 46 social media account 795, thus removing user's 48 access to this information.

In some implementations, as shown in example FIG. 36, a prompt may be provided 780 to at least one of the first user and the second user to remove at least the portion of the access to at least the portion of the network based upon, at least in part, determining the change in the attribute of the one or more attributes of the first user. In some implementations, the change in access may be optional for at least one of the first and second user. For example, after social engineering attack defense process 10 may determine 710 the status of user 46 has changed from employed to not-employed, and social engineering attack defense process 10 may provide a prompt 780 to user 48 to select which of user's 46 company contact information will be removed from user's 46 access.

Figure 31:
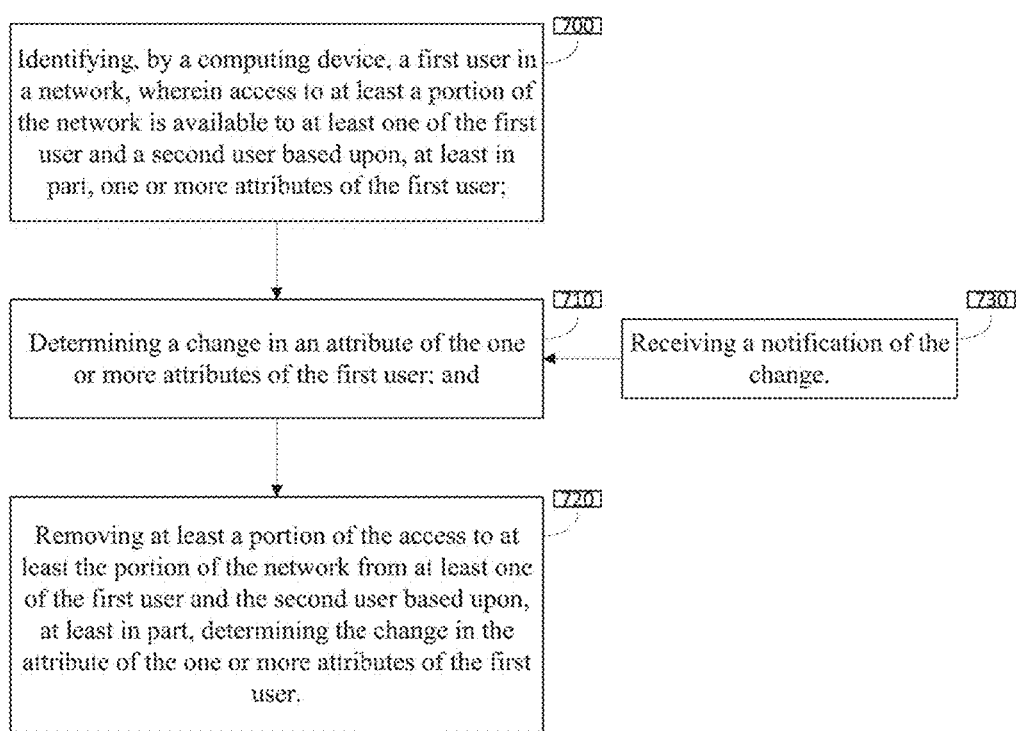
FIG. 31 is an example flowchart of a social engineering attack defense process according to one or more example implementations of the disclosure.

In some implementations, as shown in example FIG. 31, the determination 710 of a change in an attribute by social engineering attack defense process 10 may include receiving 730 a notification of the change. For example, when social engineering attack defense process 10 removes 720 user's 46 access to a portion of an enterprise network due to a change in employment, social engineering attack defense process 10 may notify 730 user 46 of this removal of access (e.g., notify by text, email, pop up window, social messaging, phone call, etc.).

Figure 32:
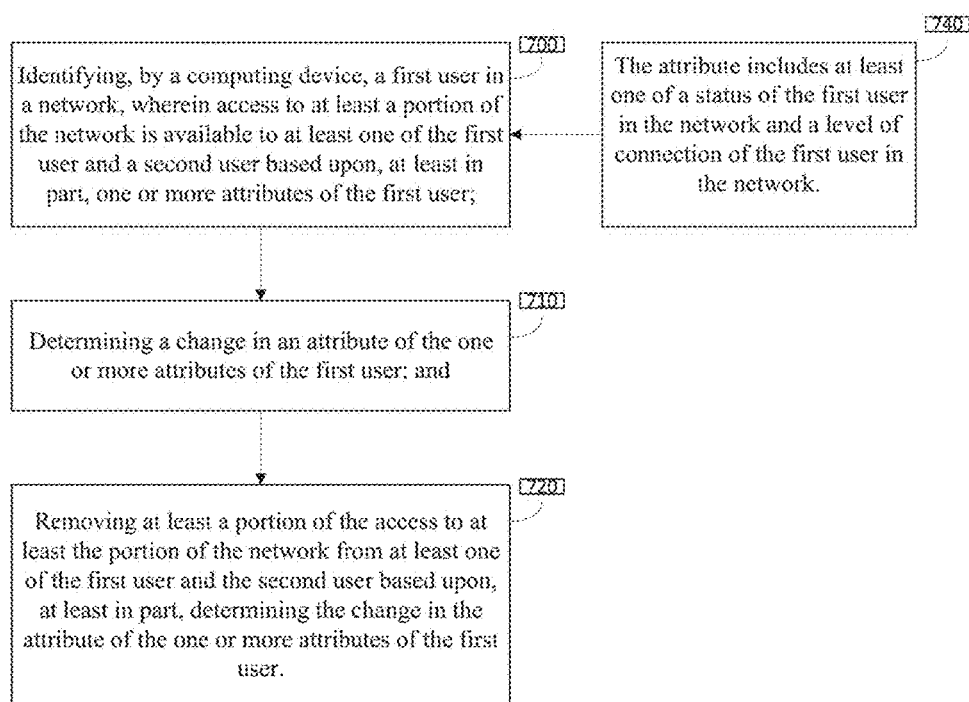
FIG. 32 is an example flowchart of a social engineering attack defense process according to one or more example implementations of the disclosure.

In some implementations, as shown in example FIG. 32, attributes may include 740 a status of the first user and a level of connection of the first user in the network. The status may be the condition of the first user, e.g., employed, married, unemployed, single. The level of connection may be the degree of connection between the first user and other users within the network, e.g., a tiered structure where a direct connection is a first degree connection, a once-removed connection is a second degree connection, and a second-removed connection is a third degree connection, etc. For example, social engineering attack defense process 10 may determine 710 the status of user 46 has changed from employed to not-employed. Social engineering attack defense process 10 may remove all company second and third degree connections from a social media network utilized by user 46 based upon this status change. In some implementations, the removal of the company connections may be automatic upon the determination 710 of the status of user 46. Further, in some implementations, notification of the removal of the connections may be given to user 46 and/or the users associated with the removed connections (e.g., a notification may be sent by text, email, pop up window, etc. to user 46 and/or the users associated with the removed connections). For example, a user may be sent a message that says "you are no longer a member of Company X employees' Group. You will no longer receive messages sent to this group, and you will only have limited access to profile information for group members that are not your first degree contacts".

Figure 33:
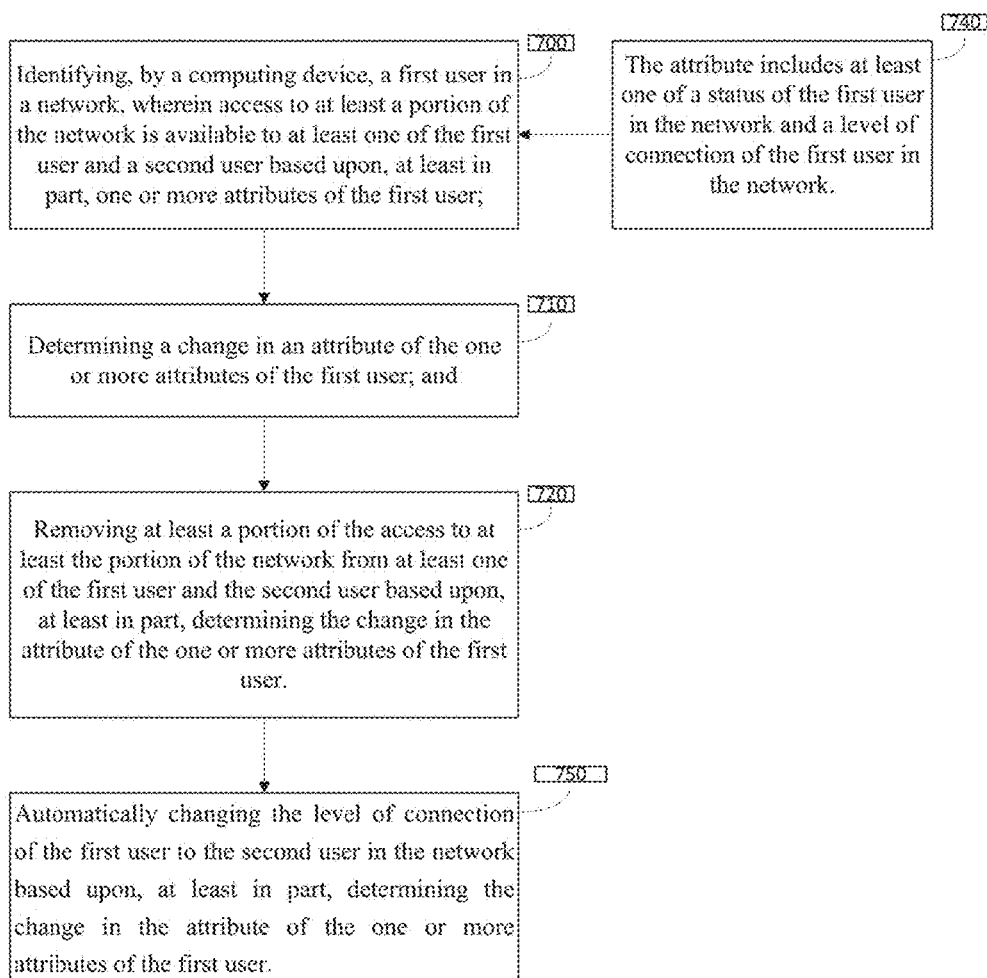
FIG. 33 is an example flowchart of a social engineering attack defense process according to one or more example implementations of the disclosure.

In some implementations, as shown in example FIG. 33, the level of connection of the first user to the second user in the network may be automatically changed 750 based upon, at least in part, determining the change in the attribute of the one or more attributes of the first user. For example, user 46 may be in a non-managerial role within a company and due to this role, may only have direct access to data files of other non-managerial employees. Further in the example, assume user 46 is then promoted into a managerial role within the company. Social engineering attack defense process 10 may determine 710 a change in user's 46 status and may automatically change 750 user's 46 level of connection with other managerial level employees so that user 46 has access to managerial level data files (e.g., user's 46 access to managerial level data files is automatically authorized when process 10 determines 710 that user's 46 status changed to managerial level). In another example, user 46 may start to work with a company. Social engineering attack defense process 10 may determine 710 a change in user's 46 status from "not employed" to "employed" and may automatically change 750 user's 46 level of connection within a social media network so that user 46 would have access to profiles of additional employees of the company who utilize the social media network (e.g., user's 46 access to profiles of employees of the entire company or only employees of a marketing department is automatically authorized when process 10 determines 710 that user 46 is employed within the marketing department of the company). User's 46 access to profiles of employees of the entire company or only employees of the marketing department is automatically authorized when social engineering attack defense process 10 determines 710 that user 46 is employed within the marketing department of the company. In some implementations, social engineering attack defense process 10 may automatically change 750 user's 46 level of connection through its own internal processes or by communicating the change in attribute to the social media network whereby the social media network's processes may make the change in level of connection.

Figure 35:
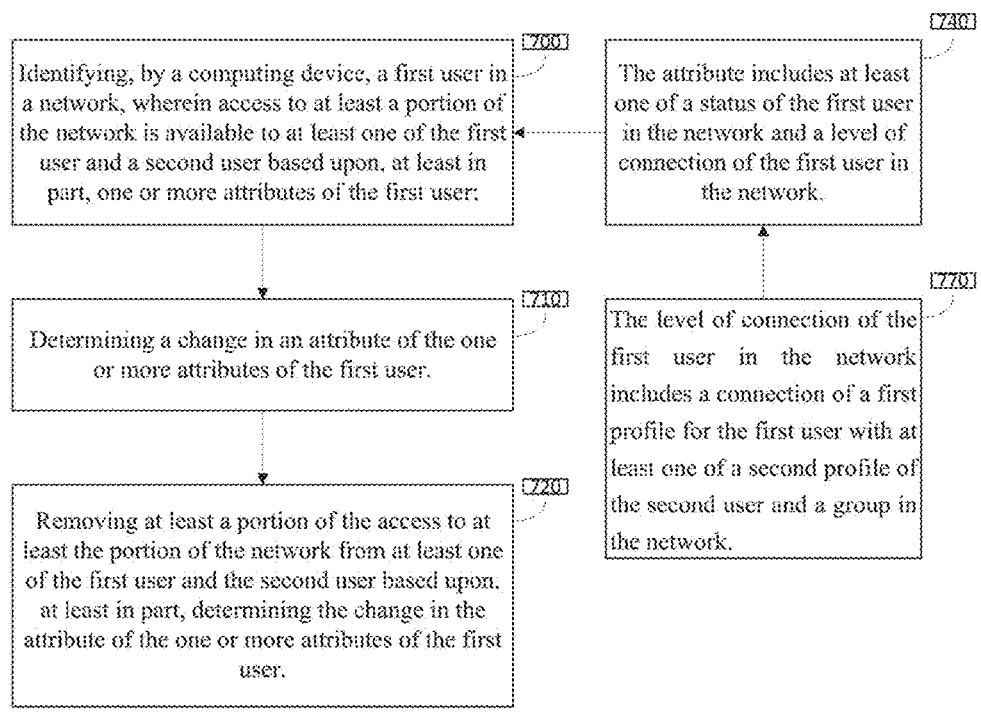
FIG. 35 is an example flowchart of a social engineering attack defense process according to one or more example implementations of the disclosure.

In some implementations, as shown in example FIG. 35, the level of connection of the first user may include 770 a connection of a first profile for the first user with at least one of a second profile of the second user and a group in the network. In some implementations, the level of connection of a user may be based on being part of the same group as a second user. For example, user 46 may be in a non-managerial role within a product development group within a company. Due to this role, a level of connection for user 46 may include 770 a connection with user 48 who may also be an employee within the same product development group within the company (i.e., users within same group may include 770 authorized access to connect with one another e.g., the employees within same product development group may be authorized to connect to each other). This access may be provided directly, by the company maintaining a list of users in their lightweight directory access protocol (LDAP) or active directory which includes their accounts on social media, and automatically inviting users to connect to these accounts. In another example, this access may be achieved using an application programing interface (API) provided by a social network where affinity groups of users may be created and maintained, and the company system automatically adds and removes users corresponding to these affinity groups. Similarly, this access may be provided on a captive or business-oriented social network that provides an intranet/internal social network that can automatically add and remove people from groups or "circles" or interest groups.

Figure 34:
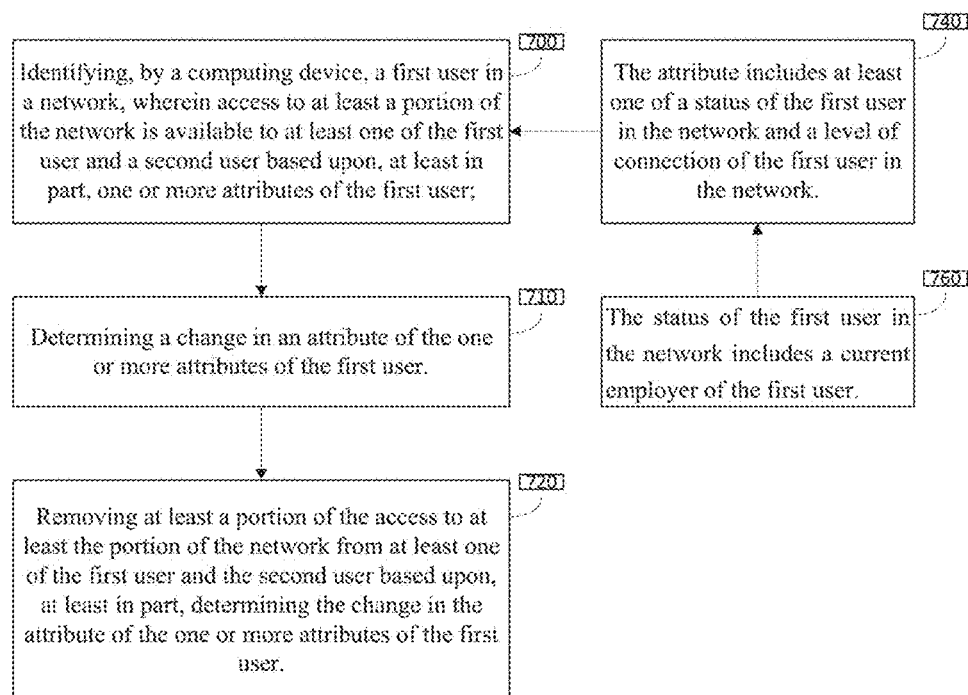
FIG. 34 is an example flowchart of a social engineering attack defense process according to one or more example implementations of the disclosure.

In some implementations, as shown in example FIG. 34, the status of the first user in the network may include 760 a current employer of the first user. In some implementations, a change in status may occur based on the first user's current employer. For example, user 46 and user 48 may be associated through the same social media network. Social engineering attack defense process 10 may determine 710 the status of user 46 has changed employers 760. Based on the change of employers, social engineering attack defense process 10 may remove user's 46 access to a portion of user's 46 social media information (e.g. user 46 is no longer authorized under the social media settings to access social media information of user 46 such as documents shared by user 46 or other contacts who are connected to or share their information with or are in the same groups as user 46).

In some implementations, social engineering attack defense process 10 may create an auditable policy, such as stored procedure or a declarative policy system, regarding the modification of access to information (e.g., setup policy that dictate authorized access by users to information within social media sites based on users' employment status within company). This policy may be provided to third party networks for installation therein. Because a social network or a third party monitoring service is not under the control of the company, it cooperates with company policy by receiving policy rules (in the form of procedures or declarations) that it follows and applies in an agreed-upon way with the company. These rules may be independently inspected ("audited") so that in the case of dispute between any of the parties (users, companies, social networks, third party service providers), there is clear agreement as to when to implement information sharing and when to prohibit sharing.

In some implementations, social engineering attack defense process 10 may provide a tool to third party networks to define a "verified" employee, e.g., the employer signs digitally through a certificate process indicating the employee is employed by the company. In the event a person attempts but fails to be verified, access to the third party network may be prevented or limited.

In some implementations, social engineering attack defense process 10 may increase access based on a change in status. This may allow access to third party network information to be automatic when there is a change in status. For example, when a first user joins a company, social engineering attack defense process 10 may automatically add a set of friends from the same company as inherited friends within the third party network. For example, when first user joins a company, all employees within the same company may be automatically added as connections to first user within third party network. In another example, when first user joins an R&D department of a company, all employees within the R&D department of same company may be automatically added as connections to first user within third party network. In some examples, this may be achieved through the "group" or "circle" features of the social network, or through intranet/internal social network software or cloud service. The social engineering attack defense process 10 may perform these actions directly or by prompting the third party network to effectuate the change.

In some implementations, social engineering attack defense process 10 may provide access to a shared database, such as but not limited to, a distributed ledger or blockchain, with third party networks. The shared database may hold verified credentials and related data of employees. This may allow for the reduction of the risk of tampering with the employee credential data while not being continuously maintained.

The Enterprise Authorization for Social Partitions Process:

In some implementations, as business, sales, and development increasingly occur on an expanding set of communication channels, such as but not limited to voice, text, messaging, video, pictures, artificial reality, virtual reality, and avatar-based channels, it may be beneficial to determine if a communication over a third party network is business or personal in scope and then provide access accordingly if it is a business-related communication. Thus, a company may seek access to all the communication channels of its employees. For example, an employee may utilize a social media network to communication with third parties. These communications may involve both personal and business related topics. Later, the employee may no longer be employed by the company but the company may like to gain access to the former employee's business related communications on the social media network.

In some implementations, social engineering attack defense process 10 may provide one or more rules or procedures to a third party network, which may allow social engineering attack defense process 10 to have selective access to business related communications located on the third party network. These rules and procedure may be pre-agreed upon between social engineering attack defense process 10 and the third party network. For example, as part of a condition for employment, an employee may be required to agree that access to their communications within a third party network is restricted from the company, but that if characteristics of the communications match a predetermined rule, such as but not limited to, a communication being between the employee and a second party and the communication is related to company business, the company's restriction to the access to the employee's communications may be removed as related to those communications.

In some implementations, social engineering attack defense process 10 may utilize, but not limited to, a pattern matching technique or a natural language process to determine if a communication satisfies a predetermined rule or procedure. The natural language process may perform a sentiment analysis, and may also utilize computational linguistics to characterize a communication as personal or business related. By utilizing a combination of regular expressions and/or machine-learning classifiers, the natural language process within social engineering attack defense process 10 may determine if a sentence, utterance, conversation or thread within a communication is business related, personal, or both. For example, a formal sentence, utterance, conversation or thread may be considered business communication. An informal sentence, utterance, conversation or thread may be considered personal communication. A sentence, utterance, conversation or thread having a mix of formal and informal may be considered both personal and business communication. For example, a user may say "Let's go grab some beers and hammer out this contract—say 9 pm at Sully's? We need to get this deal closed in Q1 or I'm in trouble with my bonus. Is Susan still upset about last weekend?"

In some implementations, social engineering attack defense process 10 may utilize communication rules that may be represented as regular expressions, stored procedures, declarative grammars, or a combination of formal declarations along with software code, such as but not limited to, JavaScript, used to implement the communication rule. Social engineering attack defense process 10 may automatically update communication rules based on new information received, derived, or generated by the application of another or the same communication rule. For example, a pattern matching regular expression that looks for business-related communication may look for the word "report". A company may use an acronym to discuss contracts, such as we need to get a "testing procedure specification report" or a "TPS report". The learning aspects of the social engineering attack defense process 10 may determine over time (through feedback loops) that "testing procedure specification" or "TPS" is a business term and subsequently label communications that contain the acronym "TPS" or "testing procedure specification" as business communication, whether the term "report" is contained or not. The filter may add "TPS" or "testing procedure specification" to the set of regular expressions used to analyze communications.

When creating and applying communication rules, social engineering attack defense process 10 may utilize latent knowledge and hidden or intermediate representations or layers representing rules such as, but not limited to, in a deep or recurrent neural network or statistical machine learning system. With latent knowledge, the term "TPS" may not show up in a conversation, but the words that normally surround TPS report discussions (e.g., "cover sheet", "submit", "report", "memo") may be used to infer that the subject of discussion is TPS reports. Similarly, hidden or intermediate representations in a neural network may have features such as sequences of words, phrases, portions of words, or otherwise human-unintelligible symbols that nonetheless result in detecting specific patterns in textual data or other data. Machine learning and neural networks processes as appreciated by one of skill in the art may be used for the above described applications such as utilizing latent semantic information, hidden layers or intermediate representations as part of rules.

In some implementations, social engineering attack defense process 10 may utilize business rules in, e.g., theayers analysis of communications, in the determination of what action to take if a particular type of communication is encountered, or in the construction of communication rules. A business rule may generally be described as a rule that defines or constrains an aspect of business and is intended to assert business structure or to control or influence the behavior of the business. Examples of business rules may include account management rules (e.g., rules for when user accounts are created, deleted or modified), workflow rules (e.g., rules for when a particular part of a business process is complete), business rules for other processes that are started or specific communications that are sent out, or business rules relating to approvals that are sought, etc. Business rules may apply to computing systems in an organization, and may be put in place to help the organization achieve its goals. Social engineering attack defense process 10 may utilize business rules in the construction and implementation of communication rules.

Figure 38:
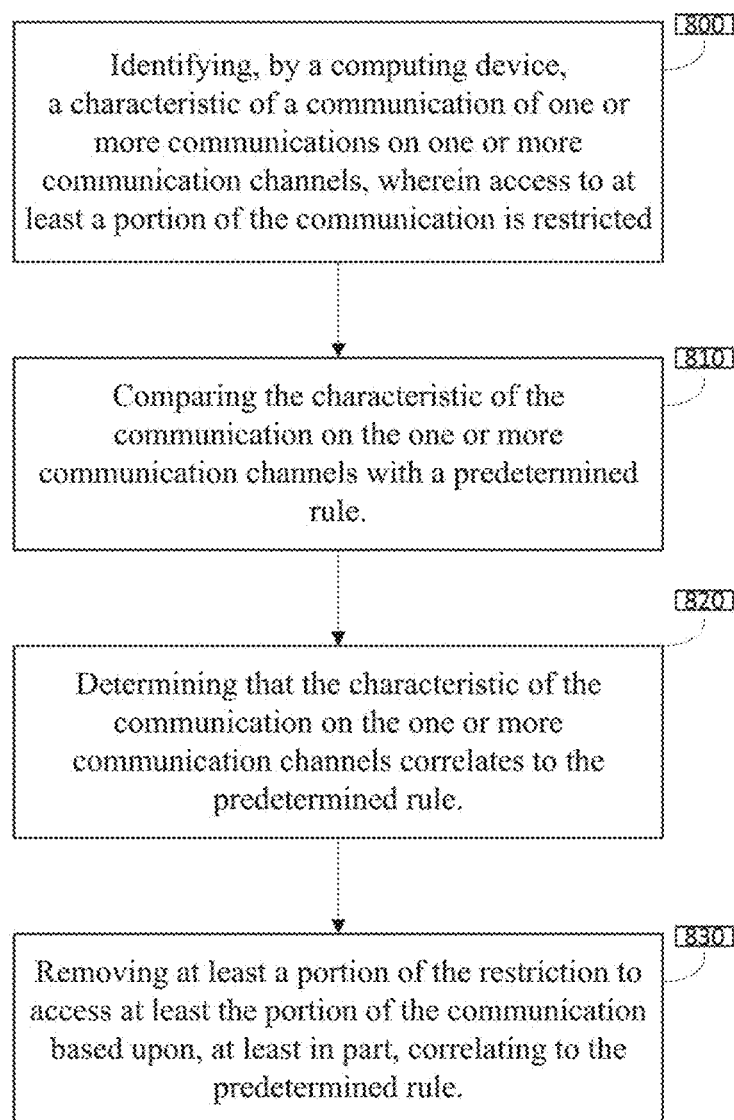
FIG. 38 is an example flowchart of a social engineering attack defense process according to one or more example implementations of the disclosure.

As discussed above and referring also at least to the example implementation of FIG. 38, social engineering attack defense process 10 may identify 800 a characteristic of a communication of one or more communications on one or more communication channels. Access to at least a portion of the communication may be restricted by social engineering attack defense process 10. The characteristic of the communication on the one or more communication channels may be compared 810 by social engineering attack defense process 10 with a predetermined communication rule. A determination 820 may be made by social engineering attack defense process 10 that the characteristic of the communication on the one or more communication channels correlates to the predetermined communication rule. At least a portion of the restriction to access at least the portion of the communication may be removed 830 by social engineering attack defense process 10 based upon, at least in part, the correlation to the predetermined communication rule.

In some implementations, a characteristic of a communication may be a feature, something pertaining to, constituting or indicating a particular quality of that communication. Examples may include, but are not limited to, the persons involved with the communication, the subject matter of the communication, and the time when the communications occurred. The evaluation of the communication may include natural language processing via social engineering attack defense process 10.

In some implementations, the identification of a characteristic of a communication of one or more communications on one or more communication channels may occur when access to at least a portion of the communication may be restricted. For example, social engineering attack defense process 10 may identify a communication on a social media network having the characteristic that the communication was between a former employee of the company and a third party customer of the company (i.e., the characteristic of the communication may be referred to as "ex-employee to related company" type of communication or the communication may be referred to as "ex-employee to company" type of communication).

In some implementations, a predetermined communication rule may be made up of various communication criteria, e.g., the parties involved in the communication, the subject matter of the communication, the time and/or date of the communication characteristics, across multiple channels. For example, a predetermined communication rule may include any communications between co-workers regardless of time or date of the communication. It will be appreciated that the predetermined communication rule may be made up of other communication criteria such as source, origin, relationship to company, tenure, contractual status, independent contractor status, legal status, disciplinary history of entity, security level of party when employed, etc., without departing from the scope of the present disclosure. As appreciated by one of skill in the art, the predetermined communication rule may include other communication criteria.

In some implementations, social engineering attack defense process 10 may compare a characteristic of a communication with a predetermined communication rule. For example, user 46 may have a series of communications with a third party over a network (e.g., a social media network) where those communications have restricted access. Social engineering attack defense process 10 may identify 800 those communications as having the characteristic of being between an employee and a third party (e.g., based on employer listed for the employee as being different from employer listed for the third party and the third party being known as a partner, a vendor or unknown). Social engineering attack defense process 10 may compare 810 this characteristic with a predetermined communication rule involving communications and employees to determine 820 if there is a correlation between the characteristic and predetermined communication rule. If there is such a correlation, at least a portion of the restriction on the communication may be removed 830 allowing greater access to those communications. For example, an employee may befriend a user on a social network. This befriended user is identified to be an employee of a potential customer or current customer of the employee's company. The addition of this new communication link is deemed to be potentially professional in nature based on a predetermined communication rule. The social network, which may have sole direct control and access to these types of communications, may activate this predetermined communication rule and determine that the two parties (e.g., employee and befriended user) are likely to be participating in communication that is able to be legitimately monitored by the social network on behalf of the employee's company or other companies.

Figure 39:
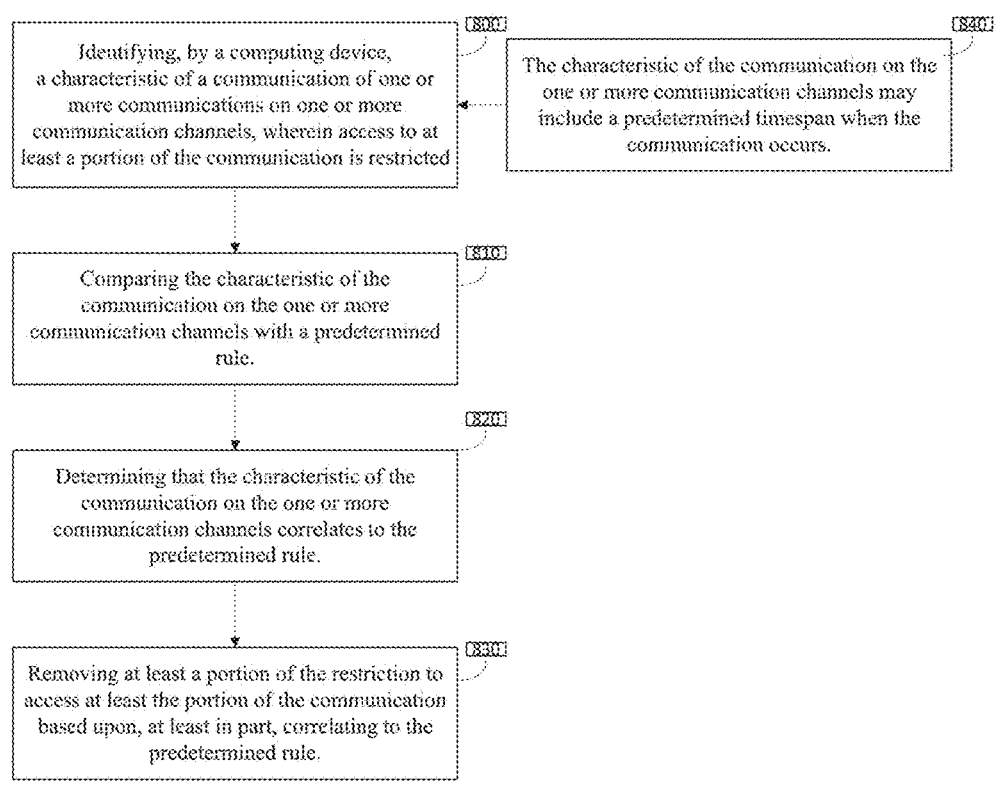
FIG. 39 is an example flowchart of a social engineering attack defense process according to one or more example implementations of the disclosure.

In some implementations, as shown in example FIG. 39, the characteristic of the communication on the one or more communication channels may include 840 a predetermined timespan when the communication occurs. For example, a characteristic may include communications occurring during a specific timeframe, such as, but not limited to, standard business hours, during a business conference, or a specific time period prior to a resignation of an employee. In some implementations, the predetermined timespan may be a default time span, or may be manually adjusted by a user (e.g., via a user interface associated with social engineering attack defense process 10).

Figure 40:
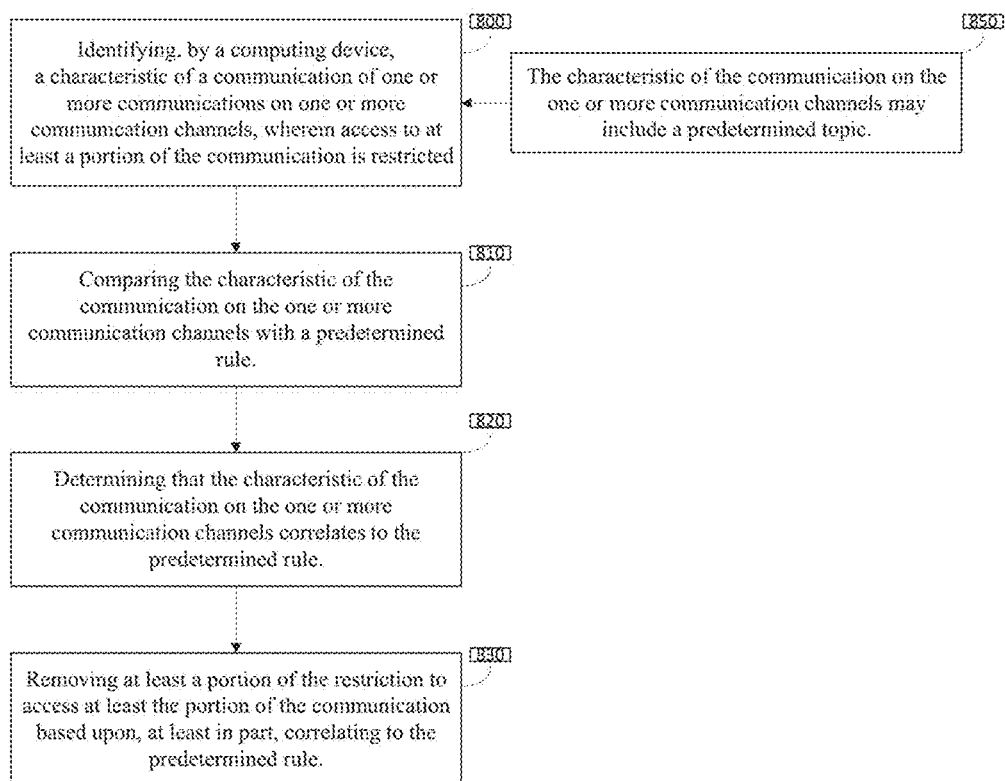
FIG. 40 is an example flowchart of a social engineering attack defense process according to one or more example implementations of the disclosure.

In some implementations, as shown in example FIG. 40, the characteristic of the communication on the one or more communication channels may include 850 a predetermined topic. For example, a characteristic may include a specific topic, such as but limited to, company business-related subjects or personal-related subjects. These types of characteristics may be identified through the use of a natural language process or a keyword extraction process.

In some implementations, to determine whether a characteristic may include 850 a predetermined topic, social engineering attack defense process 10 may utilize, e.g., a text mining procedure to extract keywords; a natural language process; an advanced text analysis procedure using extracted keywords, a database of pre-existing topics, and an in-depth natural language process.

In some implementations, social engineering attack defense process 10 may utilize an ontology in order to implement/represent rules that may have predicate relationships (e.g., categories, attributes of the thing being categorized in the ontology). For example, predicate relationships may include "is _____" (e.g., "this payload IS malware"), "has a _____ 38 (e.g., "this communication HAS AN IP address") , "has the property _____38 (e.g., "this attacker HAS THE PROPERTY of a motivation to attack), etc. The "ontology" is a formal naming and definition of the types, properties, and interrelationships of entities that exist in a given topic. Social engineering attack defense process 10 may implement the communication rules by using a combination of software code and a mapping of communications content to an ontology of known facts. For example, an ontology for communications may have knowledge that a call, an email, a fax, a "VM", a "ring", and various nouns represent a communication. An example of an ontology that may be used is "A Unified Cybersecurity Ontology" (Zareen Syed, Ankur Padia, Tim Finin, Lisa Mathews and Anupam Joshi, UCO: Unified Cybersecurity Ontology, AAAI Workshop on Artificial Intelligence for Cyber Security, February 2016, the contents of which may be incorporated by reference in its entirety. The social engineering attack defense process 10 may have a representation providing knowledge that "call" was a verb action taken by a living entity to another entity, or that "call" could also represent a duration of time in which a communication took place. Rules may be represented as ontological relationships or declarations, or rules may be implemented as software logic that uses ontology. For instance, software logic may represent a rule such as "any attempt to communicate outside of business hours is suspicious" and the ontology may say that a group such as {call, fax, voicemail, email, message, instant message, direct message, ring, ping} are all "communications", and thus a message (e.g., "ping me later tonight") may trigger the rule.

The ontology within social engineering attack defense process 10 may contain the information regarding multiple types of interactions that are usual for a business environment, e.g., the discussion of a sale or contract terms, and multiple types of interactions usual for non-business speech, e.g., discussion of sports teams or social gatherings such as parties. The ontology may also have information regarding objects and scenarios representing malicious or hostile exchanges such as social engineering or information mining. For instance, user communications can be decoded and mapped with respect to an ontology relating to sales. A communication "we're going to have to re-submit after we get the contract terms updated with the new costs" can be understood as a contract negotiation communication, with the terms "re-submit", "terms" and "costs" not just identified but understood in the context of the ontology. Similarly, a communication that the team "mounted a scoring drive to open the fourth quarter but was forced to settle for a field goal" would be decoded against an American Football ontology. The ontology may be pre-defined or the ontology may be continuously, automatically generated through social engineering attack defense process 10 by having new concepts, extracted from communications on a continual basis, which are then manually or automatically determined to be valid and then entered into the ontology. Social engineering attack defense process 10 may receive new ontological relationship information from a third party network.

In some implementations, social engineering attack defense process 10 may utilize declarative grammars to represent facts, use a combination of term co-occurrence and statistical techniques, and/or use homonymic and synonymic analysis in order to expand or delete the predicate relationship between social engineering attack defense process 10 and third party networks (e.g., where third party networks are used).

Figure 41:
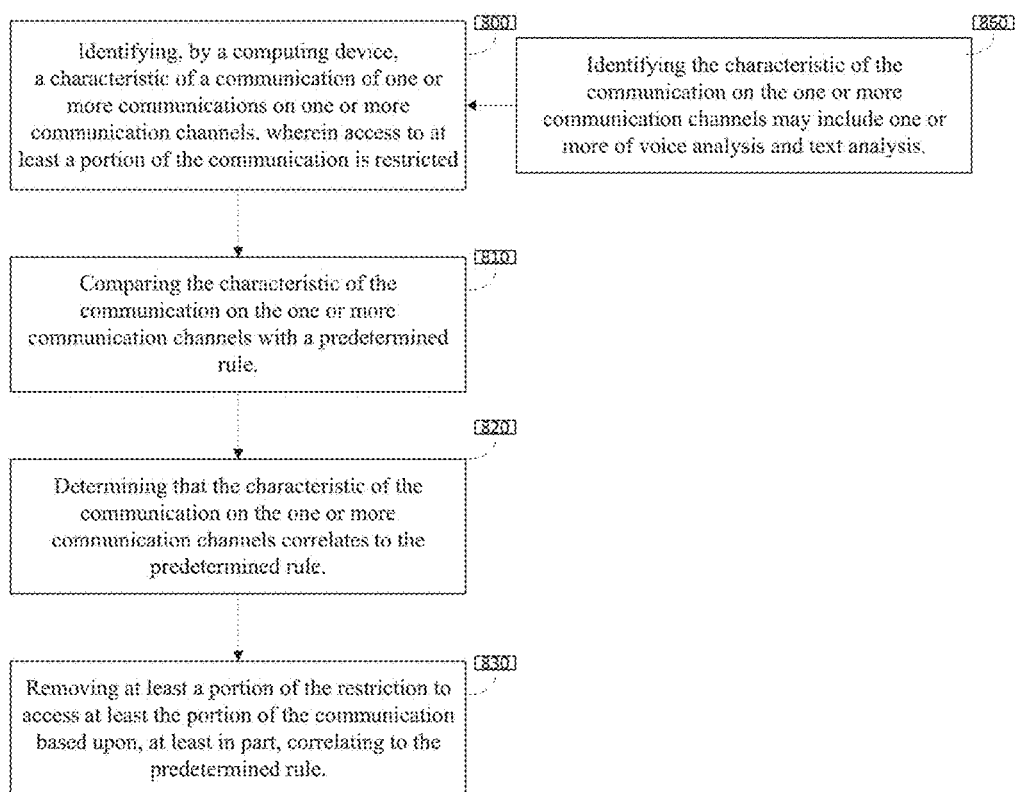
FIG. 41 is an example flowchart of a social engineering attack defense process according to one or more example implementations of the disclosure.

In some implementations, as shown in example FIG. 41, the identification the characteristic of the communication on the one or more communication channels may include 860 one or more of voice analysis and text analysis. Social engineering attack defense process 10 may utilize, e.g., a natural language process which may include an automatic speech recognition process and a text analysis process. For example, the identification of a characteristic may include, but is not limited to, the utilization of an automatic speech recognition process and/or a text analysis to the communication. Further, by way of example, a communication can be subjected to a voice biometrics process to determine who is involved in the communication.

Figure 42:
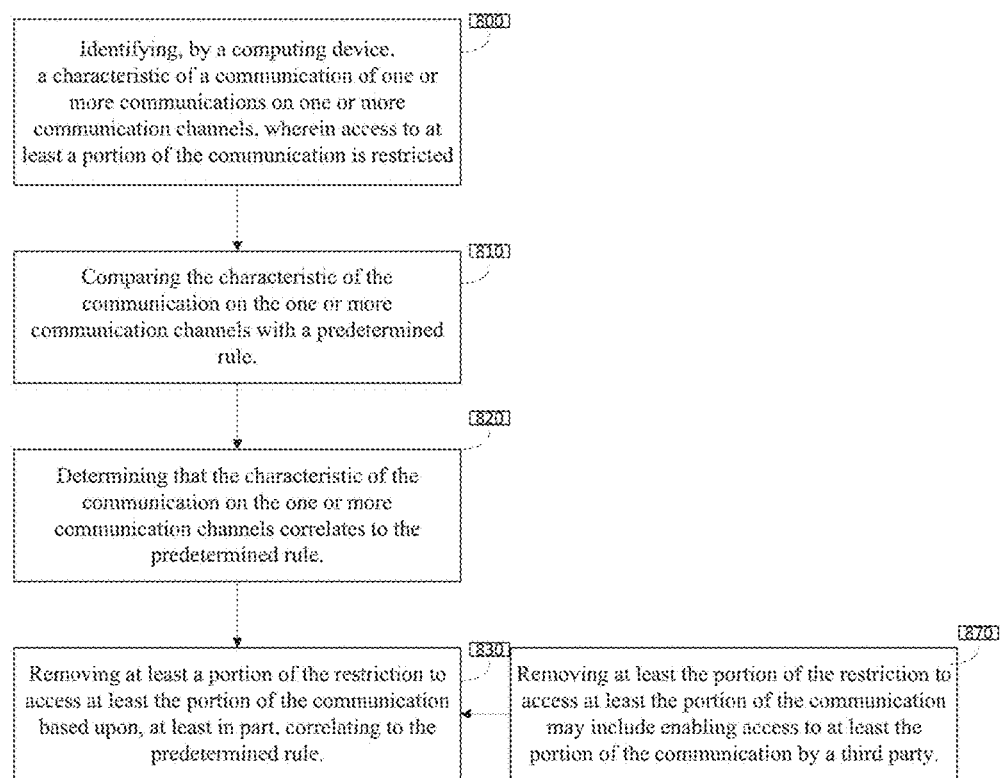
FIG. 42 is an example flowchart of a social engineering attack defense process according to one or more example implementations of the disclosure.

In some implementations, as shown in example FIG. 42, the removal of at least the portion of the restriction to access at least the portion of the communication may include enabling 870 access to at least the portion of the communication by a third party. For example, a communication between user 46 and a third party may be restricted to only those two individuals. Social engineering attack defense process 10 may determine 820 that there is or may be a correlation between a characteristic of that communication and a predetermined communication rule. Upon determining this correlation, the restriction on the communication may be removed 830 allowing greater access to the portions of the communication involving user 46 and the third party. Similar to the social engineering attack defense process 10 identifying 800 those communications as having the characteristic of being between an employee and a third party, the social engineering attack defense process 10 may further provide the third party with access. For example, a user may discuss business over a social network with another person identified as working at a parent organization. Because the communication is likely to be business-related, the social engineering attack defense process 10 has these communications compared to one or more predetermined communication rules. Upon determining that the predetermined communication rules correlate, but in order to maintain the confidentiality in the case that they are not business communications, the communications are then revealed to the third party. The third party's entire role may be to adjudicate if the communications should be provided to one or more parties. Thus, if for example, two people are friends exchanging pictures of their vacations and no business communication was occurring, the third party may determine that the communications are not appropriate for monitoring or capturing by the companies. Combining the restriction, the predetermined rules, along with the uninterested third party to arbitrate which may increase a likelihood of voluntary participation in the monitoring by employees and companies.

Figure 43:
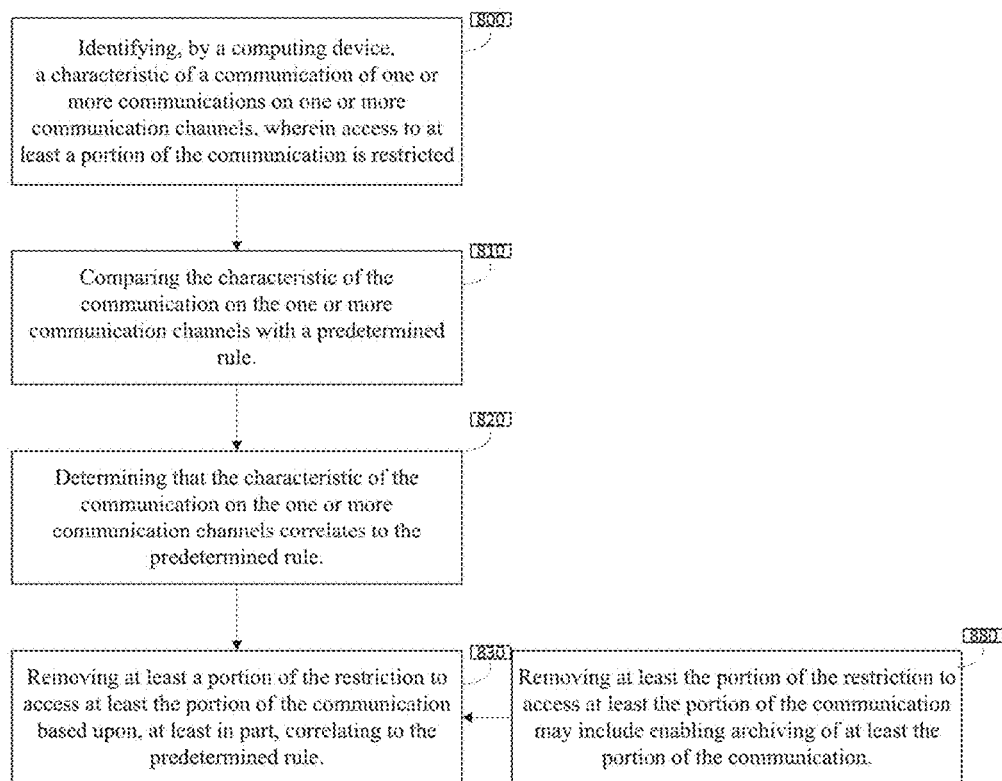
FIG. 43 is an example flowchart of a social engineering attack defense process according to one or more example implementations of the disclosure.

In some implementations, as shown in example FIG. 43, the removal of at least the portion of the restriction to access at least the portion of the communication may include enabling 880 archiving of at least the portion of the communication. There may be circumstances where a communication should be archived for later retrieval. Social engineering attack defense process 10 may determine 820 there is or may be a correlation between a characteristic that communication and a predetermined communication rule. Upon determining this correlation, restrictions preventing any archival of the communication may be removed 830 allowing the communication to be archived.

Figure 44:
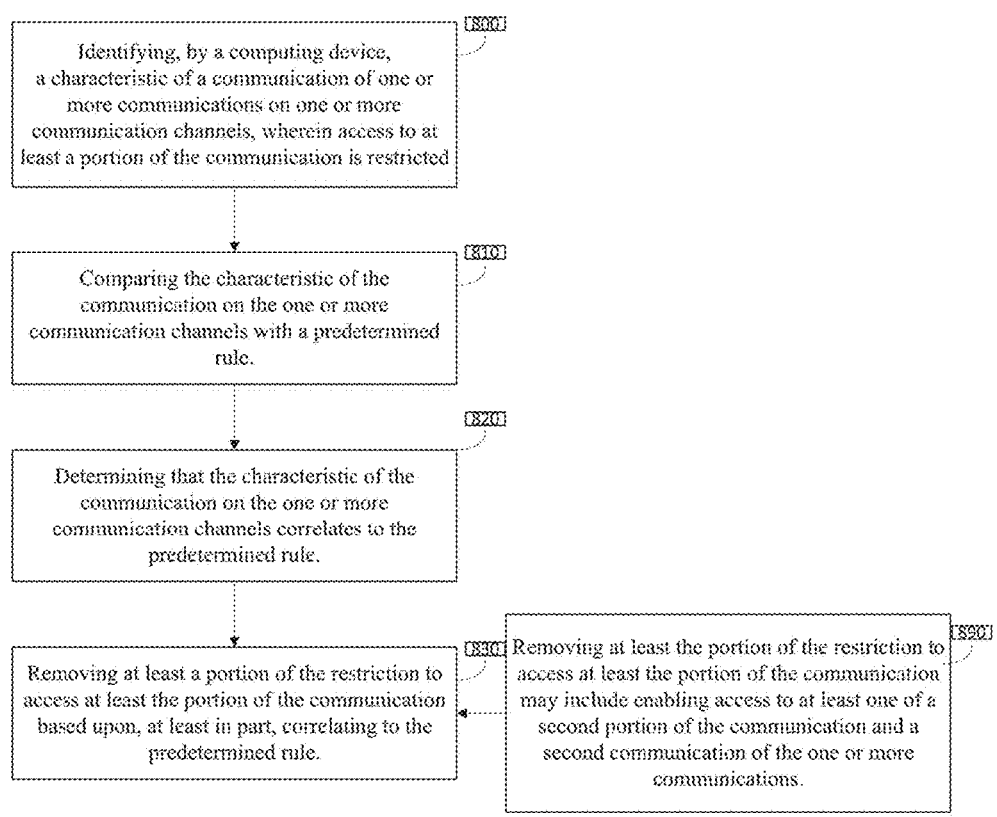
FIG. 44 is an example flowchart of a social engineering attack defense process according to one or more example implementations of the disclosure.

In some implementations, as shown in example FIG. 44, the removal of at least the portion of the restriction to access at least the portion of the communication may include enabling 890 access to at least one of a second portion of the communication and a second communication of the one or more communications. There may be circumstances where access to a larger group of communications is desired. Upon the determination of a correlation of characteristic of a communication and predetermined rule, access restrictions on additional portions of the communication along with additional communications may be removed.

For example, user 46 and a third party may have had multiple communications, all of which may be restricted to only those two individuals. Social engineering attack defense process 10 may determine 820 there is a correlation between a characteristic of one of those communications and a predetermined communication rule. Upon this correlation, the restriction on a subset or on all of those communications may be removed 830. For example, the social engineering attack defense process 10 may determine that communications that match rules or keywords (e.g., a subset) are automatically archived for a company. In another example the system may determine that all subsequent communications may be archived (and presumed business related) unless a user takes explicit action to prevent them or selectively deletes or blocks certain communications.

The terminology used herein is for the purposes of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:

extracting, by a computing device, a first set of one or more audio features from at least a portion of a real-time communication on a communication channel, wherein extracting the first set of one or more audio features includes at least one of generating an audio fingerprint of at least the portion of the real-time communication on the communication channel and transcribing at least the portion of the real-time communication on the communication channel;

comparing the first set of one or more audio features from at least the portion of the real-time communication to a second set of one or more audio features from at least a portion of a previous real-time communication;

determining that at least a portion of the first set of one or more audio features matches the second set of one or more audio features;

identifying a potential social engineering attack connected to social engineering activity associated with at least the portion of the real-time communication on the communication channel responsive to, at least in part, matching the first set of one or more audio features from at least the portion of the real-time communication with the second set of one or more audio features from at least the portion of the previous real-time communication; and performing an action responsive to, at least in part, identifying the potential social engineering attack connected to the social engineering activity associated with at least the portion of the real-time communication on the communication channel, wherein performing the action include providing an alert of the potential social engineering attack.

2. The computer-implemented method of claim 1 wherein the first set of one or more audio features is based upon, at least in part, an audio characteristic of the real-time communication.

3. The computer-implemented method of claim 2 wherein the audio characteristic includes at least one of tone and cadence of a voice identified during the real-time communication.

4. The computer-implemented method of claim 1 wherein at least one of the features of the first set of one or more audio features includes intent.

5. The computer-implemented method of claim 1 wherein at least a portion of the first set of one or more features is extracted across multiple communications on the communication channel.

6. A computer program product residing on a non-transitory computer readable storage medium having a plurality of instructions stored thereon which, when executed across one or more processors, causes at least a portion of the one or more processors to perform operations comprising:

extracting, by a computing device, a first set of one or more audio features from at least a portion of a real-time communication on a communication channel, wherein extracting the first set of one or more audio features includes at least one of generating an audio fingerprint of at least the portion of the real-time communication on the communication channel and transcribing at least the portion of the real-time communication on the communication channel;

comparing the first set of one or more audio features from at least the portion of the real-time communication to a second set of one or more audio features from at least a portion of a previous real-time communication;

determining that at least a portion of the first set of one or more audio features matches the second set of one or more audio features;

identifying a potential social engineering attack connected to social engineering activity associated with at least the portion of the real-time communication on the communication channel responsive to, at least in part, matching the first set of one or more audio features from at least the portion of the real-time communication with the second set of one or more audio features from at least the portion of the previous real-time communication; and performing an action responsive to, at least in part, identifying the potential social engineering attack connected to the social engineering activity associated with at least the portion of the real-time communication on the communication channel, wherein performing the action include providing an alert of the potential social engineering attack.

7. The computer program product of claim 6 wherein the first set of one or more audio features is based upon, at least in part, an audio characteristic of the real-time communication.

8. The computer program product of claim 7 wherein the audio characteristic includes at least one of tone and cadence of a voice identified during the real-time communication.

9. The computer program product of claim 6 wherein at least one of the features of the first set of one or more audio features includes intent.

10. A computing system including one or more processors and one or more memories configured to perform operations comprising:

extracting, by a computing device, a first set of one or more audio features from at least a portion of a real-time communication on a communication channel, wherein extracting the first set of one or more audio features includes at least one of generating an audio fingerprint of at least the portion of the real-time communication on the communication channel and transcribing at least the portion of the real-time communication on the communication channel;

comparing the first set of one or more audio features from at least the portion of the real-time communication to a second set of one or more audio features from at least a portion of a previous real-time communication;

determining that at least a portion of the first set of one or more audio features matches the second set of one or more audio features;

identifying a potential social engineering attack connected to social engineering activity associated with at least the portion of the real-time communication on the communication channel responsive to, at least in part, matching the first set of one or more audio features from at least the portion of the real-time communication with the second set of one or more audio features from at least the portion of the previous real-time communication; and performing an action responsive to, at least in part, identifying the potential social engineering attack connected to the social engineering activity associated with at least the portion of the real-time communication on the communication channel, wherein performing the action include providing an alert of the potential social engineering attack.

11. The computing system of claim 10 wherein the first set of one or more audio features is based upon, at least in part, an audio characteristic of the real-time communication.

12. The computing system of claim 11 wherein the audio characteristic includes at least one of tone and cadence of a voice identified during the real-time communication.

13. The computing system of claim 10 wherein at least one of the features of the first set of one or more audio features includes intent.

14. The computing system of claim 10 further comprising a virtual agent for at least one of monitoring and controlling the operations.

* * * * *